US010348966B2

(12) United States Patent
Washisu et al.

(10) Patent No.: US 10,348,966 B2
(45) Date of Patent: Jul. 9, 2019

(54) OPTICAL APPARATUS AND A CONTROL METHOD FOR PERFORMING IMAGE READOUT AND RECONSTRUCTION BASED ON A DELAYED READOUT FROM DIFFERENT PARTIAL REGIONS

(71) Applicant: CANON KABUSHIKI KAISHA, Tokyo (JP)

(72) Inventors: Koichi Washisu, Tokyo (JP); Masafumi Kimura, Kawasaki (JP); Fumihiro Kajimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 438 days.

(21) Appl. No.: 15/141,046

(22) Filed: Apr. 28, 2016

(65) Prior Publication Data

US 2016/0323526 A1    Nov. 3, 2016

(30) Foreign Application Priority Data

May 1, 2015    (JP) .................................. 2015-094085

(51) Int. Cl.
    *H04N 5/232*    (2006.01)
    *H04N 5/238*    (2006.01)
    *G06T 7/246*    (2017.01)

(52) U.S. Cl.
    CPC ......... *H04N 5/23254* (2013.01); *G06T 7/246* (2017.01); *H04N 5/238* (2013.01); *H04N 5/23212* (2013.01); *H04N 5/23209* (2013.01); *H04N 5/23287* (2013.01)

(58) Field of Classification Search
    CPC ....... H04N 5/144–145; H04N 5/23209; H04N 5/23212; H04N 5/23251–23261; H04N 5/23287; H04N 5/238; G06T 7/20–292; G08B 13/19602–19615; G09G 2320/10
    See application file for complete search history.

(56) References Cited

U.S. PATENT DOCUMENTS

| | | | | |
|---|---|---|---|---|
| 2008/0018788 A1* | 1/2008 | Zhou | ...................... | H04N 7/014 348/452 |
| 2009/0102935 A1* | 4/2009 | Hung | ..................... | H04N 5/235 348/222.1 |
| 2009/0160957 A1* | 6/2009 | Deng | ................. | H04N 5/23248 348/208.99 |
| 2010/0328538 A1* | 12/2010 | Al-Kadi | ................. | H04N 5/145 348/699 |

(Continued)

FOREIGN PATENT DOCUMENTS

| | | |
|---|---|---|
| JP | 2002-027326 A | 1/2002 |
| JP | 2002-333645 A | 11/2002 |

*Primary Examiner* — Hung H Lam
(74) *Attorney, Agent, or Firm* — Cowan, Liebowitz & Latman, P.C.

(57) ABSTRACT

A control apparatus includes a signal readout unit 15 which reads out a frame image obtained from an image pickup device while the frame image is divided into a plurality of different regions, an image information calculating unit 16 which calculates image information based on an image signal of each of the plurality of different regions obtained from the signal readout unit, and an adjusting unit 17 which determines a target adjustment value of an image pickup unit including an image pickup optical system and the image pickup device based on the image information during capturing the frame image.

31 Claims, 29 Drawing Sheets

(56) References Cited

U.S. PATENT DOCUMENTS

2013/0265460 A1\* 10/2013 Wu .................. G06T 5/006
                                                              348/222.1
2014/0049658 A1\* 2/2014 Yamazaki .......... H04N 5/23254
                                                              348/208.11

\* cited by examiner

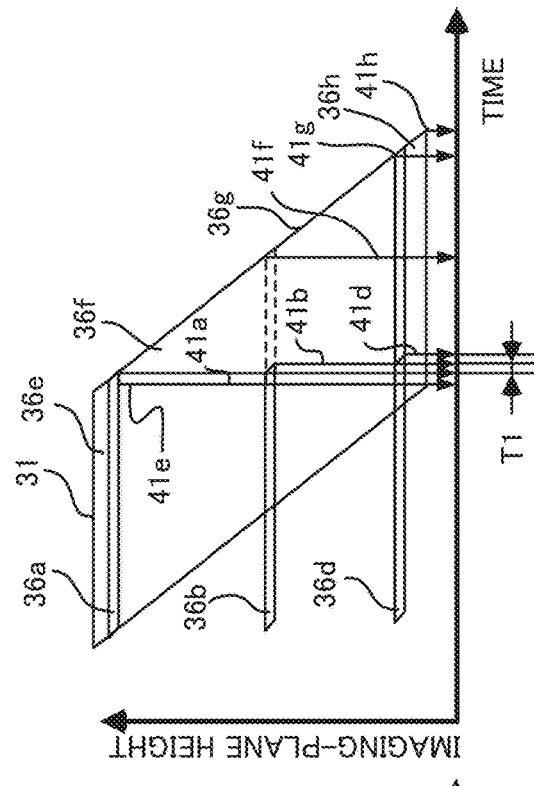
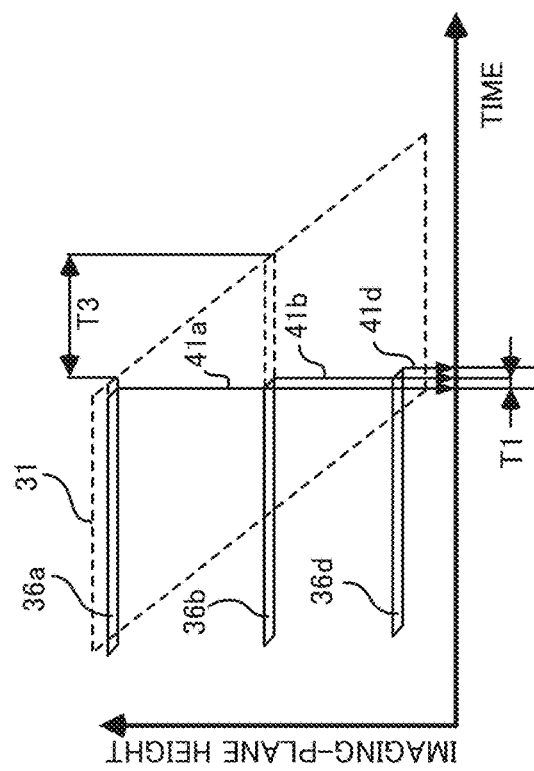

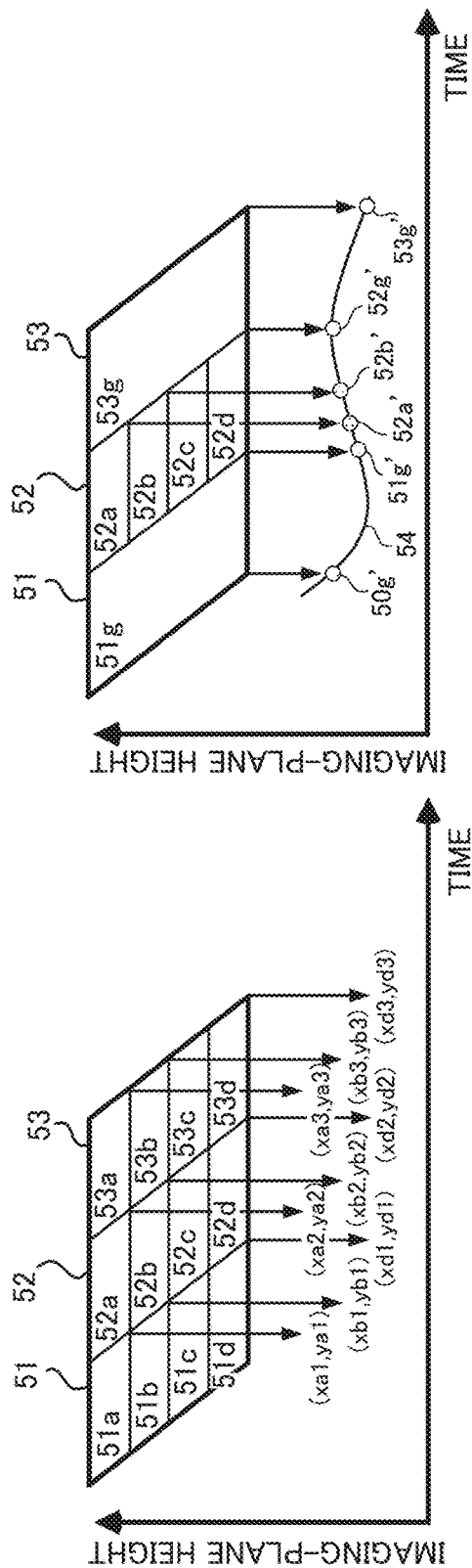

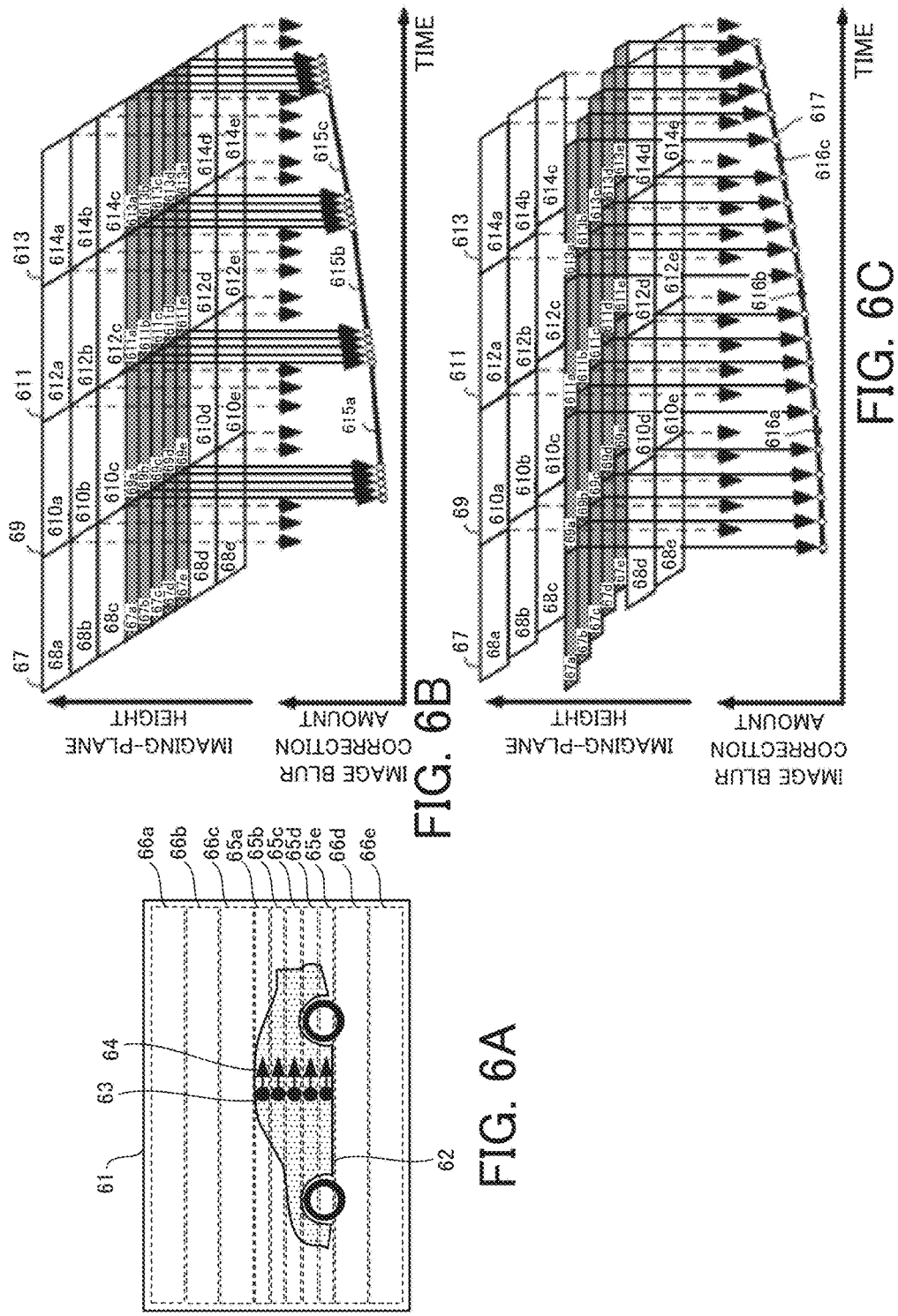

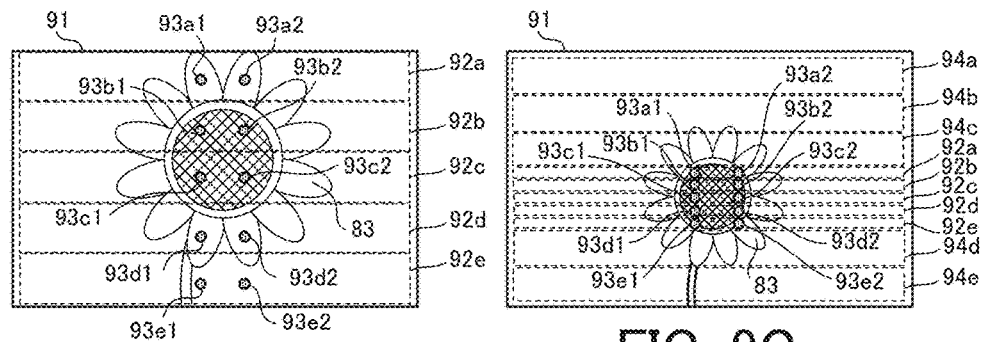
FIG. 9A
FIG. 9C
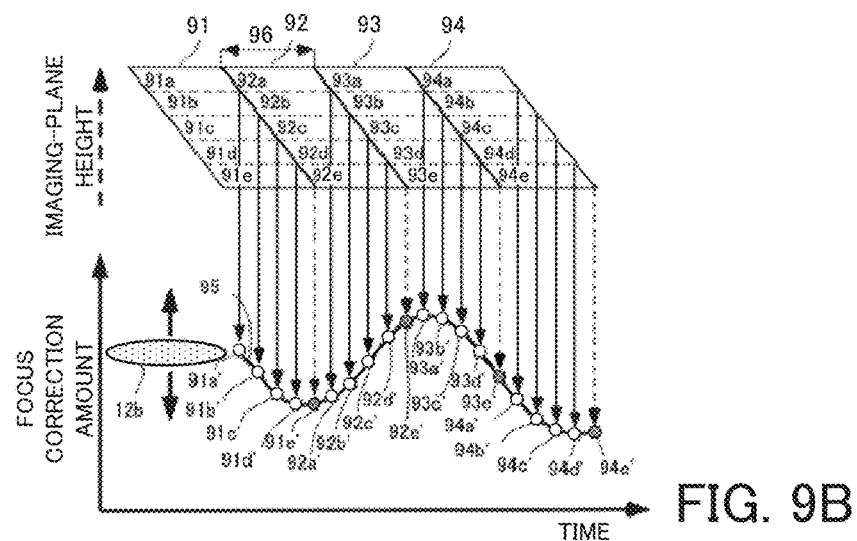
FIG. 9B
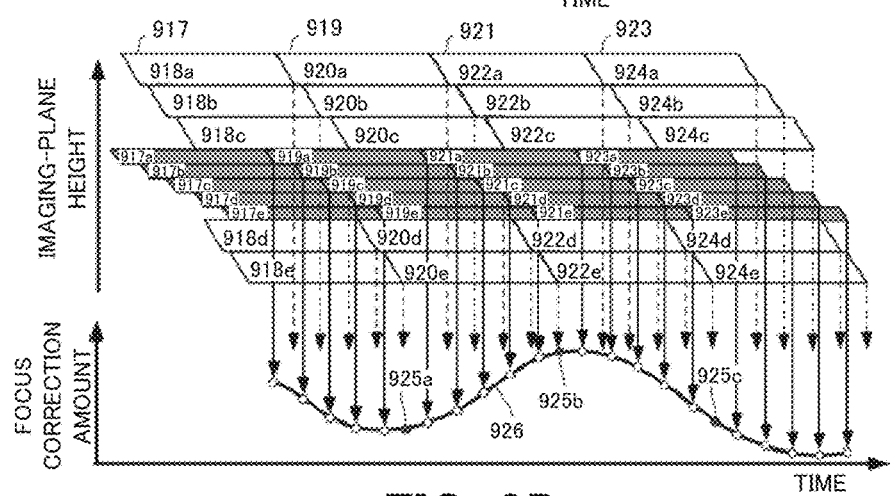
FIG. 9D

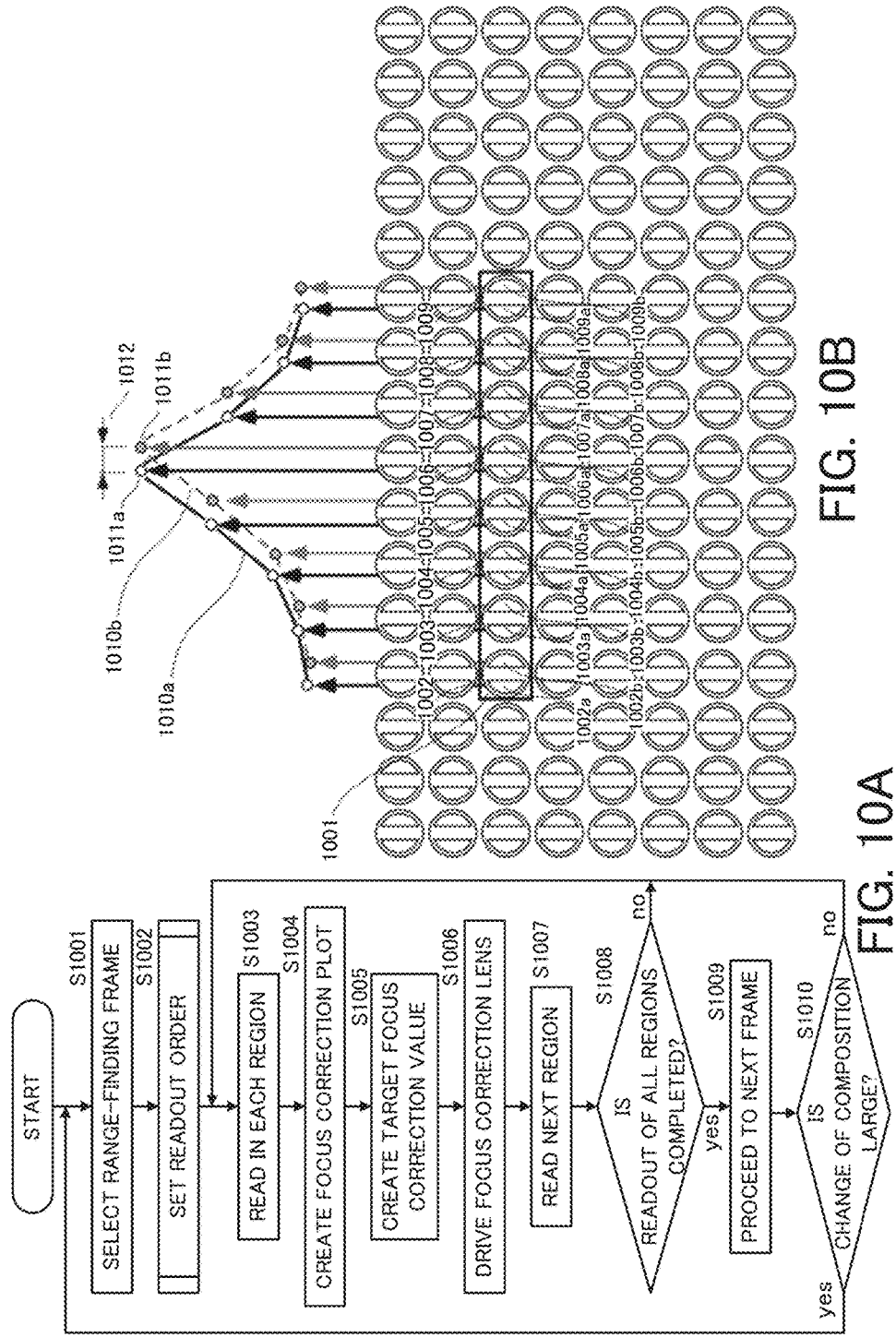

OPTICAL APPARATUS AND A CONTROL METHOD FOR PERFORMING IMAGE READOUT AND RECONSTRUCTION BASED ON A DELAYED READOUT FROM DIFFERENT PARTIAL REGIONS

BACKGROUND OF THE INVENTION

Field of the Invention

The present invention relates to an optical apparatus such as a digital camera and a digital video.

Description of the Related Art

Japanese Patent Laid-open No. 2002-27326 discloses a digital camera which reads out an image signal obtained from an identical pixel in a frame a plurality of times to perform a vibration correction (image stabilization) based on a motion vector obtained from each image signal.

However, in the digital camera disclosed in Japanese Patent Laid-open No. 2002-27326, a signal of the identical pixel in a frame is read out a plurality of times, and accordingly a noise is superimposed on an image obtained in an entire frame.

SUMMARY OF THE INVENTION

The present invention provides a control apparatus, an image pickup apparatus, a control method, and a non-transitory computer-readable storage medium which are capable of reducing a noise superimposed on an image when controlling an image pickup unit based on a plurality of image signals in a frame.

A control apparatus as one aspect of the present invention includes a signal readout unit configured to read out a frame image obtained from an image pickup device while the frame image is divided into a plurality of different regions, an image information calculating unit configured to calculate image information based on an image signal of each of the plurality of different regions obtained from the signal readout unit, and an adjusting unit configured to determine a target adjustment value of an image pickup unit including an image pickup optical system and the image pickup device based on the image information during capturing the frame image.

An optical apparatus as another aspect of the present invention includes an image pickup device, a signal readout unit configured to read out a frame image obtained from the image pickup device while the frame image is divided into a plurality of different regions, an image information calculating unit configured to calculate image information based on an image signal of each of the plurality of different regions obtained from the signal readout unit, and an adjusting unit configured to determine a target adjustment value of an image pickup unit including an image pickup optical system and the image pickup device based on the image information during capturing the frame image.

A control method as another aspect of the present invention includes the steps of reading out a frame image obtained from an image pickup device while the frame image is divided into a plurality of different regions, calculating image information based on an image signal of each of the plurality of different regions, and determining a target adjustment value of an image pickup unit based on the image information during capturing the frame image.

A non-transitory computer-readable storage medium storing a program which causes a computer to execute a process including the steps of reading out a frame image obtained from an image pickup device while the frame image is divided into a plurality of different regions, calculating image information based on an image signal of each of the plurality of different regions, and determining a target adjustment value of an image pickup unit based on the image information during capturing the frame image.

Further features and aspects of the present invention will become apparent from the following description of exemplary embodiments with reference to the attached drawings.

BRIEF DESCRIPTION OF THE DRAWINGS

FIGS. 4A and 4B are explanatory diagrams of an effect of reducing a readout time in the first embodiment.

FIGS. 5A and 5B are explanatory diagrams of another method of calculating the image blur correction amount in the first embodiment.

FIGS. 6A to 6C are explanatory diagrams of another method of calculating the image blur correction amount in the first embodiment.

FIGS. 9A to 9D are explanatory diagrams of the focusing in the first embodiment.

FIGS. 10A and 10B are respectively a flowchart of the focusing and an explanatory diagram of a focus detection in the first embodiment.

DESCRIPTION OF THE EMBODIMENTS

Exemplary embodiments of the present invention will be described below with reference to the accompanied drawings.

First Embodiment

Figure 1:
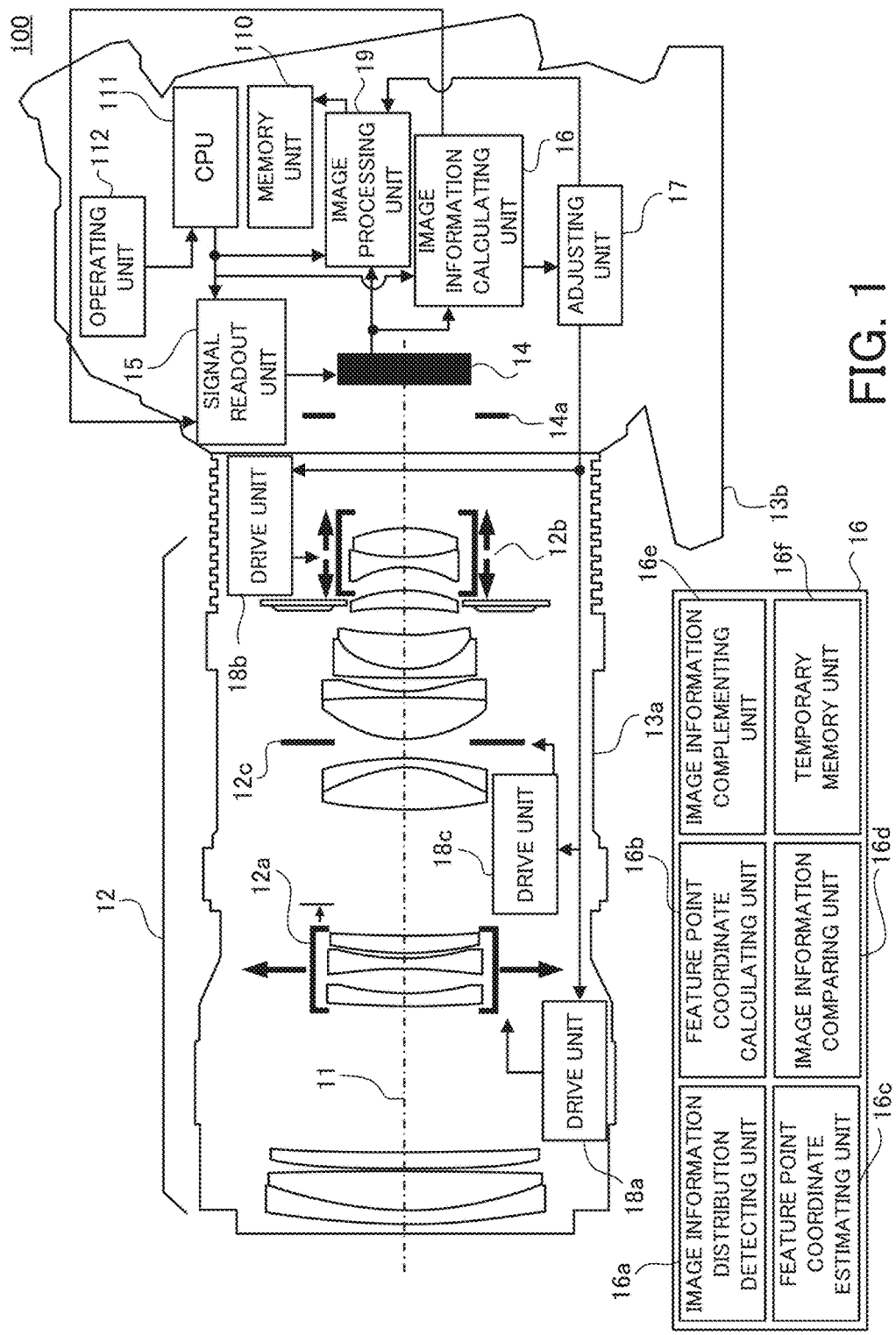
FIG. 1 is a block diagram of an image pickup apparatus in a first embodiment.

First of all, referring to FIG. 1, a configuration of an optical apparatus (image pickup apparatus) in a first embodiment of the present invention will be described. FIG. 1 is a block diagram of an image pickup apparatus 100 in this embodiment.

In FIG. 1, reference numeral 11 denotes an optical axis (photographing optical axis), and reference numeral 12 denotes an image pickup optical system. The image pickup optical system 12 includes an image blur correction lens 12a that is driven in a direction which is (approximately) orthogonal to the optical axis 11 (i.e., in a plane orthogonal to the optical axis) to correct an image blur, a focus lens 12b that is driven along the optical axis 11 to perform focusing, and a movable aperture stop 12c that limits a photographing light beam. Reference numeral 13a denotes a lens barrel (lens apparatus) including the optical pickup optical system 12, and reference numeral 13b denotes a camera body (image pickup apparatus body) including an image pickup device 14 (image pickup element or image sensor). In this embodiment, the image pickup apparatus 100 includes the camera body 13b including the image pickup device 14 and the lens barrel 13a removably attached to the camera body 13b. However, this embodiment is not limited thereto, and it can be applied also to an image pickup apparatus including the image pickup apparatus body and the lens apparatus integrated with each other.

Reference numeral 14 denotes the image pickup device. An image pickup unit is constituted by the image pickup optical system 12 and the image pickup device 14. Reference numeral 14a denotes a mechanical shutter (light shielding unit) that, as appropriate, shields an object light beam which is incident on the image pickup device 14 from the image pickup optical system 12. Reference numeral 15 denotes a signal readout unit that reads out a signal (image signal) which is output from the image pickup device 14. Reference numeral 16 denotes an image information calculating unit that calculates, as a signal for controlling the image blur correction lens 12a or the focus lens 12b, the image signal read from the image pickup device 14 based on an input signal from the signal readout unit 15. The image information calculating unit 16 includes an image information distribution detecting unit 16a, a feature point coordinate calculating unit 16b, a feature point coordinate estimating unit 16c, an image information comparing unit 16d, an image information complementing unit 16e, and a temporary memory unit 16f.

Reference numeral 17 denotes an adjusting unit that outputs a target adjustment value for at least one of the image blur correction lens 12a, the focus lens 12b, and the movable aperture stop 12c based on an output signal from the image information calculating unit 16. Reference numerals 18a, 18b, and 18c are drive units that drive the image blur correction lens 12a, the focus lens 12b, and the movable aperture stop 12c, respectively. Details of the signal output unit 15, the image information calculating unit 16, and the adjusting unit 17 will be described below. Reference numeral 19 denotes an image processing unit that performs signal processing such as forming a luminance signal or a color signal based on the signal read from the image pickup device 14 and that generates a viewing image by performing gamma correction and compression processing. A signal output from the adjusting unit 17 is also input to the image processing unit 19, and the image processing unit 19 performs a brightness adjustment of an image based on the input signal from the adjusting unit 17.

Reference numeral 110 denotes a memory unit that stores a signal from the image processing unit 19. Reference numeral 111 denotes a CPU (control unit, or processor) that controls the signal readout unit 15 and the image information calculating unit 16. Reference numeral 112 denotes an operating unit that receives an instruction to capture an image by a user and that outputs, to the CPU 111, a signal based on the instruction to capture the image. The image blur correction lens 12a is driven in the direction which is approximately orthogonal to the optical axis 11 (in the plane which is approximately orthogonal to the optical axis), and accordingly it can correct an image blur that is caused by a hand shake of the user and that occurs in an imaging plane of the image pickup device 14. However, this embodiment is not limited to thereto, and instead of driving the image blur correction lens 12a, the image pickup device 14 may be driven in the direction which is approximately orthogonal to the optical axis 11 to correct the image blur that is caused by the hand shake and that occurs in the imaging plane. This embodiment creates, in a frame, the target adjustment value of the image pickup unit such as the image blur correction lens 12a, the focus lens 12b, and the movable aperture stop 12c based on a plurality of image signals in the frame. First, in this embodiment, a case in which an image blur correction is performed by controlling the image blur correction lens 12a will be described.

Figure 2:
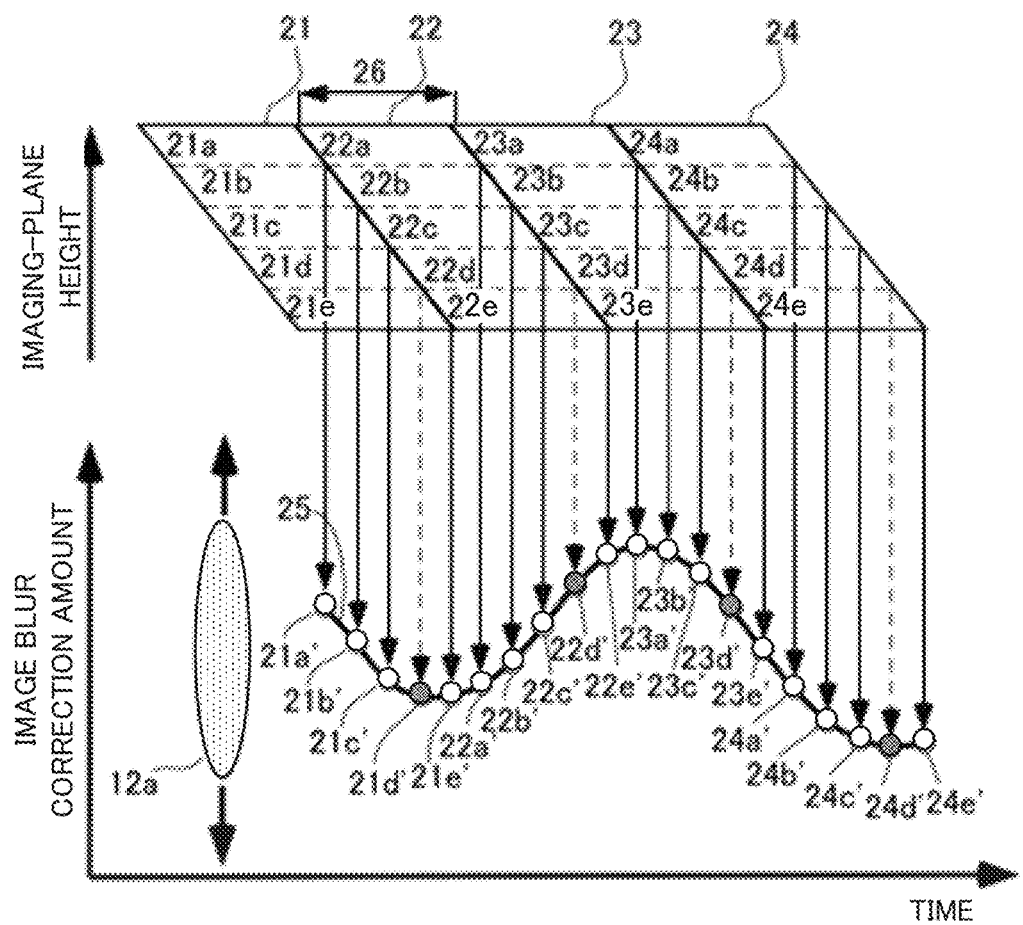
FIG. 2 is an explanatory diagram of an operation of a signal readout unit in the first embodiment.

Subsequently, referring to FIG. 2, the operation of the signal readout unit 15 will be described. FIG. 2 is an explanatory diagram of the operation of the signal readout unit 15. As illustrated in FIG. 2, a plurality of image blur correction plots 21a' to 24e' are obtained from image signals obtained based on an instruction of the signal readout unit 15 in frames 21, 22, 23, and 24 each divided into a plurality of regions "a" to "e" in a height direction of an imaging plane. A horizontal axis in FIG. 2 indicates a time. An accumulation time of one frame is indicated as a time period 26, and for example it is ⅟30. A vertical axis in FIG. 2 indicates a position in a height direction (imaging-plane height) of an image obtained in each frame and an image blur correction amount that occurs on a surface (imaging plane) of an image pickup element. FIG. 2 is an explanatory diagram of a rolling readout in the image pickup element with a so-called CMOS structure.

The image signals in the regions 21a to 21e are read out after the passage of the accumulation time (time period 26). According to this embodiment, since the signal readout is not performed during the accumulation of the image signal differently from a conventional technology, an amount of a superimposed noise is small. As illustrated in FIG. 2, a time delay occurs for the readout of each image signal, and the image signal which is sequentially read can be used as effective image information by using the time delay. In other words, the image information calculating unit 16 obtains an image shift amount (image blur amount) on the imaging plane of the image pickup device 14 that occurs during the time delay by comparing the image signals of each of the regions "a" to "e".

Specifically, the image information calculating unit 16 obtains a first feature point coordinate based on the image signal in an image information extraction range included in the region 21a, and it obtains a second feature point coordinate based on the image signal in an image information extraction range included in the next region 21b. Then, it obtains an image blur correction plot 21b' based on each coordinate. A method of calculating the image blur correction plot will be described below. By repeating this operation, image blur correction plots 21a' to 24e' are obtained. With respect to a region in which a feature point is not included, the image information complementing unit 16e obtains an image blur correction plot by performing prediction processing. For example, if there is not the image information extraction range in the region 21d, i.e., any feature point is not included in the region 21d, the image signal (illustrated by a dashed line) obtained at that time is not used. Black plots 21d, 22d', 23d', and 24d' at that time are predicted by the image information complementing unit 16e provided in the image information calculating unit 16 by using the image blur correction plots 21a' to 24e' and an adaptive filter or the like. As described above, the image blur correction plot in a region where any feature point is not obtained can be complemented.

The adjusting unit 17 outputs a target adjustment value of the image blur correction lens 12a depending on an image blur correction waveform 25 obtained by the image blur correction plots 21a' to 24e', a focal length, object distance information, an optical sensitivity of the image blur correction lens 12a, an attitude of the image pickup apparatus 100, and a situation of panning. The drive unit 18a drives the image blur correction lens 12a during capturing a frame image based on the signal from the adjusting unit 17 to decrease (reduce) the image blur. In the conventional technology, a blur coordinate is obtained by comparing image signals in a common region between different frames. For example, a change of the blur is obtained by comparing the image signals in the region 21a and the region 22a after all the signal readouts for the frames 21 and 22 are completed, and it drives the image blur correction unit 12a depending on the result or changes a position at which the image is cut out to decrease the image blur. On the other hand, in this embodiment, a more accurate image blur correction can be performed since a number of image blur correction plots are obtained in one frame, and also the superimposed noise can be effectively reduced since the image signal is not read during the accumulation of the image signal.

Figure 3A:
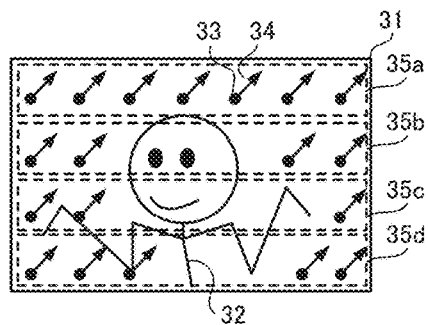
FIGS. 3A to 3E are explanatory diagrams of a method of calculating an image blur correction amount in the first embodiment.

Hereinafter, a method of obtaining an image blur correction amount by using different image signals in a frame will be described. FIGS. 3A to 3E are explanatory diagrams of a method of calculating the image blur correction amount. An image 31 in FIG. 3A is an object image obtained by the readout sufficiently faster than the signal readout of each of the frames 21 to 24 illustrated in FIG. 2. The improvement of the readout speed will be described below. In FIG. 3A, a plurality of feature points 33 (a symbol is allocated only to a representative point in FIG. 3A), for example like neon signs, exist at the background of an object (main object 32), and these are the image information extraction range. A hand shake is distributed to be approximately uniform over an entire image. Accordingly, image blur correction amounts 34 indicate approximately the same value in regions 35a to 35d illustrated in FIG. 3A. As described referring to FIG. 2, the time delay occurs in the image signals (for example, image blur correction plots 21a' to 21d') obtained from the regions 35a and 35d with increasing the readout time, a difference of the respective image blur correction amounts occurs. In this embodiment, this phenomenon is used, and feature points that are different from each other and that are distributed in for example the regions 35a and 35b in the same frame are compared to obtain an image blur amount.

Figure 3C:
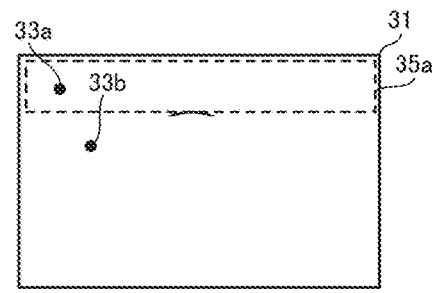
Figure 3B:
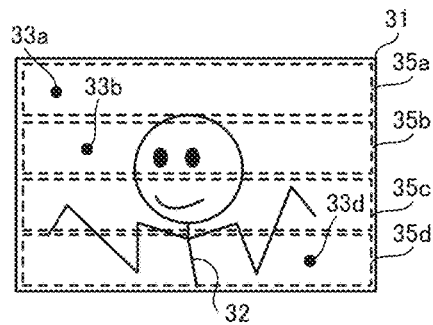

FIG. 3B is an explanatory diagram of a method of obtaining the image blur correction amount based on the comparison of the feature points different from each other. First, the image information distribution detecting unit 16a provided in the image information calculating unit 16 selects, as an image information extraction range, a feature point which is suitable for a hand shake detection in an entire image to be captured, and it obtains the distribution (relative position between the feature points). The selection of the feature point is performed by obtaining a motion vector with the comparison between frames with the same feature point for example, and then by selecting feature points whose directions are aligned (i.e., approximately the same direction). This is a known technology, and accordingly detail descriptions are omitted. Similarly to FIG. 3A, FIG. 3B illustrates feature points 33a, 33b, and 33d for reading the image blur correction amounts in the image obtained with the sufficiently fast readout. Since the signal readout is sufficiently fast, there is no influence of the hand shake due to the readout time delay for each of the feature points 33a, 33b, and 33d. Accordingly, a coordinate (xa,ya) of the feature point 33a, a coordinate (xb,yb) of the feature point 33b, and a coordinate (xd,yd) of the feature point 33d can be obtained accurately. Thus, the relative position between the feature points 33a and 33b can be obtained.

Figure 3D:
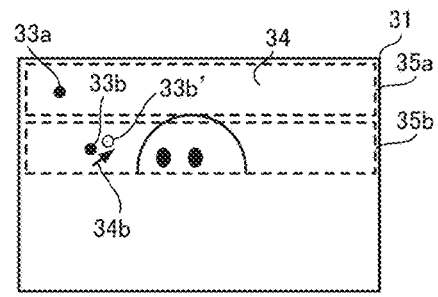

FIG. 3C illustrates, similarly to FIG. 2, a situation in which only the image signal in the region 35a is read (a situation in which the readout of an entire frame is not completed) when a slow readout is performed. The feature point coordinate calculating unit 16b provided in the image information calculating unit 16, for example, obtains the coordinate (xa,ya) of the feature point 33a in this time, and it sets this coordinate as an initial value. The feature point coordinate estimating unit 16c provided in the image information calculating unit 16 estimates the coordinate (xb,yb) of the feature point 33b at that time based on the obtained coordinate of the feature point 33a and the relative position between the feature points of FIG. 3B. In FIG. 3D, the feature point coordinate calculating unit 16b obtains a coordinate (xb',yb') of a feature point 33b' at that time when the readout is completed up to the image signal of the region 35b. The readout of the region 35b has a time delay with respect to the readout of the region 35a. Accordingly, due to the influence of the hand shake during the time, the coordinate (xb,yb) of the feature point 33b estimated in FIG. 3C is different from the coordinate (xb',yb') of the feature point 33b' obtained in FIG. 3D. The image information comparing unit 16d provided in the image information calculating unit 16 obtains the difference between both the coordinates to obtain an image blur correction amount 34b between the regions 35a and 35b considering the time delay.

Figure 3E:
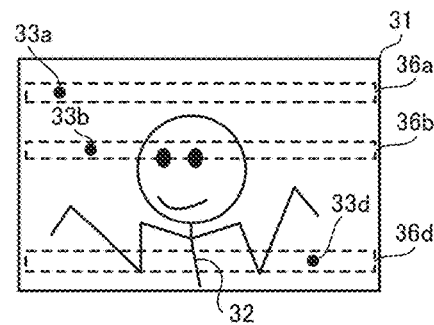

The image information calculating unit 16 performs the calculation described above while comparing the regions 35a to 35d in one frame, and it performs the same calculation for a next frame. Then, it sets for example an image blur correction plot 21a' of the region 21a in FIG. 2 as an initial position, and obtains an image blur correction waveform 25 based on the image blur correction plots between the respective feature points after that. However, in the method described above, it is necessary to previously obtain the relative position with respect to each of the feature points precisely. Accordingly, it is preferred that the time difference in reading the image signals is decreased as much as possible to reduce the influence of the hand shake during the readout time period. FIG. 3E is an explanatory diagram of the method.

In FIG. 3E, the image information extraction ranges (feature points 33a, 33b, and 33d) which are used to detect the hand shake in the image 31 are selected from image information which has been obtained. As a feature point, a point having a large luminance difference (high contrast) such as a neon sign is selected in the image 31. The image information distribution detecting unit 16a controls the signal readout unit 15 so that these selected feature points are read out with priority. The signal readout unit 15 reads only minimum regions 36a, 36b, and 36d including the feature points 33a, 33b, and 33d, respectively, and it does not read other regions (i.e., performs a decimating readout or thinning readout). Alternatively, the signal readout unit 15 reads a remaining region after reading the regions 36a, 36b, and 36d (i.e., changes the order to read the regions).

FIGS. 4A and 4B are explanatory diagrams of a reduction effect of the readout time, and a horizontal axis and a vertical axis indicate a time and an imaging-plane height, respectively. Referring to FIGS. 4A and 4B, the decimating readout and the change of the order of the readout, respectively, will be described. In FIG. 4A, only the regions 36a, 36b, and 36d in the image 31 are read out (regions including the selected feature points are read with priority). At this time, a time difference between image signals 41a and 41b and a time difference between image signals 41a and 41d are T1 and T2, respectively. Thus, compared with a time difference T3 between the regions 36a and 36b which is obtained when the readout is performed in order from a line at the highest imaging plane, the readout time can be significantly reduced.

Similarly, in FIG. 4B, first, an image signal 41e is read out from the region 36e, and then the regions 36a, 36b, and 36d are read out (regions including the selected feature points are read with priority). After the readout in each region is completed, regions 36f, 36g, and 36h (image signals 41f, 41g, and 41h) are read out. Also in this case, respective time differences of for the regions 36a, 36b, and 36d can be set to T1 and T2.

In FIG. 4A, a total readout time can be reduced since only the regions 36a, 36b, and 36d in the image 31 is read out. On the other hand, in FIG. 4B, a total readout time is long since the regions 36e, 36f, 36g, and 36h are also read out. In FIG. 4B, however, the entire region is read out and accordingly a viewing image can be created by using the image signals. Alternatively, as a middle situation between FIGS. 4A and 4B, the readout order can be changed while a decimating is appropriately performed. By performing this readout, the readout time difference of the regions including the feature points can be reduced and the relative position of each of the feature points can be obtained with high accuracy.

As another method of obtaining the relative position of each of the feature points with high accuracy, there is a method of obtaining the relative position of each of the feature points a plurality of times and then averaging them to reduce the influence of the hand shake. In this method, it is not necessary to improve the readout speed. FIGS. 5A and 5B are explanatory diagrams of another method of calculating the image blur correction amount in this embodiment. In a plurality of frames 51, 52, and 53 illustrated in FIG. 5A, the relative position of each of the feature points is obtained in each frame, and the relative positions are averaged between frames. In other words, coordinates of the same feature point between the plurality of read frames are averaged. In FIG. 5A, based on regions 51a to 53d read from each of the frames 51, 52, and 53, coordinates (xa1,ya1) to (xd3,yd3) of the feature points 33a, 33b, and 33d illustrated in FIG. 3E can be obtained. It is possible to obtain the relative position between the feature points based on the coordinates (xa,ya), (xb,yb), and (xd,yd) averaged for each of the feature points.

As another method of obtaining the relative position of each of the feature points with high accuracy, there is a method of using a blur detection result between frames. If a blur amount between the frames is known, a blur in a frame can be estimated. Accordingly, a relative position error of each feature point caused by the blur is corrected by using the estimated blur amount. In other words, based on a change of the coordinate of the same feature point between the plurality of read frames, a distribution of each feature point detected in one frame is corrected. An image blur correction waveform 54 is obtained based on image blur correction plots 51g' to 53g' obtained from regions 51g, 52g (combined region of regions 51a to 52d), and 53g in the plurality of frames 51, 52, and 53 illustrated in FIG. 5B. From the frame 52, image blur correction plots 52a' and 52b' are obtained based on each of the regions 51a to 51d in the frame. A relative position relation between the image blur correction plots 52a' and 52b' can be detected by application to the image blur correction waveform 54.

As described above, the relative position of each feature point in a frame can be precisely obtained by using the decimating readout in FIG. 4A, the change of the readout order in FIG. 4B, the averaging in FIG. 5A, and the blur between frames in FIG. 5B, in cooperation with the signal readout unit 15 and the image information calculating unit 16. Then, the image blur correction amount between respective feature points is obtained by the method described referring to FIGS. 3A to 3D by using the image information comparing unit 16d provided in the image information calculating unit 16. Finally, the adjusting unit 17 obtains the image blur correction amount as a target image blur correction value. Then, the drive unit 18a drives the image pickup unit (image blur correction lens 12a or image pickup device 14) in a direction approximately orthogonal to the optical axis 11 based on the image obtained in a frame during the signal readout for the frame. In this embodiment, the method of performing the blur correction is not limited to the method of driving the image blur correction lens 12a or the image pickup device 14 in the direction approximately orthogonal to the optical axis 11 described above. For example, other methods such as a tilt drive of the blur correction lens 12a and a drive depending on an image blur correction amount for the entire image pickup unit (stabilization in an absolute space) can also be applied. As described above, in this embodiment, the image blur correction can be performed based on the plurality of image blur correction amounts obtained in one frame. Accordingly, it is possible to perform the image blur correction with high response. Since this embodiment does not read a signal of the same pixel in one frame a plurality of times differently from the conventional technology, the superimposition of a noise on an image can be reduced. As above, the image blur correction processing in the situation where the feature points to be targeted are distributed over an entire screen (image) like a hand-shake situation (FIGS. 3A to 3E) is described.

Subsequently, referring to FIGS. 6A to 6C, a case in which the main object is a moving object and an image is to be captured while following the moving object will be described. FIGS. 6A to 6C are explanatory diagrams of another method of calculating the image blur correction amount in this embodiment. FIG. 6A illustrates an image 61 obtained in a case where a main object 62 is a moving object and a so-called panning (follow shot) which captures an image while following the main object 62 is performed. In this case, feature points 63 are set at the main object 62, but the feature points 63 are densely located and thus they are not dispersed differently from the case of FIGS. 3A to 3E. Accordingly, it is difficult to obtain a stable image blur correction waveform. In order to obtain image signals in a region including each feature point while being dispersed, the readout order of the image signals is changed.

In FIG. 6A, the signal readout unit 15 reads regions 65a to 65e which include the feature points 63 and regions 66a to 66e which do not include the feature point 63 based on coordinates of the feature points selected by the image information distribution detecting unit 16a. The number of the regions including the feature point 63 is set depending on image signals needed in one frame. For example, if five plots are required as the image blur correction plots in order to obtain the image blur correction waveform in one frame, the image information distribution detecting unit 16a ensures five regions as regions including feature points. In addition, it ensures regions having the same number which do not include the feature points. Then, the image information distribution detecting unit 16a controls the signal readout unit 15 so as to alternately read the region which includes the feature point 63 and the region which does not include the feature point 63, and it obtains an image blur correction amount at equal intervals (approximately constant intervals) in one frame.

FIG. 6C is an explanatory diagram of image signals in each region and an image blur correction waveform obtained based on the image signals while the readout order is changed as described above. For comparison, FIG. 6B illustrates image signals in each region and an image blur correction waveform obtained based on the image signals while the readout order is not changed. In frames 67, 69, 611, and 613, the image signals are read in order from the region in which the imaging-plane height is higher. Accordingly, image signals in gray regions 67a to 67e (69a to 69e, 611a to 611e, and 613a to 613e) including feature points as image information extraction ranges are adjacently read out, and image blur correction plots are obtained to be concentrated for each frame. As described above, the image blur correction waveform of intervals (68a to 68e, 610a to 610e, 612a to 612e, and 614a to 614e) in which the image blur correction plot cannot be obtained is approximated by using straight lines 615a to 615c, and accordingly the accuracy of the image blur correction is decreased.

On the other hand, in this embodiment, as illustrated in FIG. 6C, the image signals in the gray regions 67a to 67e which include the feature points and the image signals in the white regions 68a to 68e, 610a to 610e, 612a to 612e, and 614a to 614e which do not include any feature points are read alternately. As a result, since the image blur correction plots are distributed uniformly, and accordingly a highly-accurate image blur correction waveform 617 is obtained. Gray plots 616a to 616c are image blur correction plots which are predictively complemented by the image information complementing unit 16e by using a known technology such as a Kalman filter. As described above, the image blur correction plots obtained from the image signals are uniformly distributed at narrow intervals, and accordingly the prediction accuracy can also be improved. By driving the image blur correction lens 12a based on the image blur correction waveform 617 obtained as described above, it is possible to perform the image blur correction following the moving object.

Figure 7A:
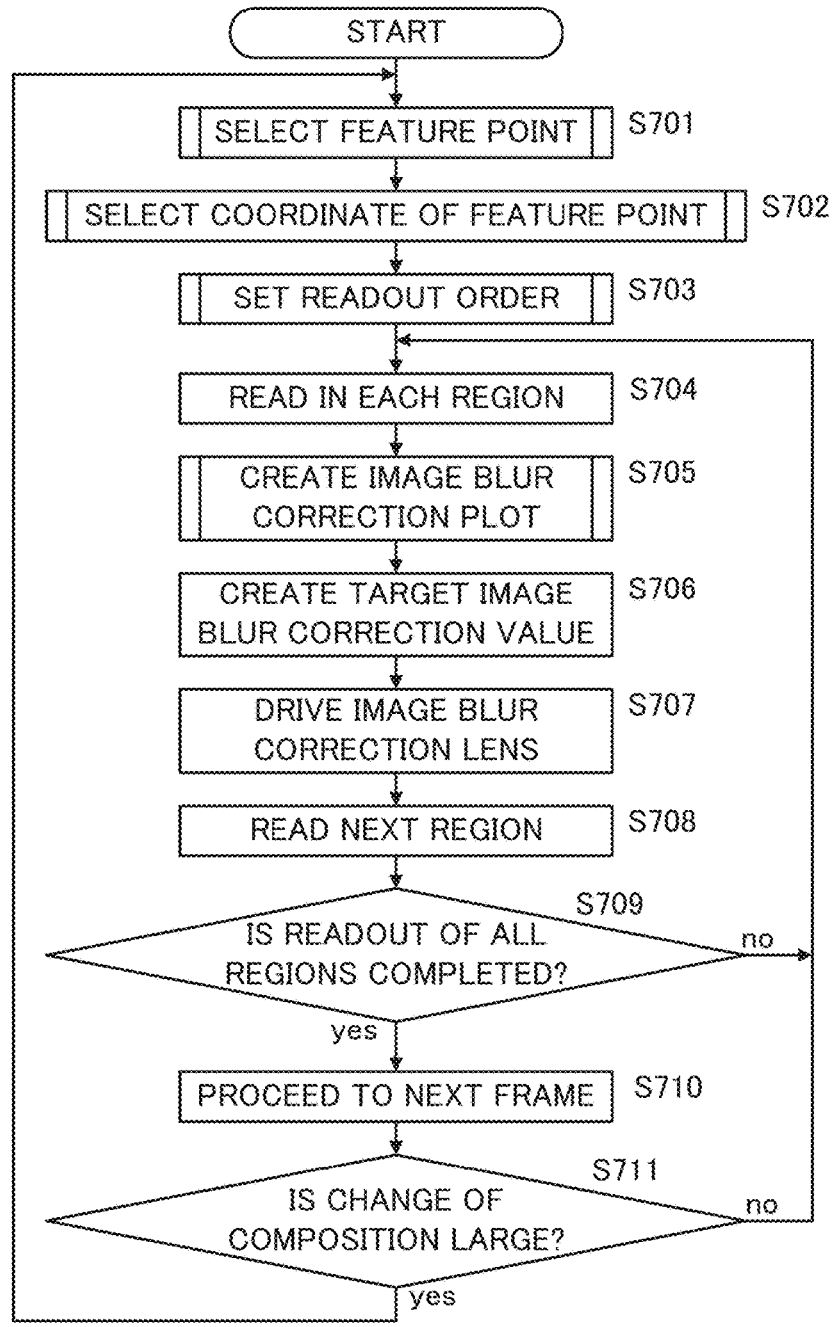
FIGS. 7A to 7G are flowcharts of an image blur correction in the first embodiment.

FIG. 7A is a flowchart of the image blur correction in this embodiment. In FIG. 7A, for a simple explanation, elements which are not directly relevant in this embodiment are omitted. This flow starts when for example a user performs a photographing preparation operation such as a half-press of a release button provided on a camera and the operating unit 112 outputs an instruction for the photographing preparation to the CPU 111. This flow is finished when the instruction for the photographing preparation is canceled. Each step in FIG. 7A is performed mainly the signal readout unit 15, the image information calculating unit 16, the adjusting unit 17, the drive unit 18a, or the image processing unit 19 based on an instruction of the CPU 111.

First, at step S701, the image information distribution detecting unit 16a selects an image information extraction range (feature point) on a screen (image) based on the image obtained by the image processing unit 19 or the image information calculating unit 16. As described referring to FIG. 3E, points each having a large luminance difference (high contrast) such as a neon sign in the image 31 are selected as feature points. It is preferred that the feature points are set uniformly in the image (screen) upward and downward. This is because sampling intervals of image signals corresponding to the feature points are unbalanced during the image readout if the feature points are set to be concentrated in one region (a predetermined region) in the screen. If the feature points are set to be concentrated in the predetermined region, steps S703 and S704 below may be needed.

Subsequently, at step S702, the image information calculating unit 16 (feature point coordinate calculating unit 16b) detects a coordinate of the feature point as an image information extraction range. As described referring to FIGS. 4A, 4B, 5A, and 5B, this is because the high-speed readout at which the influence of the hand shake does not occur and the blur amount correction is performed to detect a coordinate of the feature point with high accuracy. Subsequently, at step S703, the image information calculating unit 16 (image information distribution detecting unit 16a) sets the readout order for the signal readout unit 15. If the feature points are uniformly distributed over the entire screen, image signals are read in order from an upper region toward a lower region in the screen. On the other hand, if the feature points are concentrated in the predetermined region, as described referring to FIG. 6C, the readout order is changed to set the sampling of the image signals to be approximately equal intervals.

Subsequently, at step S704, the signal readout unit 15 reads the image signal in each region in the readout order set at step S703. Subsequently, at step S705, as described referring to FIGS. 3A to 3E, the image information comparing unit 16d compares the read image signals for each region. Then, the image information calculating unit 16 generates the image blur correction plot based on the comparison result. Subsequently, at step S706, the adjusting unit 17 generates a target adjustment value that is to be used for the image blur correction based on the obtained image blur correction plot. Then, at step S707, the drive unit 18a drives the image blur correction lens 12a based on the target adjustment value generated by the adjusting unit 17.

Subsequently, at step S708, the signal readout unit 15 reads the image signal in the next region. Then, at step S709, the CPU 111 (or the signal readout unit 15) determines whether image signals in regions (all regions) needed to form an image in one frame are read out. If the necessary regions are read out, the flow proceeds to step S710. On the other hand, if a region to be read in one frame remains, the flow returns to step S704, and the readout of image signals and the image blur correction (steps S704 to S708) are repeated.

At step S701, the process proceeds to the next frame. Subsequently, at step S711, the image information calculating unit 16 determines whether a composition in the screen is changed. If the composition is not changed (or a change amount of the composition is smaller than a predetermined amount), the flow returns to step S704, and image signals in the next frame are read with the condition set at steps S701 to S703. On the other hand, if the composition is changed (or the change amount of the composition is larger than the predetermined amount), the flow returns to step S701, and the setting of the feature point, the detection of the coordinate of the feature point, and the setting of the readout order are performed again.

Figures 7B, 7C:
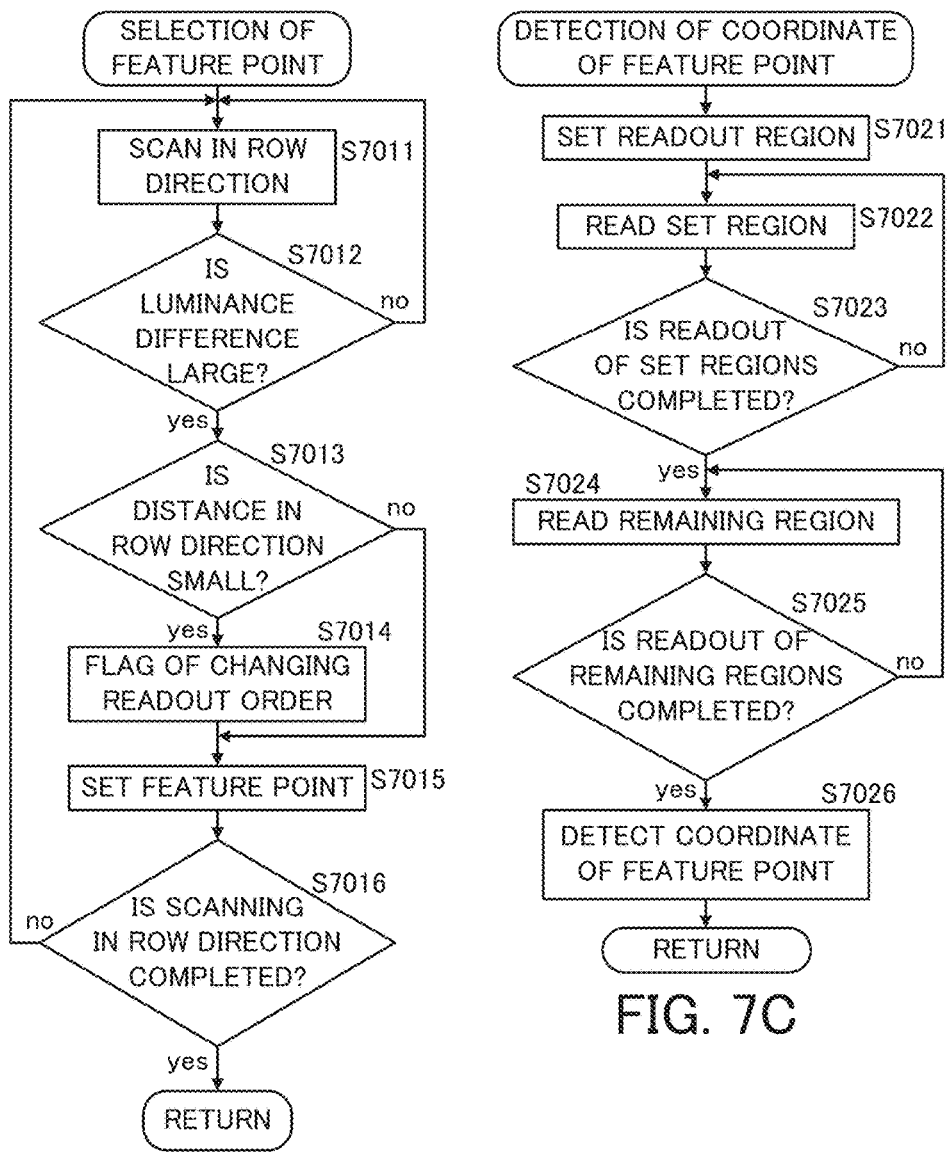

FIG. 7B is a subroutine relating to step S701 in FIG. 7A (selection of the image information extraction range (i.e., selection of the feature point)). At step S7011, the image information distribution detecting unit 16a starts scanning in a height direction (row direction) of the screen for the image obtained by the image processing unit 19 or the image information calculating unit 16. Subsequently, at step S7012, the image information distribution detecting unit 16a determines, with respect to the scanned row, whether a luminance difference between pixels is larger than a predetermined value. If there is a pixel group where the luminance difference is larger than the predetermined value, the flow proceeds to step S7013. On the other hand, there is no pixel group where the luminance difference is larger than the predetermined value, the flow returns to step S7011, and scanning is to be performed for the next row. Since the luminance difference in the row direction cannot be obtained based on the image signals for each row in the screen, the luminance value in the row direction is obtained based on a readout result of image signals in a plurality of rows (for example 10 rows).

Subsequently, at step S7013, the image information distribution detecting unit 16a determines whether a distance in the row direction is shorter than a predetermined distance. Specifically, if a rough distance in the row direction between a previously-obtained pixel group having a large luminance difference and a currently-obtained pixel group having a large luminance difference is shorter than the predetermined distance, the flow proceeds to step S7014. On the other hand, the distance in the row direction is longer than the predetermined distance, step S7014 is skipped and the flow proceeds to step s7015. Due to the influence of the hand shake and the like, the distance between the feature points can be roughly obtained. This is not a problem in accuracy with which a distribution of the pixel group having the luminance difference in the screen is seen. Step S7014 is provided to transmit the necessity to change the signal readout order to increase the readout time interval between two points, as illustrated in FIG. 6C, from the image information distribution detecting unit 16a to the signal readout unit 15 if the distance in the row direction for the two feature points is short.

At step S7015, the image information distribution detecting unit 16a selects the obtained pixel group as a feature point needed for the image blur detection (i.e., determines the image information extraction range). When a plurality of feature points are obtained by the same scanning, instead of using all the feature points, the number of the selected feature points is adjusted depending on the photographing time (signal accumulation time) for the frame. For example, many feature points are used if the readout time of the image signals is long and it is necessary to obtain the image signals with fine intervals therebetween, and on the other hand, if not, the number of the feature points are decreased such that a calculation load per time is constant. Subsequently, at step S7016, the image information distribution detecting unit 16a determines whether the readout of the necessary rows in one frame is completed. If the readout of the necessary rows is not completed, the flow returns to step S7011, and the scanning of the next row continues. On the other hand, if the readout of the necessary rows is completed, this subroutine is finished, and the flow proceeds to step S702.

FIG. 7C is a subroutine in the detection of the coordinate of the feature point at step S702, and it illustrates an example of the decimating readout and the readout order as described referring to FIGS. 4A and 4B. First, at step S7021, the signal readout unit 15 sets only the minimum regions 36a, 36b, and 36d including the feature points 33a, 33b, and 33d, respectively, illustrated in FIG. 3E as readout regions. Subsequently, at step S7022, the signal readout unit 15 reads the set readout region. Subsequently, at step S7023, the signal readout unit 15 determines whether the readout of the set readout regions are completed. If the readout of the readout regions are completed, the flow proceeds to step S7024. On the other hand, if the readout of the readout regions is not completed, the flow returns to step S7022, the readout of image signals (readout regions) continues.

If the readout of the readout regions set at step S7023 is completed, subsequent steps S7024 and S7025 are skipped in the method of the decimating readout, and at step S7026, the image information calculating unit 16 obtains the coordinate of the feature point. Then, this subroutine is finished, and the flow proceeds to step S703. In the method of changing the readout order, at step S7024, the signal readout unit 15 reads a region which does not include the feature point. Subsequently, at step S7025, steps S7024 and S7025 are repeated to continue the readout of the image signals until the readout of the region is completed. When the readout of the image signal in this region is completed, the flow proceeds to step S7026, and the image information calculating unit 16 obtains the coordinate of the feature point in the set region. Then, this subroutine is finished and the flow proceeds to step S703.

Figure 7D:
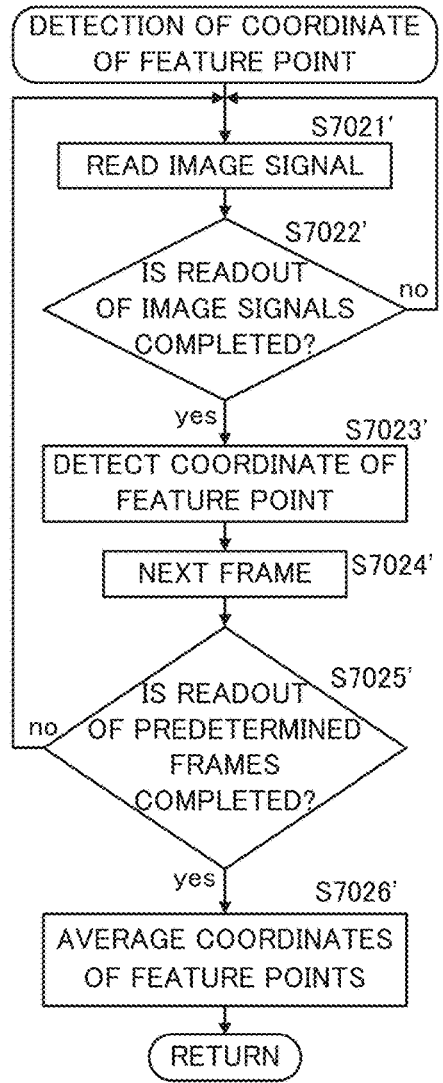

FIG. 7D is another example of the subroutine in the detection of the coordinate of the feature point at step S702, and it illustrates an example of averaging processing of the coordinate of the feature point between frames as described referring to FIG. 5A. First, at step S7021', the signal readout unit 15 reads image signals in order from the upper side in the screen. Subsequently, at step S7022', the signal readout unit 15 determines whether the readout of the image signals in the necessary regions of the screen is completed. If the readout of the image signals is completed, the flow proceeds to step S7023'. On the other hand, if the readout of the image signals is not completed, the flow returns to step S7021' and the readout of image signals continues.

Subsequently, at step S7023', the image information calculating unit 16 obtains the coordinate of the feature point set at step S701 based on the obtained image signal. Subsequently, at step S7024', the process proceeds to the next frame. Subsequently, at step S7025', the signal readout unit 15 determines whether the readout of the image signals in predetermined frames (for example, three frames in FIG. 5A) is completed. If the readout of the image signals in the predetermined frames is not completed, the flow returns to step S7021', and the signal readout unit 15 reads an image signal in the next frame. On the other hand, if the readout of the image signals in the predetermined frames is completed, the flow proceeds to step S7026'. At step S7026', the image information calculating unit 16 averages the same coordinates of the feature points obtained in a plurality of frames to obtain the coordinate of the feature point where the influence of the hand shake has been reduced, and thus the accuracy of the coordinate of the feature point is improved. Then, this subroutine is finished and the flow proceeds to step S703.

Figure 7E:
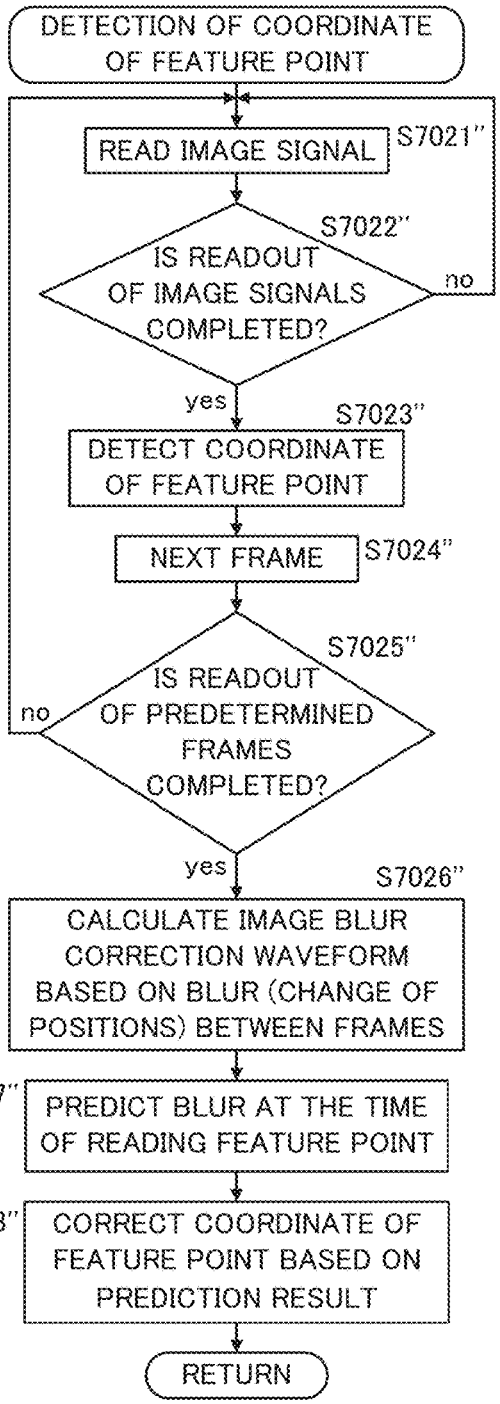

FIG. 7E is another example of the subroutine in the detection of the coordinate of the feature point at step S702, and it illustrates an example of correcting the coordinate of the feature point of each region in one frame by using the image blur correction waveform obtained from the same feature points between frames as described referring to FIG. 5B. First, at step S7021", the signal readout unit 15 reads image signals in order from the upper side in the screen. Subsequently, at step S7022", the signal readout unit 15 determines whether the readout of the image signals in the necessary regions of the screen is completed. If the readout of the image signals is completed, the flow proceeds to step S7023". On the other hand, if the readout of the image signals is not completed, the flow returns to step S7021", and the signal readout unit 15 continues the readout of the image signals.

At step S7023", the image information calculating unit 16 obtains the coordinate of the feature point set at step S701 based on the obtained image signal. Subsequently, at step S7024", the process proceeds to the next frame. Subsequently, at step S7025", the signal readout unit 15 determines whether the readout of the image signals in predetermined frames (for example, three frames in FIG. 5A) is completed. If the readout of the image signals in the predetermined frames is not completed, the flow returns to step S7021", and the signal output unit 15 reads image signals in the next frame. On the other hand, if the readout of the image signals is completed, the flow proceeds to step S7026".

At step S7026", the image information calculating unit 16 obtains the image blur correction waveform based on a change of a position of the same feature point between frames. Subsequently, at step S7027", the image information complementing unit 16e obtains an image blur correction amount at the timing of the readout of the feature point in one frame set at step S701. In this case, the image information complementing unit 16e obtains the image blur correction amount, based on the image blur correction waveform calculated at step S7026", by using a linear prediction or a prediction of the adaptive filter described above or an LPC. Subsequently, at step S7028", the image information calculating unit 16 corrects the coordinate of the feature point obtained at step S7023" based on the image blur correction amount calculated at step S7027" (i.e., prediction result). As described above, the accuracy of the coordinate of the feature point is improved, and then this subroutine is finished and the flow proceeds to step S703.

Figure 7F:
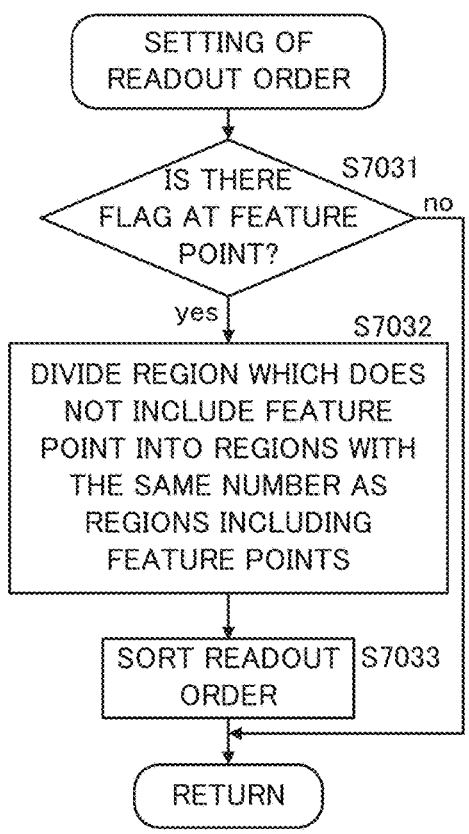

FIG. 7F is a subroutine in the setting of the readout order at step S703. First, at step S7031, the image information calculating unit 16 determines whether there is a flag indicating the change of the readout order at steps S7014 in the flowchart of FIG. 7B. If there is the flag, the flow proceeds to step S7032. On the other hand, if there is no flag, this subroutine is finished, and the flow proceeds to step S704. At step S7032, as described referring to FIG. 6A, the image information distribution detecting unit 16a sets the plurality of regions each having the feature point, and it divides regions which do not have any feature points into regions with the same number as that of the regions having the feature points. Subsequently, at step S7033, as described referring to FIG. 6C, the image information distribution detecting unit 16a sets the readout so that the region which has the feature point and the region which does not have the feature point are alternately read out. Accordingly, outputs of the image signals obtained from the regions having the feature points are distributed uniformly at approximately equal intervals during the output time period of the image signals in one frame. When sorting of the readout order is completed at step S7033, this subroutine is finished and the flow proceeds to step S704.

Figure 7G:
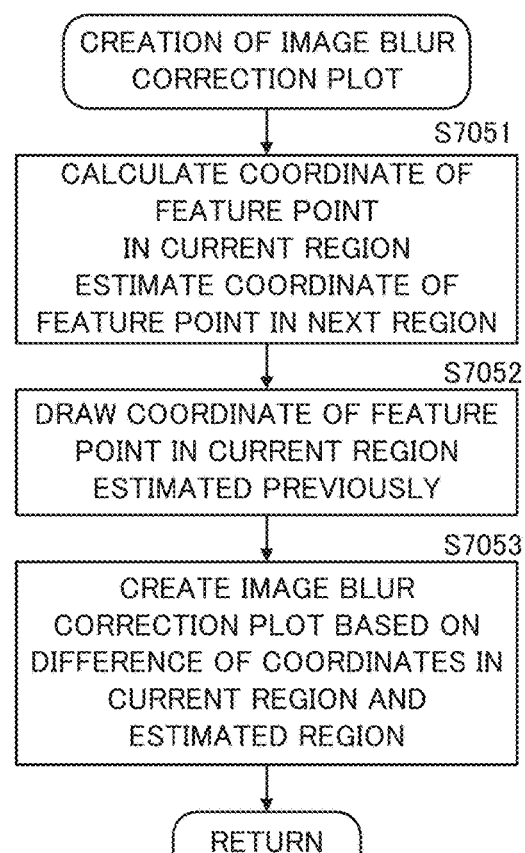

FIG. 7G is a subroutine in the creation of the image blur correction plot at step S705. First, at step S7051, as described referring to FIGS. 3A to 3E, the image information calculating unit 16 obtains the coordinate of the feature point in the current region based on the image signal read in the current region, and also it estimates a coordinate of the feature point in a region to be subsequently read based on the feature point distribution in FIG. 3B. For example, in FIG. 3C, it is assumed that the feature point coordinate calculating unit 16b obtains the coordinate of the feature point 33a based on the image signal in the current region 35a. In this case, the feature point coordinate estimating unit 16c estimates the feature point in the region 35b to be subsequently read based on the relationship between the coordinates of the feature points 33a and 33b in the feature point distribution (detected at step S702) in FIG. 3B. Then, the image information calculating unit 16 stores the estimated feature point in the temporary memory unit 16f.

Subsequently, at step S7052, the image information calculating unit 16 draws (reads) the coordinate of the feature point estimated at previous step S7051 from the temporary memory unit 16f. Hereinafter, a method of estimating the coordinate of the feature point 33a in the first readout region as the region 35a in a frame will be described. When the feature point in the first region in a frame is to be estimated, the coordinate 33d of the feature point in the last region read in the previous frame (for example, the region 35d of FIG. 3B in a previous frame) is used. In other words, when previous step S7051 has passed, the last region in the previous frame has been read and the coordinate of the last feature point is obtained by using the last region. Then, the coordinate of the feature point of the first region in the next frame (for example, the coordinate of the feature point 33a in the region 35a in the next frame) can be estimated based on the coordinate of the last feature point and the feature point distribution of FIG. 3B.

Subsequently, at step S7053, the image information comparing unit 16d compares the coordinate of the feature point at the current time obtained at step S7051 with the coordinate of the feature point located at the same position estimated at the previous readout time drawn at step S7052 to acquire the image blur correction plot. When passing through steps S7051 to S7053 in the next cycle, the image information comparing unit 16d compares the coordinates of the feature points 33b and 33b' (FIGS. 3C and 3D) estimated at step S7051 in the previous cycle and the current cycle to acquire the image blur correction plot. After the image blur correction plot is acquired at step S7053, this subroutine is finished and the flow proceeds to step S706.

As described above, the image blur correction plot can be acquired based on the different coordinates of the feature points in one frame, and it is possible to perform the image blur correction in this frame. The different coordinates of the feature points are for example the feature points 33a and 33b as describe referring to FIGS. 3A to 3E. Based on the coordinate of the feature point 33a, the coordinate of the feature point 33b included in a next region at that time is estimated, and then the estimated coordinate of the feature point 33b is compared with the coordinate of the feature point 33b included in the region subsequently read to acquire the image blur correction plot.

As described above, the example of performing the image blur correction by using the plurality of feature points in one frame is described referring to FIGS. 2 to 7A-7G. Next, an example of performing focusing (focus adjustment) by using a plurality of focus state detection units in one frame will be described.

Figure 8A:
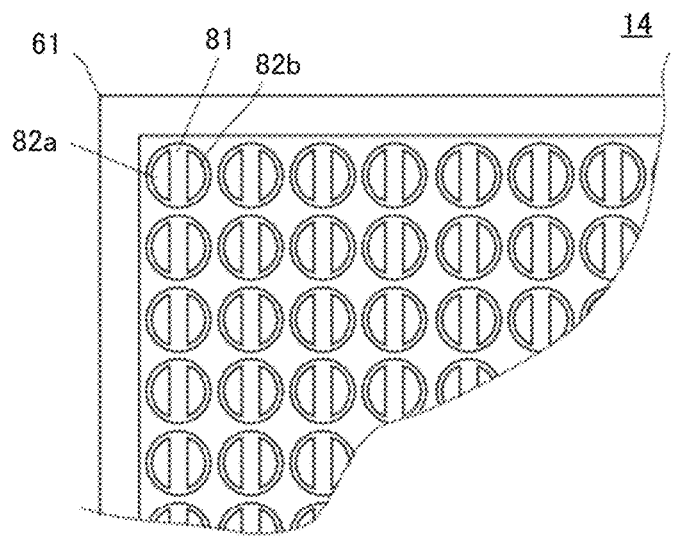
FIGS. 8A and 8B are explanatory diagrams of a focus detection structure and focusing in the first embodiment.
Figure 8B:
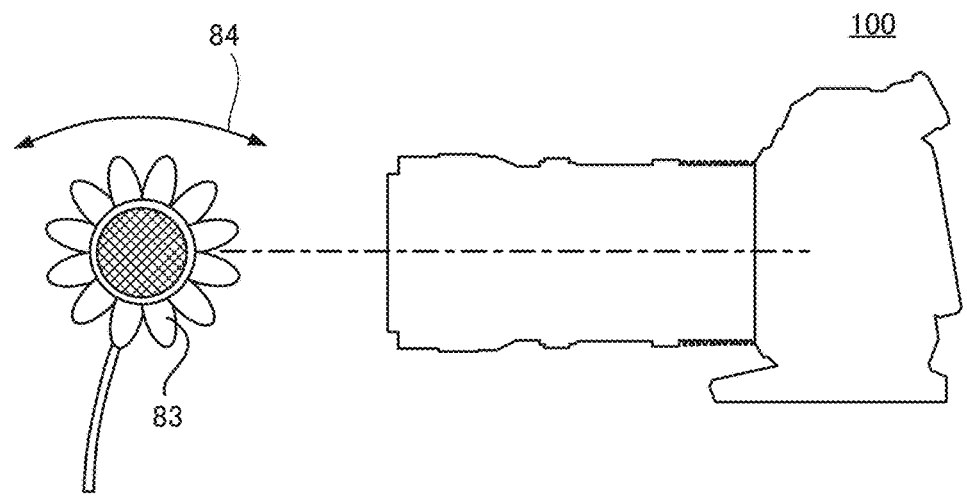

FIGS. 8A and 8B are explanatory diagrams of a focus detection structure and focusing in this embodiment, respectively. FIG. 8A is an enlarged view of some pixels that constitute the image pickup device 14. Each pixel includes a common microlens 81 and two photoelectric conversion elements 82a and 82b provided under the microlens 81. Accordingly, light beams from the image pickup optical system 12 pass through the respective regions of the common microlens 81 different from each other, and they enter the photoelectric conversion elements 82a and 82b, respectively. In other words, the light beams passing through pupil regions of the image pickup optical system 12 different from each other are incident on the photoelectric conversion elements 82a and 82b. The photoelectric conversion elements 82a and 82b in each pixel group constituted as described above are correlated with each other, and accordingly it is possible to detect the focus state of the image pickup optical system 12. This is a known technology as a focus state detection method by a phase-difference detection method using an imaging-plane pixel, and it can perform the focusing by drive control of the focus lens 12b based on the focus state detected on the imaging plane. With respect to each pixel of the image pickup device 14, the pairs of photoelectric conversion elements described above are arranged on an entire surface, and accordingly the focus state can be detected at all points on a photographing screen (i.e., captured image). For example, as illustrated in FIG. 8B, a case in which an object 83 that swings in the wind in a direction indicated by an arrow 84 is to be photographed by the image pickup apparatus 100 (camera) is considered.

FIGS. 9A to 9D are explanatory diagrams of the focusing in this embodiment. FIG. 9A illustrates a photographing composition in the image capturing condition illustrated in FIG. 8B, and there is an object to be focused at the range-finding frames 93a1 to 93d2 for the main object 83. These range-finding frames correspond to the image information extraction ranges. As illustrated in FIG. 9A, the range-finding frames 93a1 to 93d2 are included in the regions 92a to 92d, and there is no object to be focused at the range-finding frames 93e1 and 93e2 in the region 92e.

With respect to the photographing composition of FIG. 9A, FIG. 9B illustrates a situation in which the in-focus state is detected by reading each image signal in one frame and the drive control of the focus lens 12b is performed. In each of the frames 91, 92, 93, and 94 divided into the plurality of regions "a" to "e" in the direction of the imaging-plane height, a plurality of focus correction plots 91a' to 94e' are obtained based on an instruction of the signal readout unit 15. In FIG. 9B, a horizontal axis indicates a time, and an accumulation time for one frame is a time period 96, and for example it is 1/30. In FIG. 9B, a vertical axis indicates a position (imaging-plane height) in a height direction of an image obtained in each frame, and it is a diagram of a rolling readout in an image pickup element having a so-called CMOS structure. The vertical axis also indicates an amount (focus correction amount) which is used to perform the focus correction.

Each of the image signals in the regions 91a to 91e is read after the passage of the accumulation time period. Accordingly, the superimposition of the noise can be suppressed compared with a conventional technology which reads image signals in the middle of the accumulation. While a time delay occurs in the readout of each image signal as illustrated in the drawing, a time change in the focus state can be densely acquired by using this delay. In other words, the image information calculating unit 16 obtains the focus state occurring during this time delay by using the range-finding frames (93a1 to 93d2) included in the image information of each of the regions 91a to 91e. Specifically, the image information calculating unit 16 detects an average focus state based on each of the image signals of the range-finding frames 93a1 and 93a2 included in the region 91a, and subsequently it detects an average focus state based on each of the image signals of the range-finding frames 93b1 and 93b2 included in the region 91b. By repeating the process, the focus state at each time is detected.

With respect to the region 91e in which there is not any object to be focused, the image information complementing unit 16e obtains the focus state by prediction processing. For example, plots 91e', 92e', 93e', and 94e' indicating focus states in the region 91e are predicted by using an adaptive filter or the like based on the plots 91a' to 94d' indicating focus states. As described above, the plot indicating the focus state at the readout time in the region where there is no object to be focused is complemented. The adjusting unit 17 outputs the target adjustment value of the focus lens 12b. This target adjustment value is determined depending on a focus correction waveform 95 obtained by the focus correction plots 91a' to 94e' indicating the focus state, a focal length of the image pickup unit, object distance information, an optical sensitivity of the focus lens 12b, and a position and a panning situation of the image pickup apparatus. The drive unit 18b drives, based on a signal of the adjusting unit 17, the focus lens 12b during capturing a frame image in which the signal readout is performed to correct a change of focus. As described above, in this embodiment, the image blur correction plots indicating many focus states in one frame are obtained, and therefore it is possible to perform a dense focus correction. Furthermore, since each of the focus correction signals obtained from each range-finding frame is obtained after the image signals are accumulated, the superimposition of the noise can be effectively reduced.

FIG. 9C illustrates a state in which a proportion of the main object 83 in a screen 91 is smaller than that of the composition in FIG. 9A. In this case, a region including the range-finding frames 93a1 to 93e2 of the main object 83 (region where there is an object to be focused) is smaller than FIG. A. Accordingly, it is necessary to read the image signals of the image information extraction ranges in this region uniformly in one frame. Therefore, the image information distribution detecting unit 16a selects the range-finding frames 93a1 to 93e2 as image information extraction ranges (focus state detection frames). Then, it divides the region where there is no object to be focused into regions 94a to 94e having the same number as that of the regions 92a to 92e including the range-finding frames where there is an object to be focused. Then, based on the setting of the image information distribution detecting unit 16a, the signal readout unit 15 alternately reads the region where there is the object to be focused and the region where there is no object to be focused.

FIG. 9D illustrates image signals in each region and a focus correction waveform obtained by the image signals while the readout order is changed as described above. In this embodiment, image signals in gray regions 917a to 923e including the range-finding regions 93a1 to 93e2 selected by the image information distribution detecting unit 16a and image signals in white regions 918a to 924e including the unselected range-finding frames (range-finding frames where there is no object to be focused) are read alternately. In this case, since the focus correction plots are distributed uniformly, and accordingly a highly-accurate focus correction waveform 926 is obtained. Gray plots 925a to 925c are focus correction plots which are predictively complemented by the image information complementing unit 16e by using a known technology such as a Kalman filter, and the focus correction plots obtained from the image signals are uniformly distributed at narrow intervals. Accordingly, the prediction accuracy can also be improved. By driving the focus lens 12b based on the focus correction waveform 926 obtained as described above, it is possible to perform the focus correction while finely following a moving object such as a flower swinging in the wind and a person riding on a swing.

FIGS. 10A and 10B are a flowchart of the focusing and an explanatory diagram of focus detection in this embodiment, respectively. FIG. 10A is the flowchart of the focusing described above, and for a simple explanation, elements which are not directly relevant to this embodiment are omitted. This flow starts when for example a user performs a photographing preparation operation such as a half-press of a release button provided on a camera and the operating unit 112 outputs an instruction for the photographing preparation to the CPU 111, and it is finished when the instruction for the photographing preparation is canceled.

First, at step S1001, the image information distribution detecting unit 16a selects a range-finding frame (focus detection frame) in an image as an image information extraction range based on the image obtained by the image processing unit 19 or the image information calculating unit 16. The range-finding frame is selected, for example, by setting an object closest to the camera in FIG. 9C and setting an image region capturing a main object as a range-finding frame used for focusing. The range-finding frames are set uniformly to the image (screen) upward and downward. This is because sampling intervals of image signals corresponding to the range-finding frames are unbalanced during the image readout if the range-finding frames are set to be concentrated in one region (a predetermined region) in the screen.

Subsequently, at step S1002, the signal readout unit 15 sets a readout order. If the range-finding frames set over the entire image are distributed uniformly, the signal readout unit 15 reads image signals in order from the upper side toward the lower side of the image. On the other hand, when the set range-finding frames are concentrated in a predetermined region, as described referring to FIG. 9D, the signal readout unit 15 changes the readout order to set the sampling of the image signals to be approximately the same intervals. Subsequently, at step S1003, the signal readout unit 15 reads the image signals for each region in the readout order set at step S1002. Subsequently, at step S1004, the image information calculating unit 16 detects a focus state of the read image signals for each region, and it creates a focus correction plot based on an instruction of the signal readout unit 15. As described above, when the focus state detection is performed by using the phase difference, image signals of a plurality of pixels in the range-finding frame set in the region are used.

FIG. 10B is an explanatory diagram of the focus state detection by a phase-difference detection method. A plurality of pixels 1002 to 1009 are provided in the range-finding frame 1001. The image information comparing unit 16d compares a shift amount between an image signal 1010a that is formed by signals of photoelectric conversion elements 1002a to 1009a constituting the respective pixels and an image signal 1010b that is formed by signals of photoelectric conversion elements 1002b to 1009b. If peaks 1011a and 1011b of the respective two image signals 1010a and 1010b coincide with each other, the focus state is a state of focusing on an object (in an in-focus state). On the other hand, if the peaks 1011a and 1011b are shifted from each other as indicated by an arrow 1012, a focus correction value is obtained depending on the shift amount. Since the plurality of range-finding frames are set in one region, focus correction values obtained in the respective range-finding frames are averaged to be set as a focus correction value in the region. The focus state detection is not limited to the method of using the phase difference, but it is possible to evaluate the focus state by using a contrast value of an image. Also in this case, it is possible to perform the focus correction using a change of the contrast value in the set range-finding frame.

Subsequently, at step S1005 in FIG. 10A, the adjusting unit 17 creates a target adjustment value for focus correction (i.e., target focus correction value) based on the focus correction plot created at step S1004. Subsequently, at step S1006, the drive unit 18b drives the focus lens 12b based on the target adjustment value created by the adjusting unit 17 at step S1005. Subsequently, at step S1007, the signal readout unit 15 reads image signals in the next region. Subsequently, at step S1008, the signal readout unit 15 determines whether the image signals in the necessary regions for the image formation in one frame are read out. If the readout of the image signals is completed, the flow proceeds to step S1009. On the other hand, if any region to be read in one frame remains, the flow returns to step S1003, and repeatedly image signals are read out to perform the focus correction based on the signals.

Subsequently, at step S1009, the process proceeds to the next frame. Subsequently, at step S1010, the image processing unit 19 or the image information calculating unit 16 determines whether a composition of the image (screen) is changed. If the composition is not changed, the flow returns to step S1003, and for the next frame, the signal readout unit 15 reads image signals with the condition set at step S1001. On the other hand, if the composition is changed, the flow returns to step S1001, and the image information distribution detecting unit 16a sets the range-finding frame and the readout order again.

As described above, the focus correction plot can be obtained from the different range-finding frames in one frame and the focus correction can be performed in this frame. The different range-finding frames are for example the range-finding frames 93a1 to 93d2 as described referring to FIG. 9A. Thus, in this embodiment, the image pickup apparatus 100 includes the image pickup device 14 and the signal readout unit 15 that reads the image in one frame obtained from the image pickup device 14 while dividing the image into a plurality of different regions (for example, regions 21a to 21e). Furthermore, the image pickup apparatus 100 includes the image information calculating unit 16 that calculates image information (blur correction plots 21a' to 21e', focus correction plots 91a' to 91d', and the like) based on image signals in each of the different regions obtained from the signal readout unit 15. In addition, the image pickup apparatus 100 includes the adjusting unit 17 that creates a target adjustment value of an image pickup unit during capturing the frame based on each of pieces of image information calculated by the image information calculating unit 16. Furthermore, the image pickup apparatus 100 includes the drive unit 18 (18a, 18b) that drives the image pickup unit (such as the blur correction lens 12a, the focus lens 12b, and the image pickup device 14) based on a signal of the adjusting unit 17.

The image information calculating unit 16 includes the image information distribution detecting unit 16a that selects the image information extraction range (such as the feature point 33a) where the image information is to be extracted in one frame and that detects the distribution of the selected image information extraction range. Furthermore, the image information calculation unit 16 includes the feature point coordinate calculating unit 16b that obtains the coordinate of a first image information extraction range (first feature point) at the readout time of a first image signal from the image signals. In addition, the image information calculation unit 16 includes the feature point coordinate estimating unit 16c that estimates the coordinate of a second image information extraction range (second feature point) different from the first feature point based on the coordinate of the first image information extraction range calculated by the feature point coordinate calculating unit 16b. Furthermore, the image information calculating unit 16 includes the image information comparing unit 16d that compares the coordinate of the second image information extraction range estimated by the feature point coordinate estimating unit 16c with the coordinate of the second image information extraction range calculated by the feature point coordinate calculating unit 16b. The coordinate of the second image information extraction range calculated by the feature point coordinate calculating unit 16b is calculated at the readout time of a second image signal after the passage of a predetermined time period from the readout time of the first image signal.

The signal readout unit 15 reads a region including the image information extraction range (such as the feature point 33a and the range-finding frame 93a1 capturing an object to be focused) with priority. For details, the signal readout unit 15 performs the decimating readout for regions other than the region including the image information extraction range, or changes the readout order based on the distribution of the image information extraction range. The image information distribution detecting unit 16a averages the coordinates of the same image information extraction ranges (i.e., corresponding image information extraction ranges) read in a plurality of frames (for example, the frames 51, 52, and 53) to detect the distribution of the image information extraction ranges. Furthermore, the image information distribution detecting unit 16a detects a distribution of each image information extraction range detected in one frame based on a change of the coordinates of the same image information extraction ranges (i.e., corresponding image information extraction ranges) read in the plurality of frames.

The signal readout unit 15 reads the region including the image information extraction range at approximately constant intervals in one frame based on the distribution of the image information extraction range. Furthermore, the signal readout unit 15 reads a region (each of regions 65a to 65e) which includes the image information extraction range and a region (each of regions 66a to 66e) which does not include the image information extraction range approximately alternately. In addition, the signal readout unit 15 divides each of the region which includes the image information extraction range and the region which does not include the image information extraction range into regions having approximately the same number, and it reads each of the divided regions approximately alternately.

The image information calculating unit 16 includes the image information complementing unit 16e that complements image information of an image information lacked portion based on the obtained image information (such as the image blur correction plots 21a' to 24e' and the focus correction plots 91a' to 91e'). By using the image information, the image pickup unit can be controlled by a plurality of image signals in one frame, and accordingly it is possible to perform the correction with high response. In addition, the image information is obtained by using the different image signals in one frame, and accordingly a noise that is superimposed on an image can be effectively reduced compared with a conventional technology which repeatedly reads the same image signal in a non-destructive method.

Second Embodiment

Next, a second embodiment of this embodiment will be described. While the plurality of feature points in a frame are compared to calculate the image blur correction plots in the first embodiment, the same feature points (i.e., corresponding feature points) between a plurality of frames are compared to obtain the image blur correction plots in this embodiment. By repeating this operation for a plurality of different image signals in one frame, the plurality of image blur correction plots are calculated in a time during which the frame is captured, and as a result a correction with high response is achieved.

Figure 11:
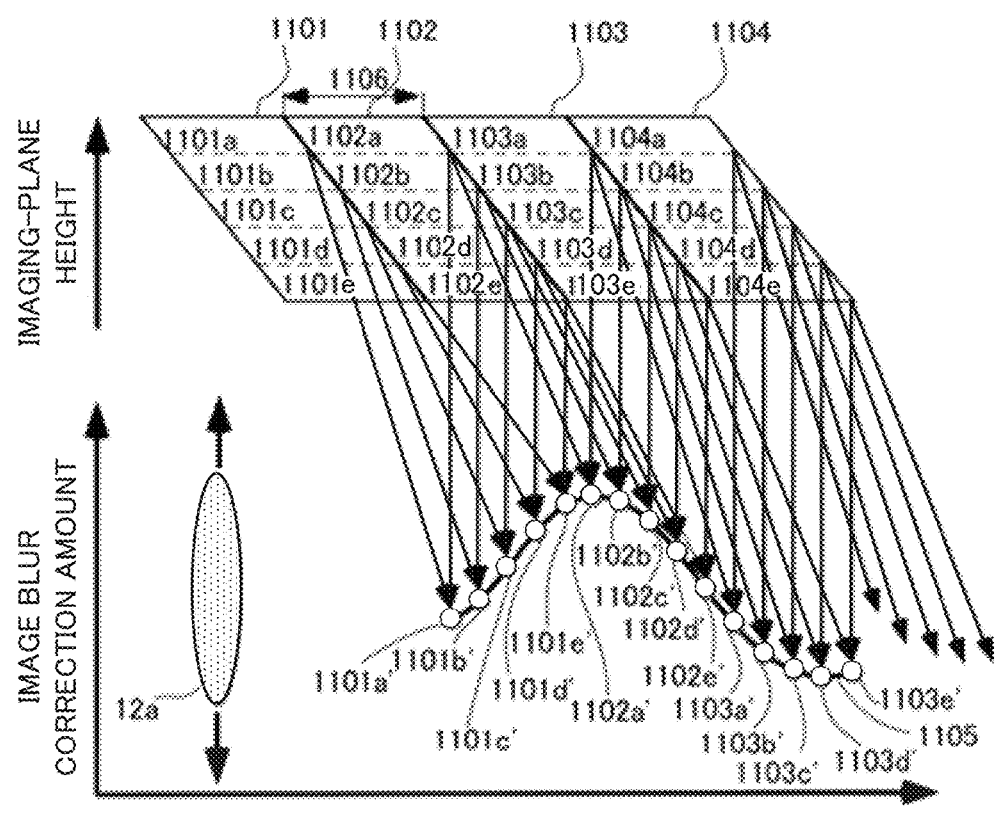
FIG. 11 is an explanatory diagram of a signal readout in a second embodiment.

FIG. 11 is an explanatory diagram of the readout of image signals in this embodiment. In FIG. 11, image blur correction plots 1101a' to 1103e' are obtained from each of frames 1101, 1102, 1103, and 1104 which is divided into a plurality of regions "a" to "e" in a direction of an imaging-plane height based on an instruction of the signal readout unit 15. In FIG. 11, a horizontal axis indicates a time, and an accumulation time for one frame is a time period 1106 and for example it is 1/30. In FIG. 11, a vertical axis indicates a position in the height direction (imaging-plane height) of an image obtained in each frame, and FIG. 11 is a diagram of a rolling readout in an image pickup element with a so-called CMOS structure. Furthermore, the vertical axis indicates an amount of correcting a blur occurring in an image plane.

Each of the image signals in the regions 1101a to 1101e is read after the passage of the accumulation time period. Image signals 1102a to 1102e in the subsequent frame is read with a delay corresponding to one frame (for example 1/30). Then, a coordinate of an image information extraction range (feature point in the region 1101a selected by the image information distribution detecting unit 16a) obtained from image signals in the region 1101a is compared with a coordinate of the same feature point obtained from image signals in the region 1102a. As a result, an image shift amount (blur amount) on the imaging plane occurring in one frame can be obtained. The image blur correction plot 1101a' is obtained based on the image shift amount. Similarly, by continuing the comparison of the same feature points between a plurality of frames such as between the regions 1101b and 1102b, and between the regions 1101c and 1102c, the image blur correction plots 1101b' to 1103e' are obtained.

An image blur correction waveform 1105 is obtained based on the image blur correction plots 1101a' to 1103e' obtained as described above. Since the image blur correction plots obtained by the comparison of the same feature points between the frames have wide sampling intervals each other, it is difficult to perform the image blur correction with high accuracy. Accordingly, in this embodiment, a correlation of different feature points in a frame is also used to improve the accuracy of the image blur correction.

Figure 12A:
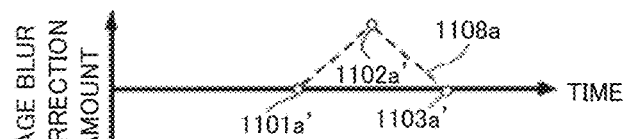
FIGS. 12A to 12N are explanatory diagrams of a relationship of image information extraction ranges in the second embodiment.
Figure 12B:
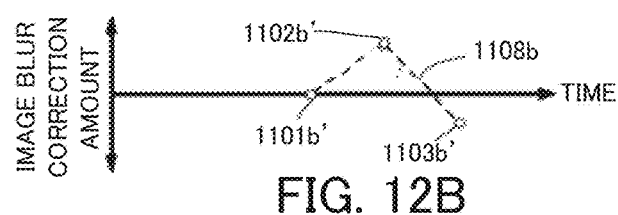
Figure 12C:
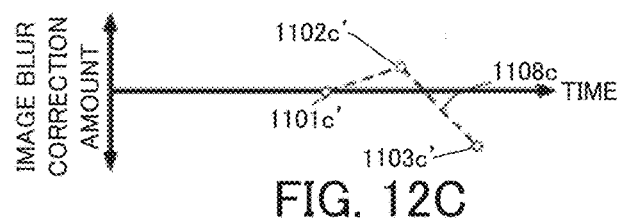
Figure 12D:
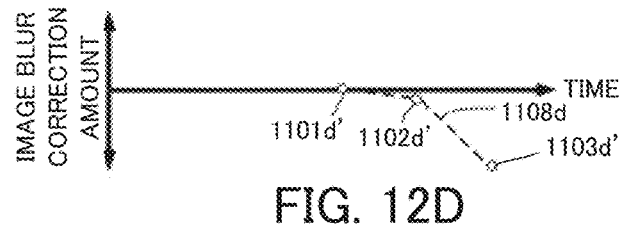
Figure 12E:
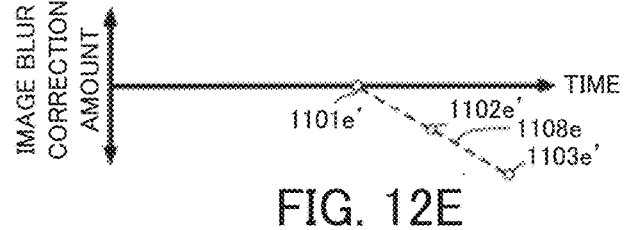
Figure 12F:
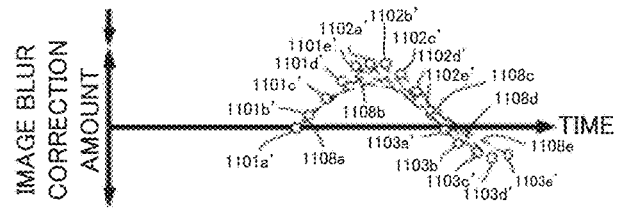
Figure 12G:
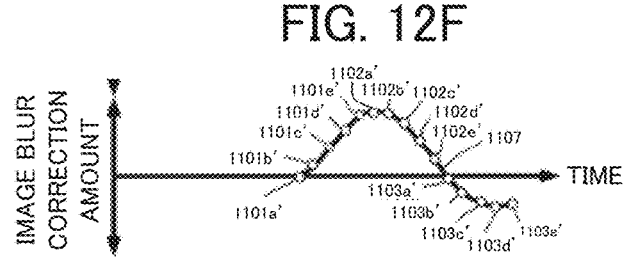
Figure 12H:
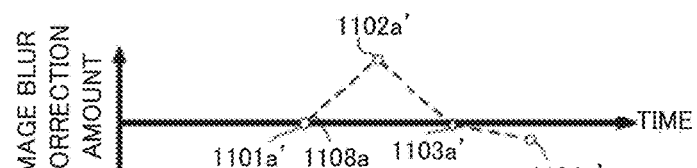
Figure 12I:
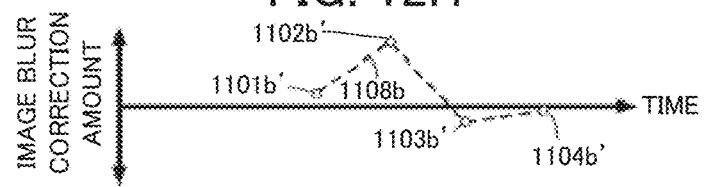
Figure 12J:
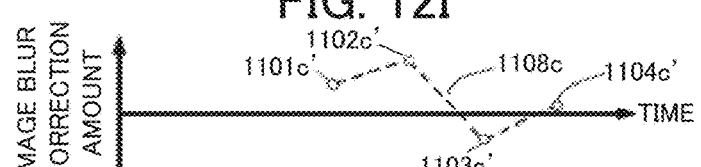
Figure 12K:
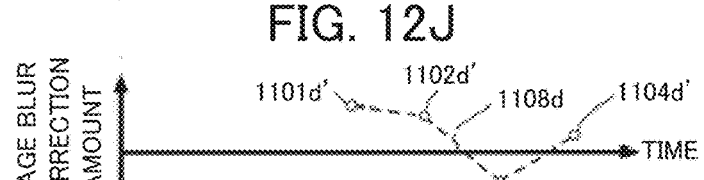
Figure 12L:
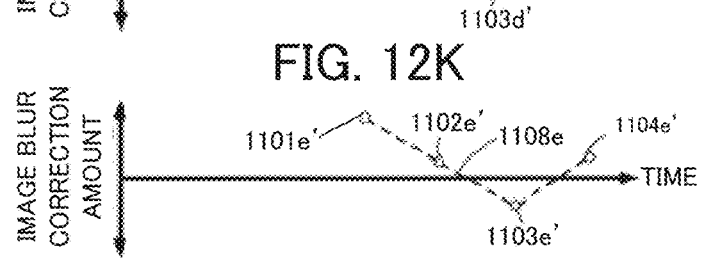
Figure 12M:
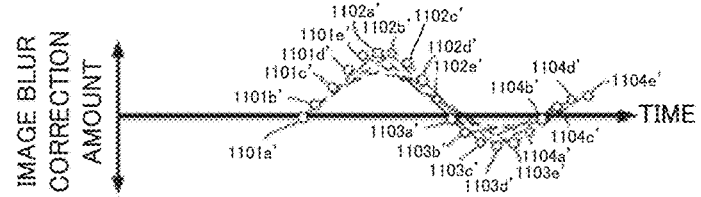
Figure 12N:
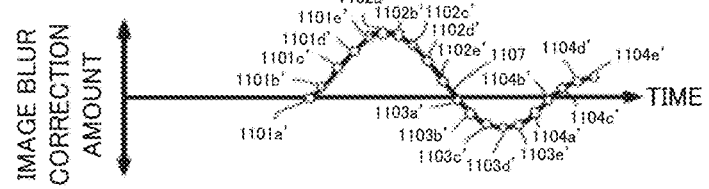

FIGS. 12A to 12N are explanatory diagrams of the relationship of the image information extraction ranges in this embodiment, and they illustrate graphs of improving the accuracy of the image blur correction. In each of FIGS. 12A to 12N, a horizontal axis indicates a time, and a vertical axis indicates an image blur correction amount. FIG. 12A illustrates a comparison waveform 1108a obtained from image signals in regions 1101a, 1102a, 1103a, and 1104a. FIG. 12B illustrates a comparison waveform 1108b obtained from image signals in regions 1101b, 1102b, 1103b, and 1104b. FIG. 12C illustrates a comparison waveform 1108c obtained from image signals in regions 1101c, 1102c, 1103c, and 1104c. FIG. 12D illustrates a comparison waveform 1108d obtained from image signals in regions 1101d, 1102d, 1103d, and 1104d. FIG. 12E illustrates a comparison waveform 1108e obtained from image signals in regions 1101e, 1102e, 1103e, and 1104e.

The comparison waveforms 1108a to 1108e have initial values as image blur correction plots 1101a', 1101b', 1101c', 1101d', and 1101e', respectively. Subsequently, the comparison waveform 1108b overlaps with the comparison waveform 1108a. In this case, the comparison waveform 1108b overlaps with reference to the comparison waveform 1108a such that a correlation of both the waveforms is highest. For example, a method of overlapping the waveforms such that an absolute value of an area surrounded by both the waveforms is minimized is adopted. Subsequently, with reference to the comparison waveform 1108b overlapped with the comparison waveform 1108a, the comparison waveform 1108c overlaps with the waveform. By repeating the processing, as illustrated in FIG. 12F, image blur correction plots 1101a' to 1103e' are arranged. By connecting the image blur correction plots 1101a' to 1103e', as illustrated in FIG. 12G, an image blur correction waveform 1107 can be obtained.

As above, since each of the comparison waveforms are obtained and then the correlation of them is obtained, the time delay increases by the time required for obtaining the waveforms and the time required for calculating the correlation if the image blur correction is performed by using the correlation. In order to perform the image blur correction with small time delay in reality, the image blur correction plot is obtained for each feature point by using a relative coordinate of different feature points in one frame obtained in FIGS. 12A to 12G. Specifically, a change of the same feature point in the next frame with respect to a position of the image blur correction plot 1103a' in FIG. 12G is obtained, and similarly a change of the same feature point in the next frame with respect to a position of the image blur correction plot 1103b is obtained. FIGS. 12H to 12J illustrate the processing in detail. After each of the comparison waveforms 1108a to 1108e overlaps at an appropriate position in FIG. 12F, each of the comparison waveforms are separated again as illustrated in FIGS. 12H and 12I while the position is maintained. Then, the same feature points between frames are compared for each feature point. In other words, in FIG. 12H, image signals of the region 1104a in the frame 1104 are compared with image signals obtained in the next frame to obtain its change amount, and furthermore the change amount is added with reference to the image blur correction plot 1103a' to obtain the image blur correction plot 1104a'. Each of the comparison waveforms obtained by repeating the similar operations until FIG. 12L is synthesized again to obtain FIG. 12M. Then, based on the newly obtained image blur correction plots 1104a' to 1104e', an image blur correction waveform 1107 is obtained as illustrated in FIG. 12N.

As described above, if the relative coordinate of each feature point in a frame can be obtained once, the image blur correction plots between frames may overlap while its relationship is maintained after that, and the correlation of the comparison waveforms is not necessary. Accordingly, it is possible to perform a highly-accurate image blur correction using many image blur correction plots without a time delay. This embodiment is not limited to the method of obtaining the relationship of the different feature points in one frame described above based on the correlation of the comparison waveforms obtained between frames, and as described referring to FIGS. 4A, 4B, 5A, and 5B, the method of obtaining the distribution of the feature points in advance is also applicable. Since the relationship of the respective feature points in one frame is known in FIGS. 4A, 4B, 5A, and 5B, each feature point in a first frame may be set as an initial value and a change of the feature point between frames may be added to the initial value.

Figure 13:
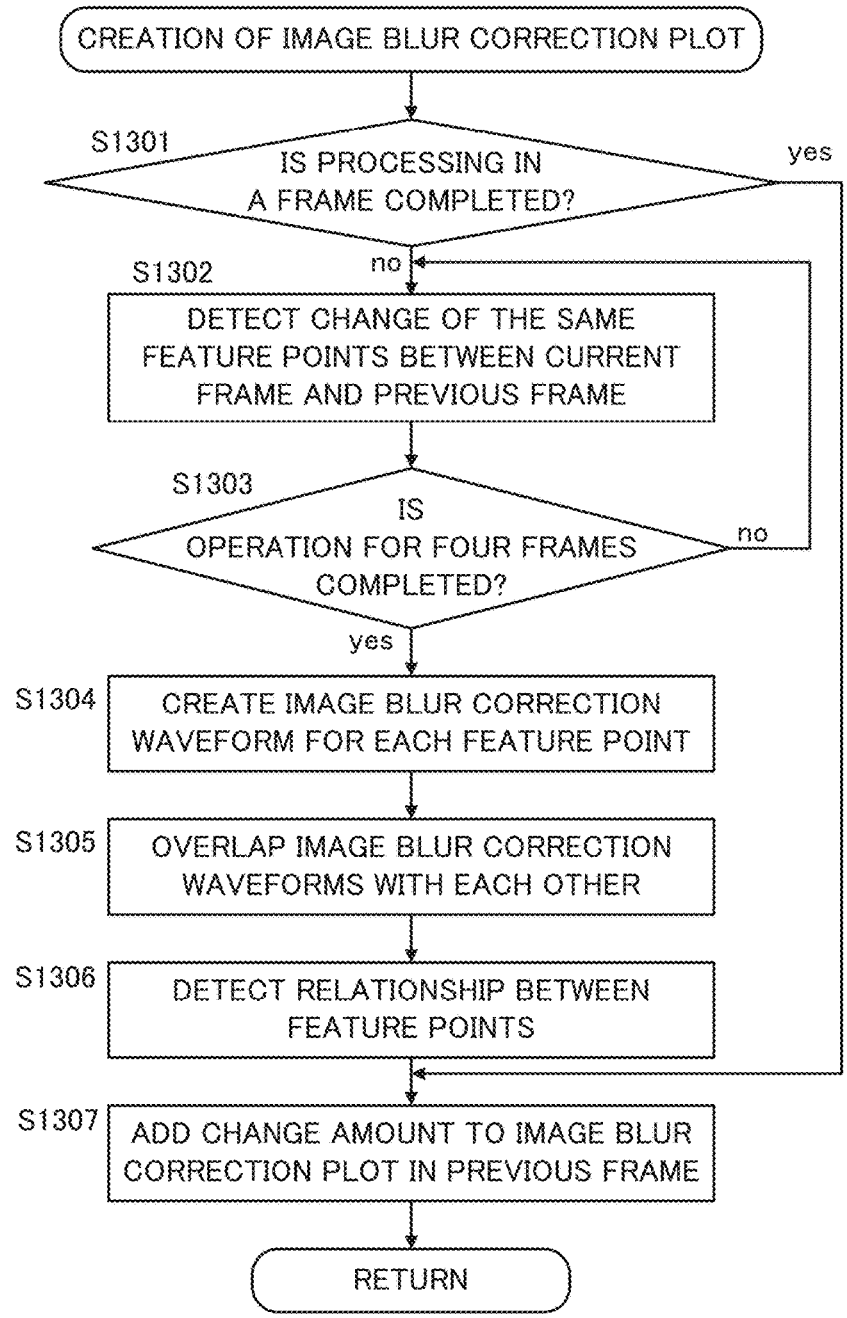
FIG. 13 is a flowchart of creating an image blur correction plot in the second embodiment.

FIG. 13 is a flowchart of creating the image blur correction plot in this embodiment, and it illustrates a subroutine in creating the image blur correction plot at step S705 of FIG. 7A. First, at step S1301, the image information calculating unit 16 determines whether a relationship of the image blur correction plots in one frame described referring to FIGS. 12A to 12G has been already obtained. If the relationship of the image blur correction plots has been already obtained, the flow proceeds to step S1307. On the other hand, if the relationship of the image blur correction plots has not yet obtained, the flow proceeds to step S1302.

At step S1302, the image information comparing unit 16d obtains a change of the same feature points (image blur correction plots) in a previously-captured frame and a currently-captured frame. In this case, changes of a plurality of feature points of different regions in one frame with respect to the same corresponding feature points in the previous frame are obtained, and as a result, a plurality of image blur correction plots are obtained in one frame. Subsequently, at step S1303, the image information calculating unit 16 determines whether the operation of step S1302 is performed for four frames. If the operation is performed for the four frames, the flow proceeds to step S1304. On the other hand, if the operation is not yet performed for the four frames, the flow returns to step S1302 and the same operation is repeated. For example, the calculation of the image blur correction plot is repeated by using the frames 1101 to 1104 in FIG. 11.

At step S1304, the image information calculating unit 16 obtains comparison waveforms of FIGS. 12A to 12E based on the image blur correction plots obtained at steps S1302 and S1303. Subsequently, at step S1305, the image information distribution detecting unit 16a overlaps the comparison waveforms obtained at step S1304 each other to increase the correlation (FIGS. 12F and 12G). Subsequently, at step S1306, the image information distribution detecting unit 16a detects the relationship of the image blur correction plots obtained as a result of overlapping the waveforms at step S1305. Accordingly, the relationship of the image blur correction plots obtained from the different feature points in one frame can be recognized. Subsequently, at step S1307, the feature point coordinate calculating unit 16b adds a change amount of the feature point between the frames obtained by the comparison with the subsequent frame as described referring to FIGS. 12H to 12M to an initial value that corresponds to the relationship described above to obtain a subsequent image blur correction plot. When the subsequent image blur correction plot is obtained at step S1307, this subroutine is finished and the flow proceeds to step S706.

As described above, the feature point coordinate calculating unit 16b compares the plurality of image information extraction ranges between frames for each of the same image information extraction range (i.e., corresponding image information extraction ranges such as ranges included in the regions 1101a, 1102a, 1103a, and 1103a). Then, the feature point coordinate calculating unit 16b obtains the plurality of comparison waveforms (such as waveforms 1108a to 1108d) based on a result of the comparison, and it obtains a target adjustment value based on the relationship of the plurality of comparison waveforms. Specifically, the image information distribution detecting unit 16a obtains the relationship between the different image information extraction ranges (such as ranges included in the regions 1101a to 1101e) in one frame based on the plurality of comparison waveforms (such as waves 1108a to 1108d). The feature point coordinate calculating unit 16b obtains a target adjustment value in one frame for the subsequent frame based on the relationship between the different image information extraction ranges in one frame obtained by the image information distribution detecting unit 16a. As a result, the image pickup unit can be controlled by a plurality of image signals in one frame, and accordingly a correction with high response can be performed.

Third Embodiment

Next, a third embodiment of the present invention will be described. In this embodiment, a case in which photographing times (signal accumulation times) of a plurality of frames are different from each other will be described. The case in which the photographing times of the plurality of frames are different from each other means that for example a case in which a state (live view) in which an object is captured at the step of image capturing preparation is to proceed to a still image capturing or a case in which a brightness of the object is greatly changed during the live view or a moving image capturing. In this embodiment, especially a case of proceeding to the still image capturing will be described. In the moving image capturing or the live view, the image is captured by a short photographing time to some extent since the motion of the object is prioritized. On the other hand, in the still image capturing, it is preferred that more appropriate exposure control is performed to obtain an image with less noise. Accordingly, in many cases, an exposure time of the still image may be increased compared with a moving image (the photographing time of the still image may be decreased compared with the moving image in order to stop the motion of the object in some cases).

Figure 14A:
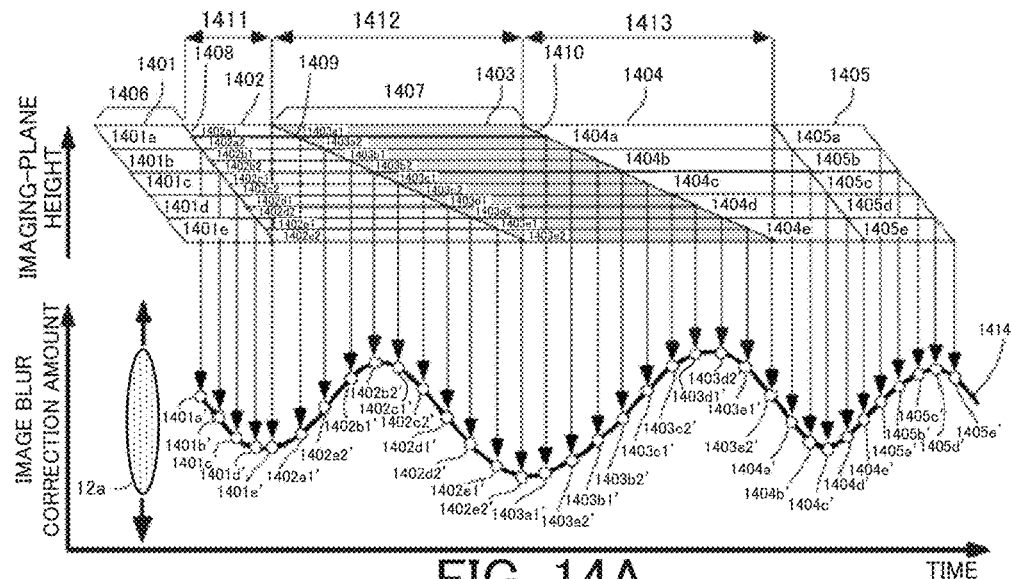
FIGS. 14A and 14B are explanatory diagrams of an operation of a signal readout unit for capturing a still image in a third embodiment.
Figure 14B:
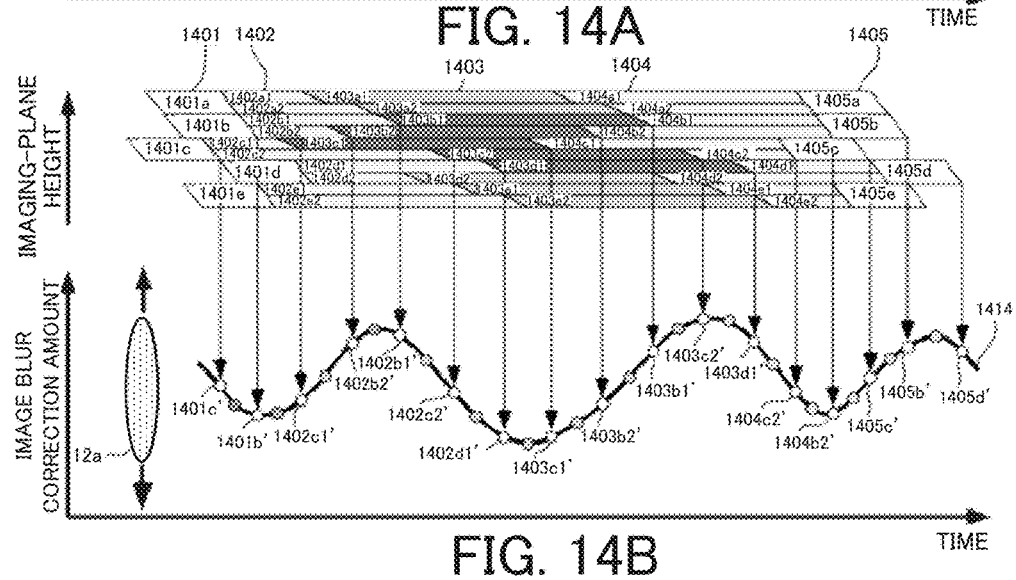

FIGS. 14A and 14B are explanatory diagrams of the operation of the signal readout unit which can be adapted to the still image capturing in this embodiment. Referring to FIG. 14A, a method of uniformly obtaining image information in one frame will be described by using an example of the image blur correction in the image capturing condition described above. Image blur correction plots 1401a' to 1401e' are obtained from regions 1401a to 1401e depending on the readout in a frame 1401. At this time, a signal accumulation time 1406 in one frame is for example 1/30 sec. In FIG. 14A, a signal readout time 1411 in this case is set to approximately the same as the signal accumulation time 1406, but this embodiment is not limited thereto. For example, a signal readout time 1411 may be set to be shorter than the signal accumulation time 1406.

In a frame 1402 in which the speed of the signal readout is fast, the signal accumulation time in the frame 1402 is set in order to perform the still image capturing in a next frame 1403. When a signal accumulation time 1407 which is suitable for the still image capturing is for example 1/10 sec, a signal readout time 1412 which is approximately the same as the time is set in the previous frame 1402. In other words, in the frame 1402, the setting time of the accumulation start scan is set according to a time 1411 of readout 1408 (for example, 1/30 sec) in the previous frame 1401, and a time 1412 of a readout 1409 is set to 1/10 sec. A region in the frame 1401 are divided (segmentalized) into regions in the frame 1402. This is because the time 1412 of the readout 1409 is longer than the time 1411 of the readout 1408 and an interval in which image signals are obtained by the same number of regions increases, and thus the complementation is needed. In other words, the image information distribution detecting unit 16a divides (segmentalizes) the readout region of an image prior to the still image capturing.

In FIG. 14A, regions of the frame 1402 are obtained by dividing each region of the frame 1401 into two equal parts to double the number of regions. Image blur correction plots 1402a1', 1402a2' to 1402e1', and 1402e2' are respectively obtained based on regions 1402a1, 1402a2 to 1402e1, and 1402e2 in the frame 1402. In the frame 1402, while the accumulation times of the regions 1402a1, 1402a2 to 1402e1, and 1402e2 are different from each other, it is not a problem since they are used to obtain the image blur correction plots based on the image signals instead of obtaining a viewing image.

Furthermore, the image information complementing unit 16e performs the gain-up and the gain-down processing of image signals depending a difference of the accumulation times in a frame in order to stabilize the image signals. As described above, in the frame 1402, the number of the regions to read image signals increases compared with the frame 1401, and accordingly it is necessary to add feature points. The added feature points are, as described referring to FIG. 7B, obtained by the image information distribution detecting unit 16a that adds remaining feature points previously detected as image information extraction ranges. As described above, the image blur correction plots are obtained to perform the image blur correction based on the image signals read in the frames 1401 and 1402. The way to obtain the image blur correction plots is the same as that in the first embodiment, and accordingly descriptions thereof are omitted. Also with respect to a frame 1403 in which a still image is to be captured, by using the same number of regions in the frame 1402, widening intervals for obtaining image signals is prevented.

The setting time of an accumulation start operation in the frame 1403 is set according to a time 1412 (for example, 1/10 sec) of readout 1409 in the previous frame 1402, and a time 1413 of readout 1410 is also set to the same speed (1/10 sec). Accordingly, the signal accumulation time 1407 in each region is adjusted (aligned). Then, image blur correction plots 1403a1', 1403a2' to 1403e1', and 1403e2' are obtained based on respective regions 1403a1, 1403a2 to 1403e1, and 1403e2 during the time 1413 along the signal readout 1410 for completion of signal accumulation in each region. Thus, the image blur correction is performed during the still image capturing.

As described above, each of the times 1412 and 1413 at which signals are read in the frame 1403 to perform the still image capturing and in the previous frame 1402 is set to have a length approximately the same as that of the signal accumulation time. As a result, a signal readout 1409 in the frame 1402 and a signal readout 1410 in the frame 1403 continuously start with the signal readout 1408 in the previous frame 1401, and accordingly the image signals can be obtained continuously during the still image capturing. In other words, the signal readout unit 15 changes a signal readout time according to the signal accumulation time required for the still image capturing (i.e., depending on the signal accumulation time). When the readout of the frame 1403 which is used to obtain the still image is completed, for the next frame 1404, the number of divided regions of the image and the readout time are restored to the same number of divided regions and the same readout time as those in the frame 1401. Then, image blur correction plots 1404*a*' and 1404*e*' are obtained from regions 1404*a* to 1404*e*. Furthermore, in a next frame 1405, image blur correction plots 1405*a*' and 1405*e*' are obtained from regions 1405*a* to 1405*e*. According to the operations described above, an image blur correction waveform 1414 can be obtained continuously from the frame 1401 prior to the still image capturing to the frame 1405 subsequent to the still image capturing, and thus it is possible to perform the image blur correction during the still image capturing. As above, the case in which the feature points are uniquely distributed in an image (screen) is described.

Next, as illustrated in FIG. 6A, a case in which the feature points are concentrated on the center of the image will be described. For example, it is assumed that the feature points are distributed in regions 1401*b*, 1401*c*, and 1401*d* in FIG. 14A. In this case, in order to obtain image blur correction plots at equal intervals, as described referring to FIG. 6C, it is necessary to change an order of the readout of regions. Referring to FIG. 14B, a change of the readout order in a case in which a situation proceeds from the live view to the still image capturing will be described. Each of frames, regions, and image blur correction plots in FIG. 14B are the same as those in FIG. 14A, and accordingly the same signs are indicated.

First, with respect to the frame 1401, the image information distribution detecting unit 16*a* sets the readout order of image signals of the image pickup device 14 by the signal readout unit 15 based on a detection result of the feature point distribution. If the feature points are concentrated in the regions 1401*b* to 1401*d*, the readouts of the regions are performed at approximately equal intervals during a total readout time. In other words, regions in which feature points are distributed and regions in which any feature points are distributed are read alternately in order from the region 1401*c* (with a feature point), the region 1401*a* (without any feature point), the region 1401*b* (with a feature point), the region 1401*e* (without any feature point), and the region 1401*d* (with a feature point). As described above, with respect to the frame 1401, image blur correction plots 1401*c*' and 1401*b*' are obtained based on the regions 1401*b* to 1401*d* depending on the readout. Black plots in FIG. 14B are, as described referring to FIG. 2, image blur correction plots which are predicted by the image information complementing unit 16*e* by using the adaptive filter or the linear prediction. For the same reason as that of FIG. 14A, the regions in the frame 1402 are obtained by dividing the region in the frame 1401. In addition, image signals are read from regions 1402*c*1, 1402*b*2, 1402*b*1, 1402*c*2, and 1402*d*1 to obtain image blur correction plots 1402*c*1', 1402*b*2', 1402*b*1', 1402*c*2', and 1402*d*1'.

Also with respect to the frame 1403 in which the still image is to be captured, by using the same number of regions in the frame 1402, widening intervals for obtaining image signals is prevented. Image signals are read from the regions 1403*c*1, 1403*b*2, 1403*b*1, 1403*c*2, and 1403*d*1 to obtain the image blur correction plots 1403*c*1', 1403*b*2', 1403*b*1', 1403*c*2', and 1403*d*1'. Thus, the image blur correction is performed during the still image capturing. When the readout of the frame 1403 for obtaining the still image is completed, also with respect to a next frame 1404, image signals are read from regions 1404*c*2 and 1404*b*2 by the same number of divided regions as that in the frame 1403 to obtain image blur correction plots 1404*c*2' and 1404*b*2'.

Figure 15A:
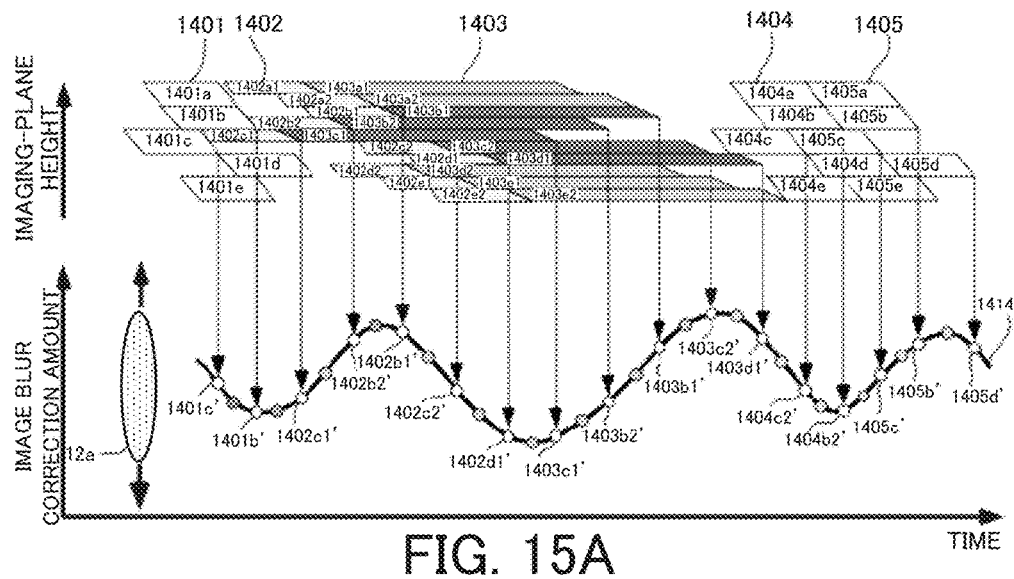
FIGS. 15A and 15B are explanatory diagrams of another operation of the signal readout unit for capturing the still image in the third embodiment.
Figure 15B:
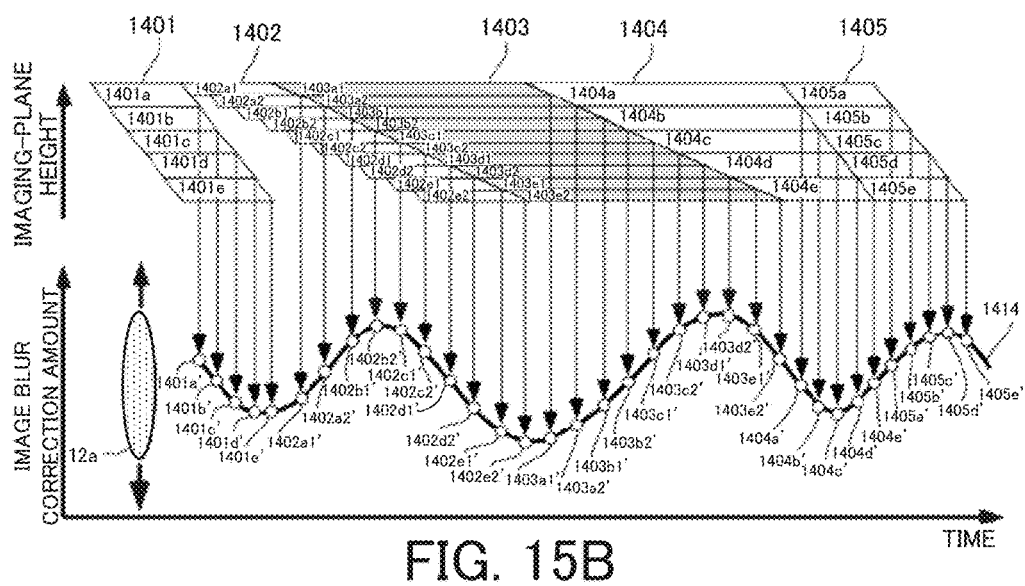

FIGS. 15A and 15B are explanatory diagrams of the operation of another signal readout unit which can be adapted to the still image capturing in this embodiment. Also with respect to the frame 1404, the readout region is divided since the frame 1404 is read continuously from the readout of each region in the frame 1403. However, as illustrated in FIG. 15A, by setting the frames 1403 and 1404 in a discontinuous manner once, the segmentalization of the divided regions can be avoided. In FIG. 15A, the readout between the frames 1401 and 1402*b* is also discontinuous, and thus an accumulation time of each of regions 1402*a*1 to 1402*e*2 can be adjusted (aligned). Since a blur amount during the accumulation time can be aligned by the adjustment of the accumulation time, image blur correction plots can be obtained with higher accuracy.

A method of accumulation like the frame 1402 in FIG. 15A can also be applied to FIG. 14A. Like the frame 1402 in FIG. 14A, even when the accumulation time increases in the readout order of image signals in the regions 1402*a*1 to 1402*e*2, the accumulation times can be aligned by adopting the configuration of the frame 1402 in FIG. 15B. As described above, the frame 1402 prior to the frame 1403 as a still image capturing frame is read discontinuously with the previous frame 1401, and accordingly the accuracy of the image blur correction can be improved. Furthermore, a frame 1404 subsequent to the frame 1403 as the still image capturing frame is read discontinuously with the previous frame 1403, and accordingly the segmentalization of regions can be avoided and also the readout load can be reduced.

Returning to FIG. 14B, in a frame 1405, image signals are read from regions 1405*c*, 1405*b*, and 105*d* to obtain image blur correction plots 1405*c*', 1405*b*', and 1405*d*', respectively. According to the operation, even if the feature points are concentrated on the center of the image or the like, an image blur correction waveform 1414 can be obtained continuously from the frame 1401 prior to the still image capturing to the frame 1405 subsequent to the still image capturing, and accordingly it is possible to perform the image blur correction during the still image capturing. As described above, while the way of adaption of the still image capturing during the still image capturing is described referring to FIGS. 14A to 15B, the focusing can also be performed by the similar processing.

Figures 16A, 16B:
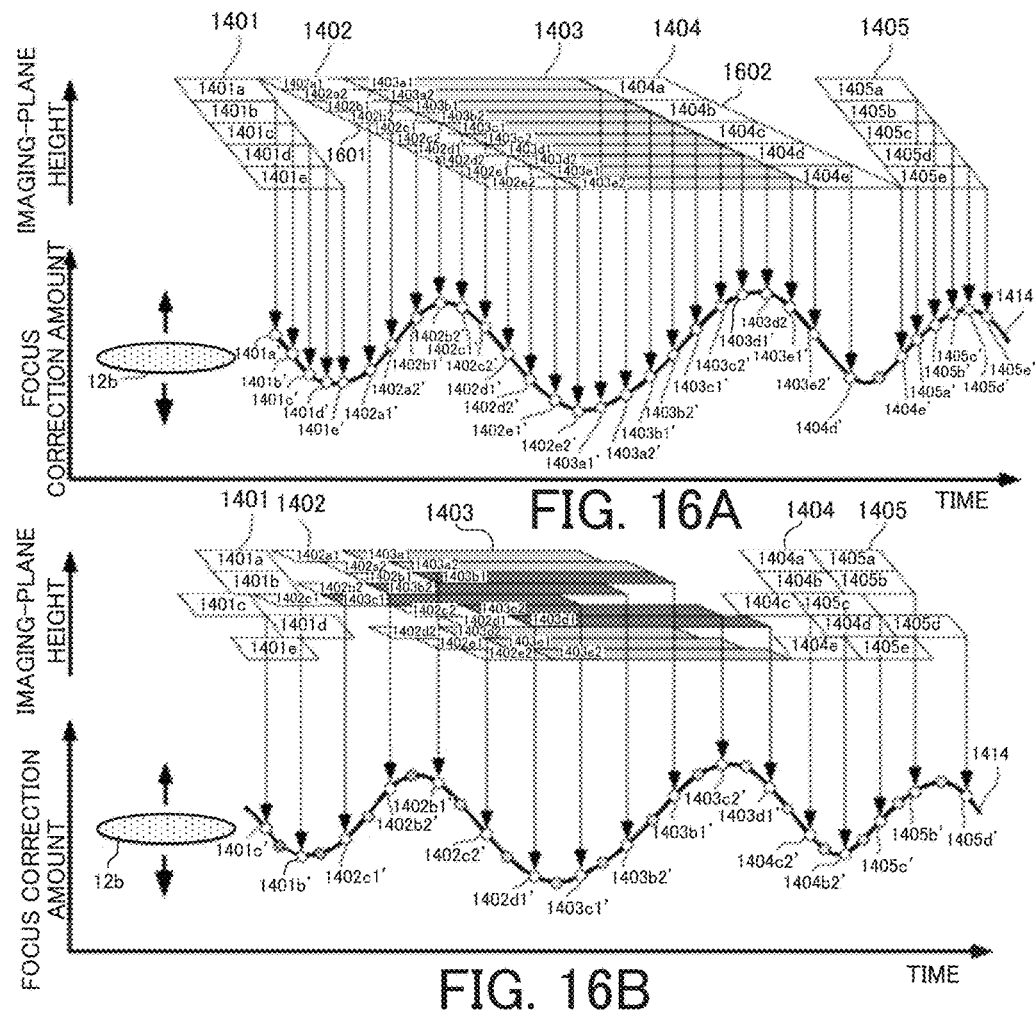
FIGS. 16A and 16B are explanatory diagrams of another operation of the signal readout unit for capturing the still image in the third embodiment.

FIGS. 16A and 16B are explanatory diagrams of the operation of another signal readout unit which can be adapted to the still image capturing in this embodiment. FIG. 16A is an explanatory diagram of the focusing, and as illustrated in FIG. 9A, processing on condition that the range-finding frames (range-finding frames in which an object to be focused exists) selected by the image information distribution detecting unit 16a are distributed on an entire image (screen) is illustrated.

The frames 1401, 1402, 1404, and 1405 are frames for the live view, and the frame 1403 is a frame for the still image capturing. Image signals are obtained from each region in each frame, and focus correction plots 1401a' to 1405e' indicating focus states in the respective regions are obtained based on information (for example, phase difference information) of the range-finding frames included in the region. The concept of the segmentalization of the region prior to the still image frame to complement the readout interval is similar to the image blur correction in FIGS. 14A to 15B. The signal readout unit 15 changes the signal readout time (readout speed) according to the signal accumulation time required for the still image capturing.

FIG. 16A is different from each of FIGS. 14A to 15B in an accumulation start scan 1601 (signal reset) in the frame 1402 and a speed of a readout 1602 in the frame 1404. However, this embodiment is not limited to the accumulation start scan 1601 and the readout 1602, and the accumulation start, and alternatively, the readout as illustrated in FIG. 14A or 15B may be adopted. As illustrated in FIG. 9C, if the range-finding frames selected by the image information distribution detection unit 16a are concentrated on the center of the image, the readout order is changed as illustrated in FIG. 16B and focus state detection signals are set to be obtained at approximately the same intervals. In other words, regions in which selected range-finding frames are distributed and regions in which the selected range-finding frames are not distributed are read alternately in order from the regions 1401c (with a selected range-finding frame), the region 1401a (without any selected range-finding frame), the region 1401b (with a selected range-finding frame), the region 1401e (without any selected range-finding frame), and the region 1401d (with a selected range-finding frame).

As described above, the focus correction plots 1401c' and 1401b' indicating the focus states are obtained from the regions 1401b to 1401d depending on the readout in the frame 1401. Black plots in FIG. 16B are, as described referring to FIG. 2, image blur correction plots which are predicted by the image information complementing unit 16e using the adaptive filter or the linear prediction. As an example illustrated in FIG. 16B, the readout order of the frame 1402 is changed from that in FIG. 16A, but this embodiment is not limited thereto and for example it may be configured as illustrated in FIG. 15A.

Figure 17:
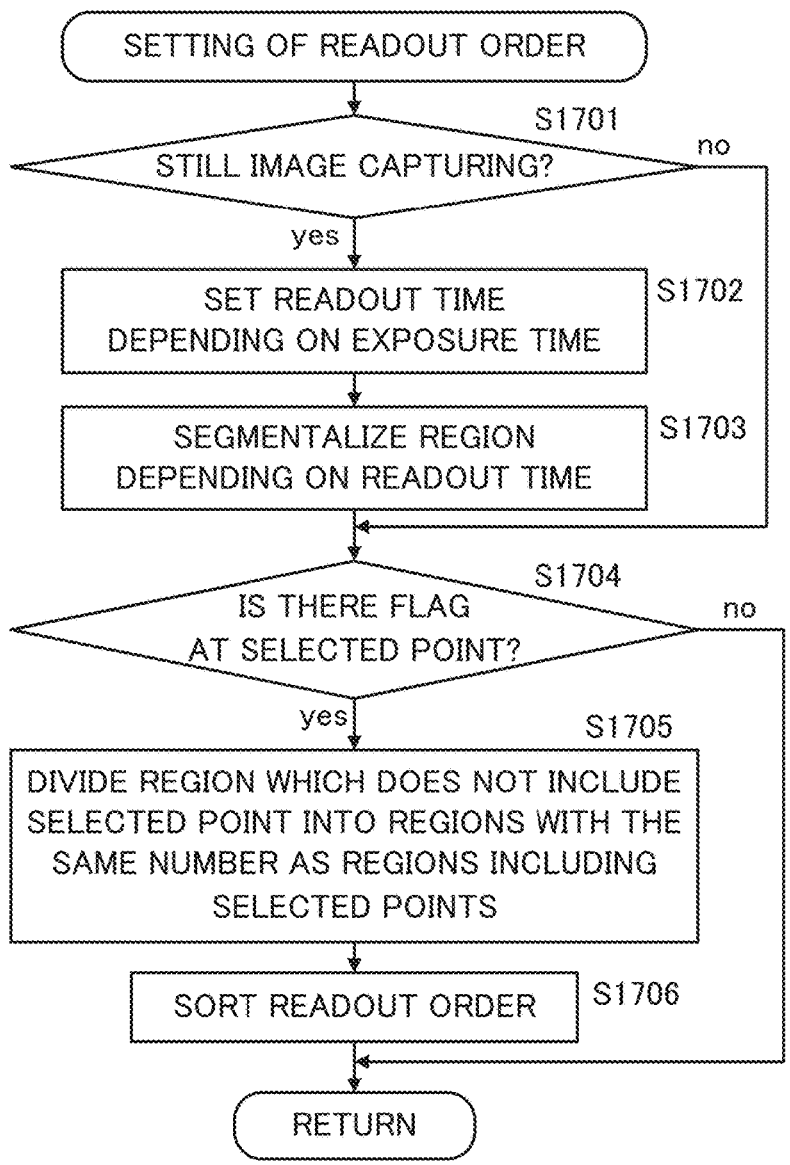
FIG. 17 is a flowchart of setting a readout order in the third embodiment.

This embodiment can be adapted to still image capturing in addition to each of the first and second embodiments. This flow is performed at the step of setting the readout order at step S703 in FIG. 7A and at step S1002 in FIG. 10A, and its detail is illustrated in FIG. 17. FIG. 17 is a flowchart of setting the readout order in this embodiment. FIG. 17 illustrates a subroutine in setting the readout order at steps S703 and S1002.

First, at step S1701, the CPU 111 determines whether a still image is to be captured. For example, this can be determined by detecting a signal, input to the CPU 111, from the operating unit 112 in FIG. 1. If the still image is to be captured, the flow proceeds to step S1702. On the other hand, if the still image is not to be captured, the flow proceeds to step S1704. At step S1702, the image information calculating unit 16 reads an exposure time (signal accumulation time) required for capturing the still image from the CPU 111. Then, the image information distribution detecting unit 16a controls the signal readout unit 15 so as to perform the signal readout depending on the exposure time. For example, if the exposure time is $1/10$ sec, the readout time is also set to $1/10$ sec. If the exposure time is $1/2$ sec, the readout time is also set to $1/2$ sec. Subsequently, at step S1703, the image information distribution detecting unit 16a segmentalizes the readout regions such that the image information can be obtained at desired intervals such as for each 2 ms during the readout time set at step S1702.

At step S1704, the image information calculating unit 16 determines whether there is a flag indicating a change of the readout order at step S7014 in the flowchart of FIG. 7B. If this flag exists, the flow proceeds to step S1705. On the other hand, if the flag does not exist, this subroutine is finished and the flow proceeds to step S704 in FIG. 7A or step S1003 in FIG. 10A. While the distribution of the feature points are described in FIG. 7B, the image information distribution detecting unit 16a may set the flag based on a distribution state of range-finding frames which coincide with an object to be focused. Accordingly, while "IS THERE FLAG AT FEATURE POINT?" is described as step S7031 in FIG. 7F, the description is changed to "IS THERE FLAG AT SELECTED POINT?" (with respect to the image information extraction range) at step S1704 in FIG. 17 considering both the image blur correction and the focusing. Steps S1705 and S1706 in FIG. 17 are the same as steps S7032 and S7033 in FIG. 7F, respectively, and accordingly descriptions thereof are omitted. When sorting of the readout order is completed at step S1706, this subroutine is finished and the flow proceeds to step S704 in FIG. 7A or step S1003 in FIG. 10A.

As described above, this embodiment can be adapted to the situation in which a photographing time is changed from a photographing preparation state to a still image capturing, and the signal readout unit 15 segmentalizes the readout region of an image prior to the still image capturing. The image information complementing unit 16e performs a gain adjustment of an image signal depending on an accumulation time difference in one frame. The signal readout unit 15 changes a signal readout time in accordance with the signal accumulation time required for the still image capturing. By performing the processing, a stable image signal can be obtained to drive the image pickup unit with high accuracy even if the photographing time such as the still image capturing changes.

Fourth Embodiment

Next, a fourth embodiment of this embodiment will be described. A readout time 1413 is required in addition to a signal accumulation time 1407 of FIG. 14A as a time until the still image capturing is completed in the third embodiment. This is because the speed of readout 1410 is adjusted to the signal accumulation time 1407 and the image signals are read over an entire accumulation time. This embodiment is directed to a method of reducing the photographing time.

Figure 18A:
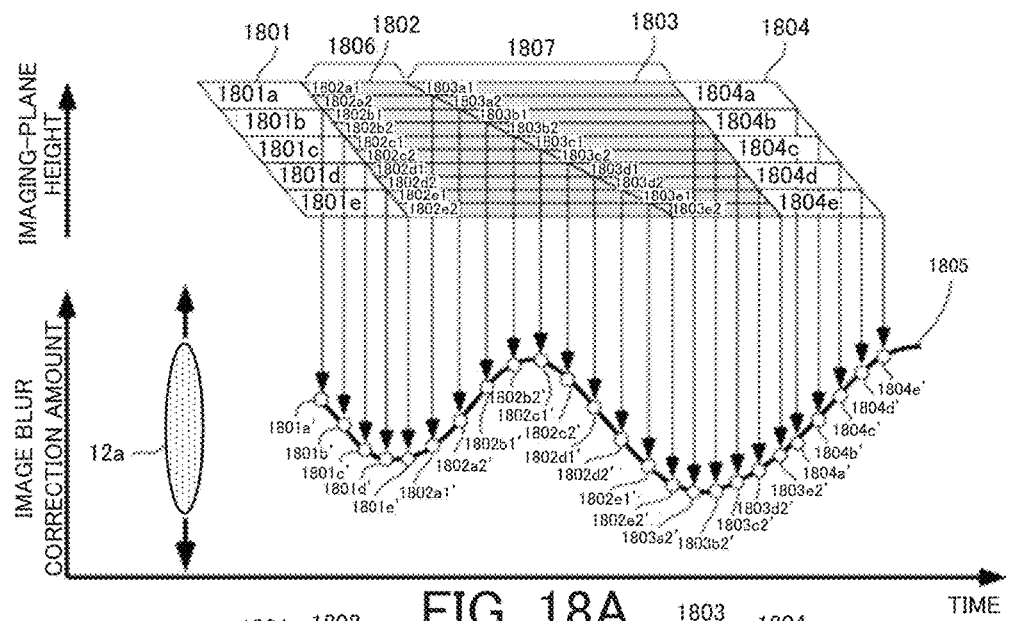
FIGS. 18A and 18B are explanatory diagrams of an operation of a signal readout unit for capturing a still image in a fourth embodiment.
Figure 18B:
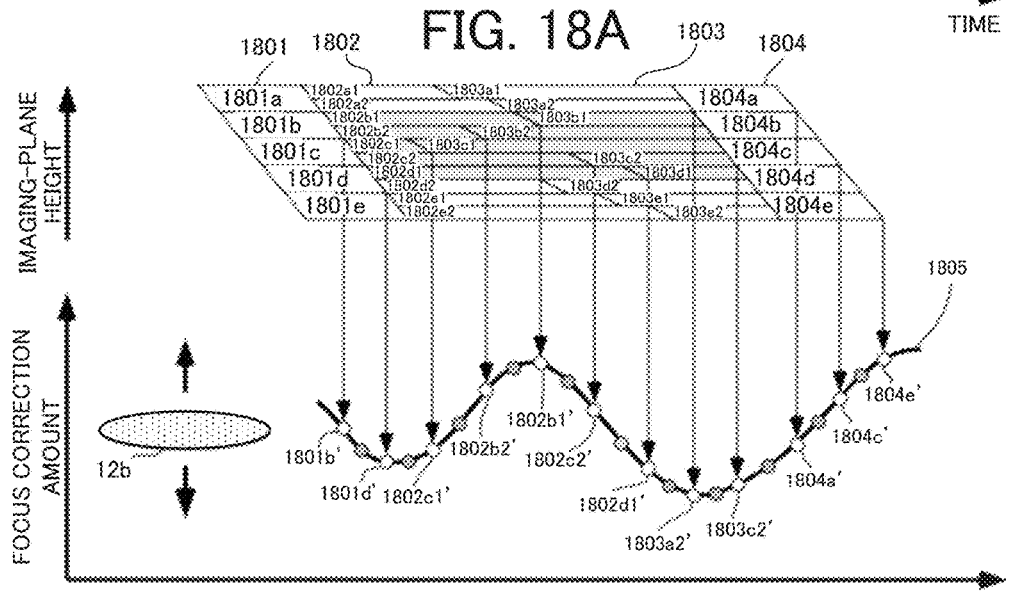

FIGS. 18A and 18B are explanatory diagrams of the operation of the signal readout unit which can be adapted to the still image capturing in this embodiment. In FIG. 18A, in a frame 1801, similarly to the frame 1401 illustrated in FIG. 14A, image blur correction plots 1801a' to 1801e' are acquired depending on the readout of image signals from regions 1801a to 1801e, respectively. In this embodiment, the image processing unit 19 synthesizes an image of a frame 1802 with an image of a next frame 1803 to acquire a still image. In the frame 1802, similarly to the frame 1402 illustrated in FIG. 14A, a signal accumulation time for the frame 1802 is set to perform the still image capturing. Also with respect to the frame 1802, similarly to the frame 1402, the region is segmentalized (divided) for the purpose of shortening intervals to obtain image signals. Image blur correction plots 1802a1', 1802a2' to 1802e1', and 1802e2' are acquired from regions 1802a1, 1802a2 to 1802e1, and 1802e2 in the frame 1802.

As can be seen in FIG. 18A, with respect to the frame 1802, an accumulation time 1806 varies depending on the imaging-plane height, and the accumulation time decreases with increasing the imaging-plane height. In other words, unevenness of exposure occurs in the obtained image. Also with respect to a frame 1803, by using the same number of regions in the frame 1802, widening intervals for obtaining image signals is prevented. A setting time of an accumulation start scan in the frame 1803 is aligned to the readout time in the previous frame 1802 to capture images continuously. However, the readout time of the frame 1803 is set to be equal to the setting time of the accumulation start scan in the frame 1802 (equal to the readout time in the frame 1801 in FIG. 18A). Accordingly, as can be seen in FIG. 18A, with respect to the frame 1803, a signal accumulation time 1807 varies depending on the imaging-plane height, and the accumulation time increases with increasing the imaging-plane height. In other words, the unevenness of exposure occurs in the obtained image.

Then, image blur correction plots 1803b2', 1803c2', 1803d2', and 1803e2' are acquired from image signals in regions 1803b2, 1803c2, 1803d2, and 1803e2, respectively. With respect to the frame 1803, only the image signals in the regions 1803b2, 1803c2, 1803d2, and 1803e2 are used. Accordingly, the region is not segmentalized differently from the frame 1802, it may be divided into regions having approximately the same number of regions in the frame 1801. Alternatively, the image blur correction plots may be obtained more finely by using image signals in regions 1803a1, 1803a2, 1803b1, 1803c1, 1803d1, and 1803e1.

With respect to a frame 1804, image signals in regions 1804a to 1804e are read out to obtain image blur correction plots 1804a' to 1804e', respectively. Then, based on the image blur correction plots obtained in the frames 1801 to 1804, the image blur correction lens 12a is driven to perform the image blur correction. The image processing unit 19 synthesizes images obtained from the frames 1802 and 1803 to obtain a still image. As described above, although the unevenness of exposure occurs in both the frames 1802 and 1803, an image without the unevenness of exposure can be obtained by mutual complementation since the unevenness directions are opposite to each other. When synthesizing the frames 1802 and 1803, the image processing unit 19 aligns positions of the images by using a known alignment technology, and accordingly an image shift between the two frames can be canceled (or reduced).

As described above, the image processing unit 19 synthesizes the two frames to obtain a still image, and accordingly the photographing time can be reduced. The signal readout unit 15 adjusts the adjacent readout time between the frames 1802 and 1803 to the signal accumulation time (i.e., increase the readout time with increasing the accumulation time), and accordingly it can obtain the image blur correction plots uniformly during the still image capturing as well. While FIG. 18A describes the image blur correction as an example, a stable focusing can be performed by similar processing in focus state detection.

While the case in which the feature points are uniformly distributed in the image, subsequently, a case in which range-finding frames used for the focusing are concentrated at the center of the image as illustrated in FIG. 9C will be described. In order to obtain plots indicating the focus states with equal intervals in this case, as described referring to FIG. 14B, the readout order of regions is changed.

Referring to FIG. 18B, the focusing during the still image capturing in this embodiment will be described. In FIG. 18B, regions in which selected range-finding frames are distributed and regions in which the selected range-finding frames are not distributed are read alternately in order from a region 1802c1 (with a selected range-finding frame), a region 1802a1 (without any selected range-finding frame), a region 1802b2 (with a selected range-finding frame), and a region 1802a2 (without any selected range-finding frame). Subsequently, a region 1802b1 (with a selected range-finding frame), a region 1802d2 (without any selected range-finding frame), a region 1802c2 (with a selected range-finding frame), a region 1802e1 (without any selected range-finding frame), a region 1802d1 (with a selected range-finding frame), and a region 1802e2 (without any selected range-finding frame) are read out in this order. As described above, plots 1802c1', 1802b2', 1802b1', 1802c2', 1802d1', 1802a2', and 1802c2' indicating the focus states are obtained depending the readout in the frame 1802. Black plots in FIG. 18B are, as described referring to FIG. 2, focus correction plots that are predicted by the image information complementing unit 16e using the adaptive filter or the linear prediction. In this embodiment, by using the method of synthesizing two frame images to obtain a still image, the readout time can be reduced. While the focus state detection is described in FIG. 18B as an example, this embodiment can be applied also to the image blur correction.

Figure 19A:
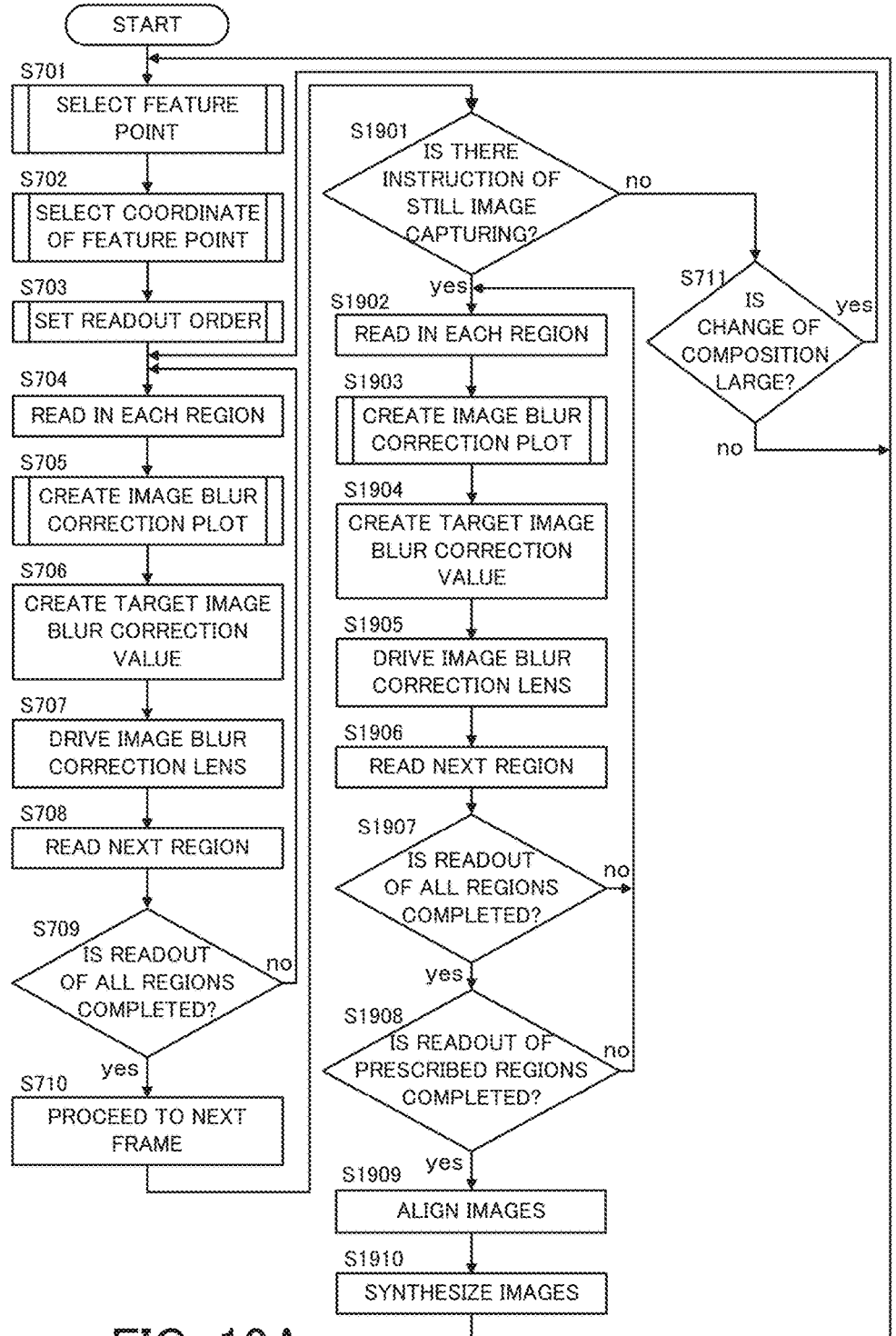
FIGS. 19A and 19B are flowcharts of an image blur correction for capturing the still image in the fourth embodiment.
Figure 19B:
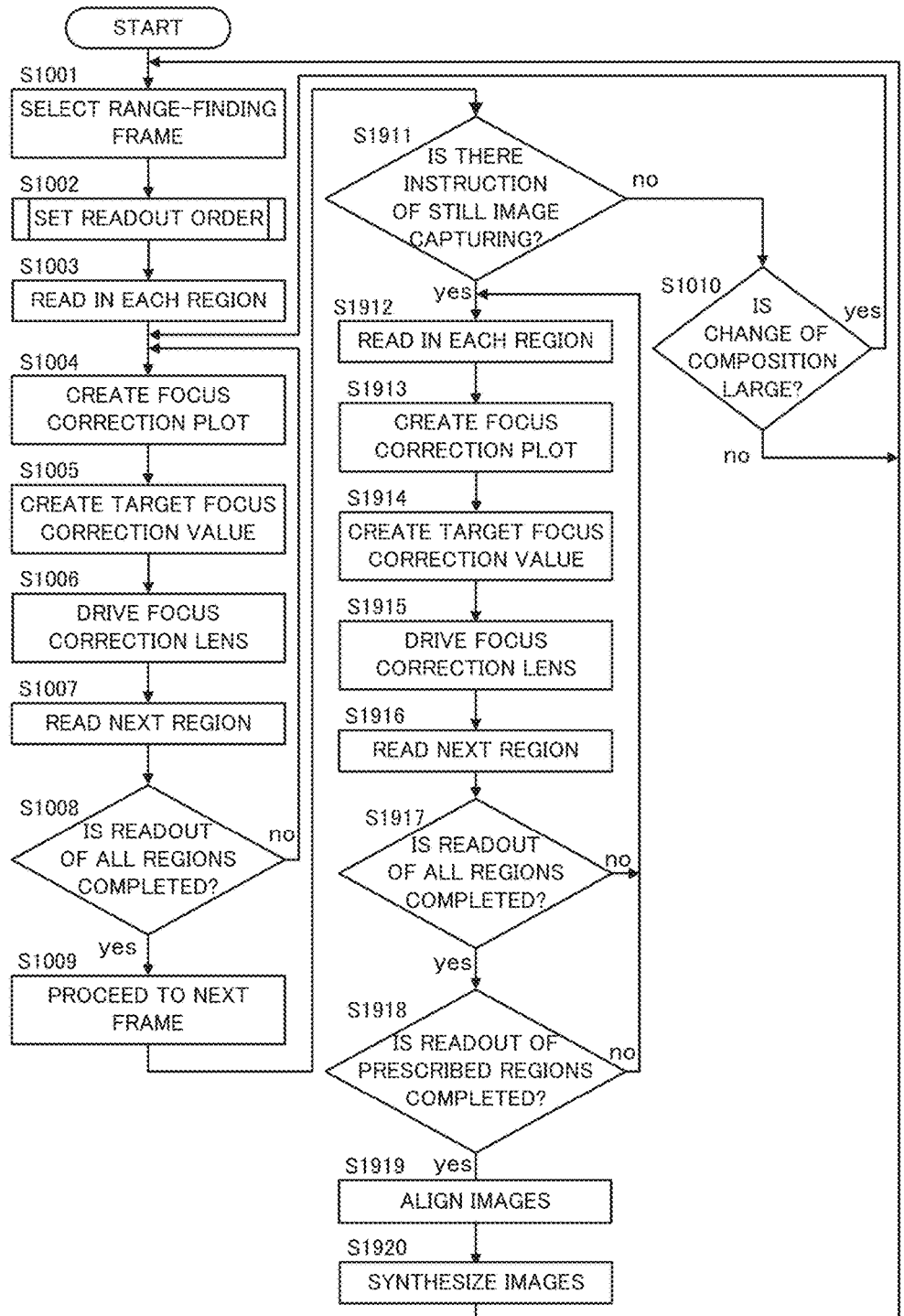

FIGS. 19A and 19B are flowcharts of the image blur correction adapted to the still image capturing in this embodiment. FIG. 19A is a flowchart of adding steps (S1901 to S1910) especially for the still image capturing to the flow (steps S701 to S711) of the image blur correction in FIG. 7A, and the same steps as those in FIG. 7A are indicated by the same number and descriptions thereof are omitted. For simple explanations, elements which are not directly relevant to this embodiment are omitted.

At step S1901, until a user presses a release button provided in the image pickup apparatus 100 (camera) for example to instruct a start of the still image capturing, the flow returns to step S701 or step S704 through step S711 to be repeated. If the operation of instructing the still image capturing is performed at step S1901, the flow proceeds to step S1902. At step S1902, similarly to step S704, the signal readout unit 15 reads the image signals for each region in the readout order set at step S703. Subsequently, at step S1903, similarly to step S705, the image information comparing unit 16d compares the read image signals for each region. Then, the image information calculating unit 16 creates image blur correction plots.

Subsequently, at step S1904, similarly to step S706, the adjusting unit 17 creates a target adjustment value (target image blur correction value) for the image blur correction based on the obtained image blur correction plots. Subsequently, at step S1905, similarly to step S707, the drive unit 18a drives the image blur correction lens 12a based on the target adjustment value obtained by the adjusting unit 17. Subsequently, at step S1906, similarly to step S708, the signal readout unit 15 reads image signals in the next region. Subsequently, at step S1907, similarly to step S709, the signal readout unit 15 determines whether image signals in regions required for the image formation in one frame is read. If the image signals are read out, the flow proceeds to step S1908. On the other hand, if any region to be read in one frame remains, the flow returns to step S1902, and image signals are repeatedly read out and the image blur correction is performed based on the image signals.

At step S1908, the image processing unit 19 or the image information calculating unit 16 determines whether the processing of prescribed frames is completed. The prescribed frames are two frames of the frames 1802 and 1803 illustrated in FIG. 18A, and they may three or more frames if the captured still image is constituted by using more frames. Subsequently, at step S1909, the image processing unit 19 performs alignment processing such as an alignment of positions of the feature points in an image for a displacement between the captured frames to reduce or remove the displacement between the frames. Subsequently, at step S1910, the image processing unit 19 synthesizes (combines) the aligned frames to obtain a still image.

FIG. 19B is a flowchart of adding steps (S1911 to S1920) especially for the still image capturing to the flow (steps S1001 to S1010) of the focus correction in FIG. 10A, and the same steps as those in FIG. 10A are indicated by the same number and descriptions thereof are omitted.

At step S1911, until the user presses the release button provided in the image pickup apparatus 100 (camera) for example to instruct a start of the still image capturing, the flow returns to step S1001 or step S1003 through step S1010 to be repeated. If the operation of instructing the still image capturing is performed at step S1911, the flow proceeds to step S1912. At step S1912, similarly to step S1003, the signal readout unit 15 reads the image signals in each region in the readout order set at step S1002. Subsequently, at step S1913, similarly to step S1004, the image information calculating unit 16 detects a focus state for each region of the read image signals, and it creates focus correction plots based on the instruction of the signal readout unit 15.

Subsequently, at step S1914, similarly to step S1005, the adjusting unit 17 creates a target adjustment value (target focus correction value) for the image blur correction based on the obtained image blur correction plots. Subsequently, at step S1915, similarly to step S1006, the drive unit 18a drives the focus lens 12b based on the target adjustment value obtained by the adjusting unit 17. Subsequently, at step S1916, similarly to step S1007, the signal readout unit 15 read image signals in the next region. Subsequently, at step S1917, similarly to step S1008, the signal readout unit 15 determines whether the image signals in regions required for the image formation in one frame are read out. If the image signals are read out, the flow proceeds to step S1918. On the other hand, if any region to be read in one frame remains, the flow returns to step S1912, and image signals are repeatedly read out and the focus correction is performed based on the image signals.

At step S1918, the image processing unit 19 or the image information calculating unit 16 determines whether the processing of prescribed frames is completed. The prescribed frames are two frames of the frames 1802 and 1803 illustrated in FIG. 18B, and they may three or more frames if the captured still image is constituted by using more frames. Subsequently, at step S1919, the image processing unit 19 performs alignment processing such as an alignment of positions of the feature points in an image for a displacement between the captured frames to reduce or remove the displacement between the frames. Subsequently, at step S1920, the image processing unit 19 synthesizes (combines) the aligned frames to obtain a still image.

As illustrated in FIG. 18A, the signal readout unit 15 sets the signal readout time to be delayed with respect to the setting time of the accumulation start scan in one frame, and accordingly a total photographing time can be reduced with the accumulation time kept constant. In this processing, although the unevenness of exposure occurs due to the difference of the accumulation time on the top and the bottom of the image, two images which include unevenness of exposure in directions opposite to each other are synthesized, and accordingly it can be complemented. In other words, the signal readout unit 15 generates the unevenness of exposure to perform the image blur correction or the focus correction during the still image capturing.

Figure 20A:
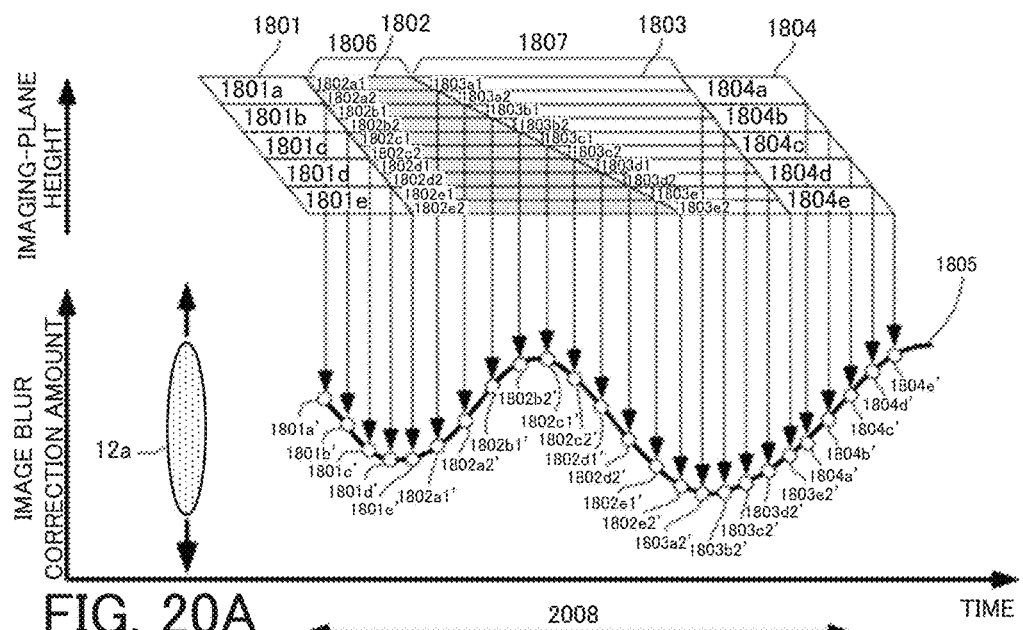
FIGS. 20A and 20B are explanatory diagrams of another operation of the signal readout unit for capturing the still image in the fourth embodiment.
Figure 20B:
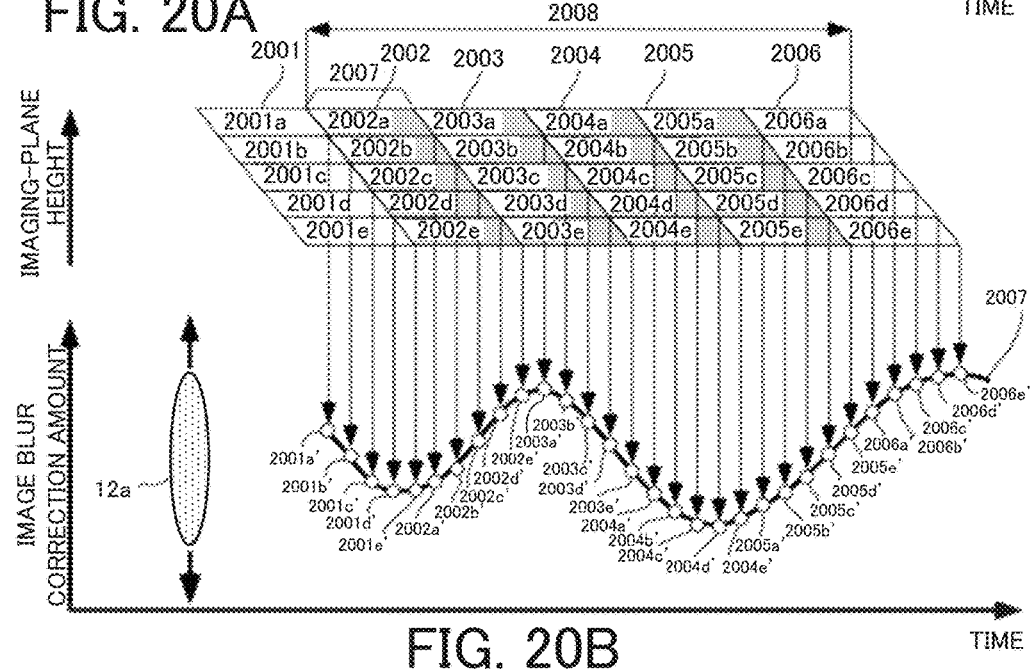

FIGS. 20A and 20B are explanatory diagrams of the operation of another signal readout unit which can be adapted to the still image capturing in this embodiment. If it is assumed that the unevenness of exposure is complemented by gain-up of image signals, as illustrated in FIG. 20A, a still image can be created only by the frame 1802, and accordingly the image blur correction can be performed during the still image capturing. In this case, the occurring unevenness of exposure has a constant amount along the vertical direction of the image. Accordingly, in order to complement it, for example the gain of image signals increases with approaching the upper side of the image, the gain is not corrected at the center of the image, and conversely the gain of image signals decreases with approaching the lower side of the image, and as a result the exposure for the entire image can be stabilized. Alternatively, as a method of photographing an image in which the unevenness of exposure does not occur, as illustrated in FIG. 20B, the number of frames increases depending on the accumulation time, and the frames are synthesized to obtain a still image.

In FIG. 20A, after images of frames 2002 to 2005 with gray patterns are captured, the images are aligned and synthesized according to steps S1909 and S1910 in FIG. 19A. Accordingly, a total photographing time 2008 does not increase with respect to a signal accumulation time 2007 in one frame (i.e., long signal readout time is not necessary). In addition, the image blur correction lens 12a can perform the image blur correction based on the image blur correction waveform 2007 obtained by each of image blur correction plots 2001a' to 2006e' during the still image capturing. As described above, since it is not necessary to increase the image signal readout time as a result of increasing the number of synthesized images, the image blur correction plots can be densely obtained. Accordingly, the segmentalization (division) of a region in one frame is not necessary.

As described above, the image processing unit 19 can reduce the photographing time by synthesizing a frame in which a target adjustment value is obtained based on a plurality of pieces of image information with a subsequent frame to obtain a still image. The image information distribution detecting unit 16a can obtain the image blur correction plots uniformly by setting the adjacent readout time between frames to correspond to the accumulation time (increasing the readout time with increasing the accumulation time). The signal readout unit 15 delays the signal readout time compared with the setting time of the accumulation start scan in one frame, and accordingly a total photographing time can be reduced with the accumulation time kept constant. Furthermore, for a frame next to the frame in which the signal readout time is delayed compared with the setting time of the accumulation start scan in one frame, the signal readout unit 15 sets the signal readout time to be earlier than the setting time of the accumulation start scan in one frame. As a result, the total photographing time can be reduced with the accumulation time kept constant.

Fifth Embodiment

Next, a fifth embodiment of the present invention will be described. Also in the fifth embodiment, the photographing time increases because the time required for the image accumulation start and the signal readout is added to the actual image accumulation time. As a method of separating the accumulation start time and the readout time from the actual signal accumulation time, it is considered that for example the mechanical shutter 14a illustrated in FIG. 1 is used.

Figure 21A:
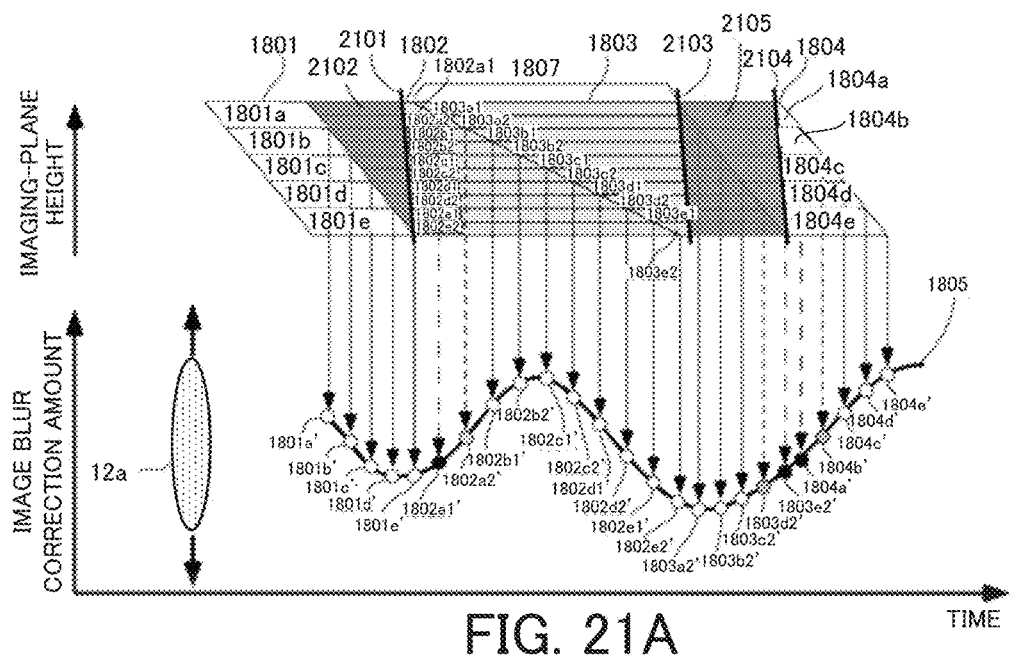
FIGS. 21A and 21B are explanatory diagrams of an operation of a signal readout unit for capturing a still image in a fifth embodiment.
Figure 21B:
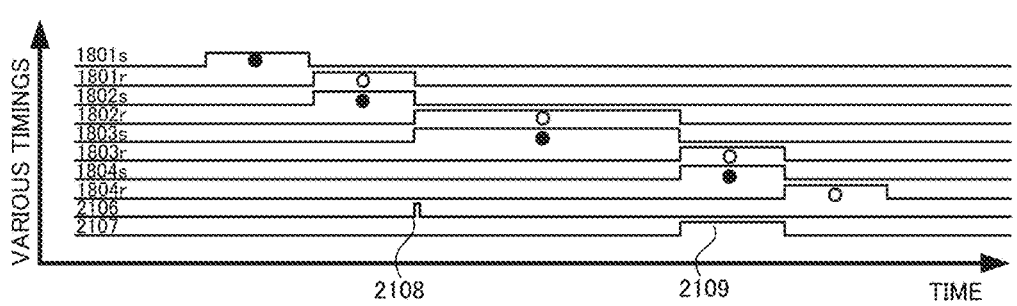

FIGS. 21A and 21B are explanatory diagrams of the operation of the signal readout unit which can be adapted to the still image capturing in this embodiment. FIG. 21A illustrates an example in which the signal readout unit 15 electronically resets the accumulation of signals when starting the accumulation and then the mechanical shutter 14a shields light so as to prevent the object light beam from reaching the image pickup device 14 to align the photographing time with the signal accumulation time. A line segment 2101 indicates a line at which the signal readout unit 15 resets image signals, and thus image signals 2102 in an interval indicated by meshed lines in the frame 1802 are reset. Accordingly, at the time of line segment 2101, the image signals cannot be read out.

Image information cannot be obtained in a region 1802a1 of the frame 1802 since the signal accumulation time is short. However, based on image blur correction plots 1801a' to 1801e' obtained from a previous frame 1801, the image information complementing unit 16e can predict an image blur correction plot 1802a1' (indicated by a black circle) read in the region 1802a1. A region 1802a2 in the frame 1802 has a signal accumulation time which is longer than that of the region 1802a1, but in the region 1802a2, a sufficient signal accumulation cannot be performed. Accordingly, the gain-up of the signals is performed to obtain the image blur correction plot 1802a2' (indicated by a gray circle). In subsequent regions 1802b1 to 1802e2, the signal accumulation times are sufficient, and accordingly image blur correction plots 1802b1' to 1802e2' can be obtained.

In a next frame 1803, the mechanical shutter 14a is closed at the time of a line segment 2103 to shield the object light beam entering the image pickup device 14 until a next line segment 2104. Accordingly, in the interval indicated by the meshed lines 2105, the image information from the object light beam cannot be obtained. However, in regions 1803a2, 1803b2, and 1803c2, sufficient image information can be obtained before the light is shielded, and accordingly image blur correction plots 1803a2', 1803b2', and 1803c2' can be obtained. In other words, the image blur correction can be performed continuously by using image signals read while the mechanical shutter 14a shields the light. However, the gain-up is performed on image signals of a region 1803d2 in the frame 1803 to obtain image blur correction plot 1802d2' (indicated by gray circle) due to the short signal accumulation time.

A region 1803e2 in the frame 1803 has a shorter signal accumulation time, and accordingly the image information cannot be obtained. However, the image information complementing unit 16e can predict an image blur correction plot 1803e2' (indicated by a black circle) read in a region 1802e2 based on image blur correction plots 1803a2', 1803b2', 1803c2', and 1803d2' obtained in advance. Similarly, image blur correction plots 1804a' and 1804b' are obtained by the prediction and the gain-up, respectively.

FIG. 21B is a timing chart of illustrating a timing of the start of accumulation and the signal readout in each frame, the reset of the accumulation signals, the shield of the light entering the image pickup device 14 by the mechanical shutter 14a. In FIG. 21B, reference numerals 1801s, 1802s, 1803s, and 1804s denote time periods of starting signal accumulation in frames 1801 to 1804, respectively, and they are indicated by white circles. In FIG. 21B, reference numerals 1801r, 1802r, 1803r, and 1804r denote time periods of reading signals in the frames 1801 to 1804, respectively, and they are indicated by black circles. A line segment 2106 indicates a timing 2108 at which the signal readout unit 15 resets image signals prior to the still image capturing, and the rest of the signals are performed immediately after the time period 1801r of the signal readout in the frame 1801. Accordingly, in the frame 1802, information obtained by starting the signal accumulation prior to the reset timing 2108 is also reset. A line segment 2107 indicates a timing 2109 at which the mechanical shutter 14a shields the light entering the image pickup device 14, and the light shield is performed immediately after the time period 1803r of the signal readout in the frame 1803 starts. Accordingly, the image pickup device 14 cannot accumulate image signals during the time period of the light shield.

As described above, although a part of the image signals cannot be obtained due to the signal reset and the mechanical shutter 14a, the photographing time can be set to approximately the same as the signal accumulation time 1807. While FIG. 21A describes the image blur correction as an example, this embodiment can be applied also to the focusing and a situation in which feature points or objects to be focused are concentrated on the center as illustrated in FIG. 18B. With respect to the reset of the signal accumulation by the signal readout unit 15, the object light beam entering the image pickup device 14 may be shielded by using the mechanical shutter 14a during the interval up to the line segment 2101.

As described above, in this embodiment, an accumulation control unit (the signal readout unit 15 and the mechanical shutter 14a) that controls the start of accumulation of a frame which is first captured in a plurality of frames synthesized by the image processing unit 19 may be provided. A signal readout control unit (mechanical shutter 14a) that controls the signal readout of a frame which is captured last in the plurality of frames may be provided. By providing at least one of the accumulation control unit or the readout control unit, the reduction of the photographing time can be achieved. By performing the image blur correction using the read image signals while the mechanical shutter 14a as the readout control unit shields the light entering the image pickup device 14, the image blur correction can be performed continuously.

Sixth Embodiment

Next, a sixth embodiment of the present invention will be described. In each of the first to fifth embodiments, the drive control of the image blur correction lens 12a or the focus lens 12b is performed by using the image signals obtained from each frame. On the other hand, this embodiment describes an example in which a target adjustment value of the image blur correction lens 12a or the focus lens 12b is created based on the image signals obtained from each frame, and in reality they are driven after the frame. For example, when the focus lens 12b is continuously driven during capturing a still image, it may be impossible to perform both the drive and the processing of detecting a focus state based on the image signals at the same time in view of electricity. In this example, a case in which a continuous photography of a still image is considered.

Figure 22A:
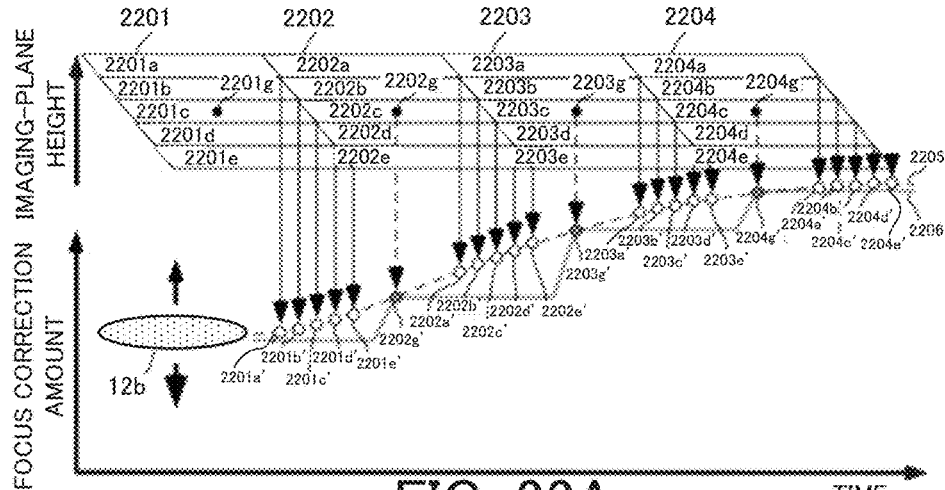
FIGS. 22A to 22C are explanatory diagrams of a signal readout and a lens control in a sixth embodiment.
Figure 22B:
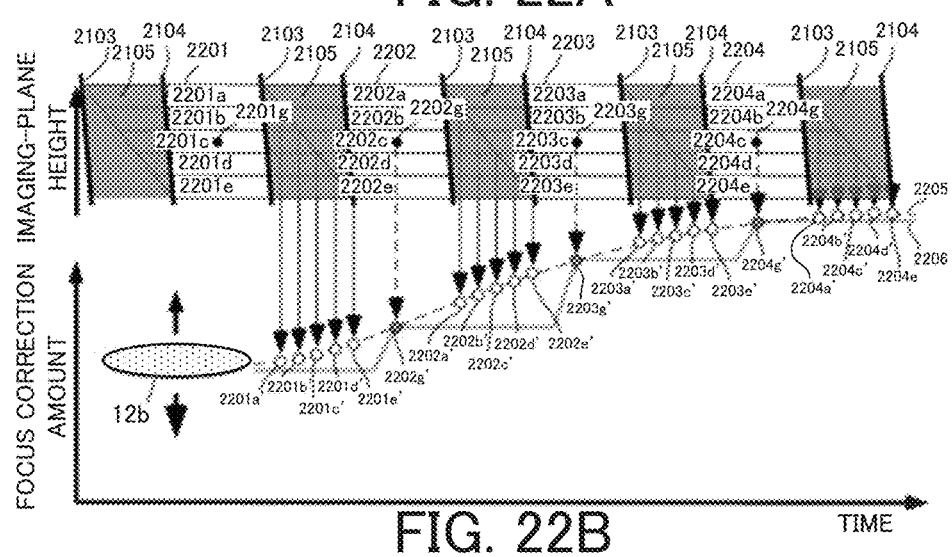
Figure 22C:
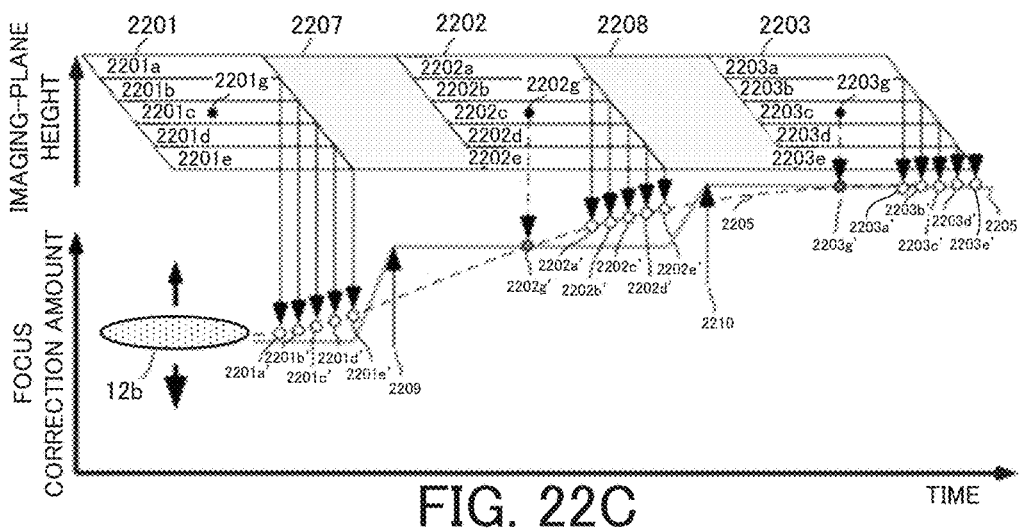

FIGS. 22A to 22C are explanatory diagrams of a signal readout and a lens control in this embodiment. In FIG. 22A, plots 2201a' to 2201e' that indicate focus states in each of regions 2201a to 2201e obtained from a frame 2201 are disposed on a desired focus lens driving locus indicated by a dashed line 2205. Then, by using these plots, the image information complementing unit 16e predicts a desired focus state plot 2202g' at a signal accumulation time center 2202g in the next frame 2202 by using the adaptive filter or the linear prediction. As indicated by a gray heavy line 2206, the focus lens 12b is driven in a step manner during capturing the image in the next frame 2202. As described above, the readout of the image signals and each of the focus state detection processing and the drive of the focus lens 12b are temporally shifted from each other, and accordingly it is possible to perform the operations considering the electric power. The operations are repeated for each of frames 2203 and 2204, so that a continuous focused-image capturing can be performed.

FIG. 22B is an example of shielding light on the image pickup device 14 between the continuous image captures by using a mechanical shutter 14a. In FIG. 22B, for each frame, the mechanical shutter 14a is closed at the time indicated by a line segment 2103, and thus the image pickup device 14 is shielded from an object light beam until the time indicated by a next line segment 2104. Accordingly, in an interval indicated by meshed lines 2105, image information from the object light beam cannot be obtained. However, since sufficient image information can be obtained before the light shield of the region is performed, image blur correction plots 2201a' to 2204e' can be obtained based on the image signals read during shielding the light. Then, based on these plots, the image information complementing unit 16e predicts a desired focus state plot at the accumulation time center in the next frame by using the adaptive filter or the linear prediction. The focus lens 12b is driven in a step manner during the image capturing in the next frame 2202 as indicated by a gray heavy line 2206.

FIG. 22C illustrates a case in which allowance times 2207 and 2208 are provided to detect and calculate the focus state between frames in each photography. The focus lens 12b is driven during the allowance time. Based on plots 2201a' to 2201e' indicating the focus state, the image information complementing unit 16e predicts the desired focus state plot 2202g' at the accumulation time center 2202g in the next frame 2202 by using the adaptive filter or the linear prediction. Then, during the allowance time 2207, the drive of the focus lens 12b is completed at the time indicated by an arrow 2209 so as to be focused in the focus state. Similarly, with respect to a frame 2203, the drive of the focus lens 12b is completed at the time indicated by an arrow 2210. As described above, based on the plurality of image signals (focus state) obtained in one frame, the image information complementing unit 16e predicts the target adjustment value of the image pickup unit relating to subsequent frames (i.e., target adjustment value of the focus lens or the blur correction lens), and accordingly a high-mobility image capturing operation can be performed.

As described above, in each embodiment, the image pickup unit can be controlled by using the plurality of image signals in one frame, and accordingly it is possible to perform the blur correction or the focus correction with high response. Furthermore, since the image information is obtained by using different image signals in one frame, the noise superimposed on an image can be reduced compared with a conventional method of reading the same image signals repeatedly in a nondestructive manner.

The first embodiment describes the correction of the hand shake or the focus shift that occurs in one frame by using the image blur correction lens 12a or the focus lens 12b in the frame. The third embodiment describes the application of the correction to the still image. The sixth embodiment describes the application to the continuous image capturing. However, each embodiment is not limited to the image blur correction or the focus correction, and it can be applied also to other corrections such as a drive of the movable aperture stop 12c. For example, a change of a brightness of an object obtained during capturing a moving image or a still image in a frame is obtained as image information, and the movable aperture stop 12c is driven in the frame depending on the image information. Alternatively, it is possible to immediately correct the change of the brightness of the object obtained in a previous frame during the continuous image capturing by moving the movable aperture stop.

Figure 23A:
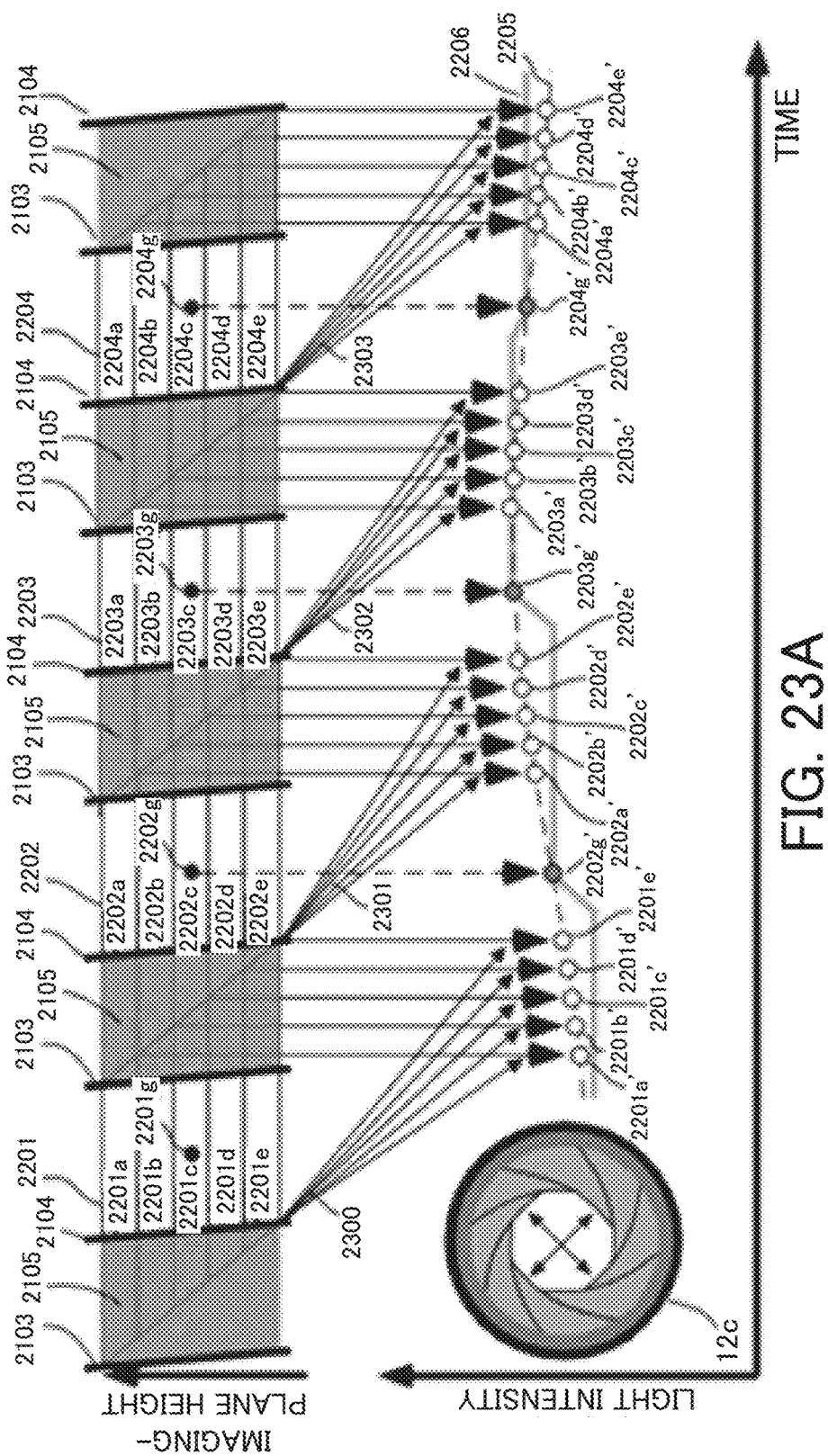
FIGS. 23A and 23B are respectively an explanatory diagram and a flowchart of a control of a movable aperture stop during a continuous image capturing and a flowchart of illustrating in each embodiment.

As an example, referring to FIGS. 23A and 23B, the control of the movable aperture stop during the continuous image capturing will be described. FIG. 23A is an explanatory diagram of the control of the movable aperture stop during the continuous image capturing. In this embodiment, capturing an image of the object as illustrated in FIG. 9C is considered. In this case, preferred photometric values are light intensities in the regions 92a to 92e. Accordingly, an average light intensity of the regions is obtained, and a change of the average light intensity in each frame is set to a target drive value of the movable aperture stop.

In FIG. 23A, the average light intensity of regions 2202a to 2202e in a frame 2202 is read out. Subsequently, a comparison value result 2301 of an average light intensity in all regions in the previous frame 2201 and an average light intensity for each region and an average light intensity of the regions 2202a to 2202e in the current frame are calculated to obtain average light intensities 2202a' to 2202e' in all regions at the readout time in each region. The change of the obtained light intensity is extended to predict a light intensity 2203g' at the time of an accumulation centroid 2203g in the next frame 2203, and then the movable aperture stop is driven based on the prediction result. This operation is repeated for each frame, and thus an appropriate exposure is always obtained for each frame in the continuous image capturing.

Figure 23B:
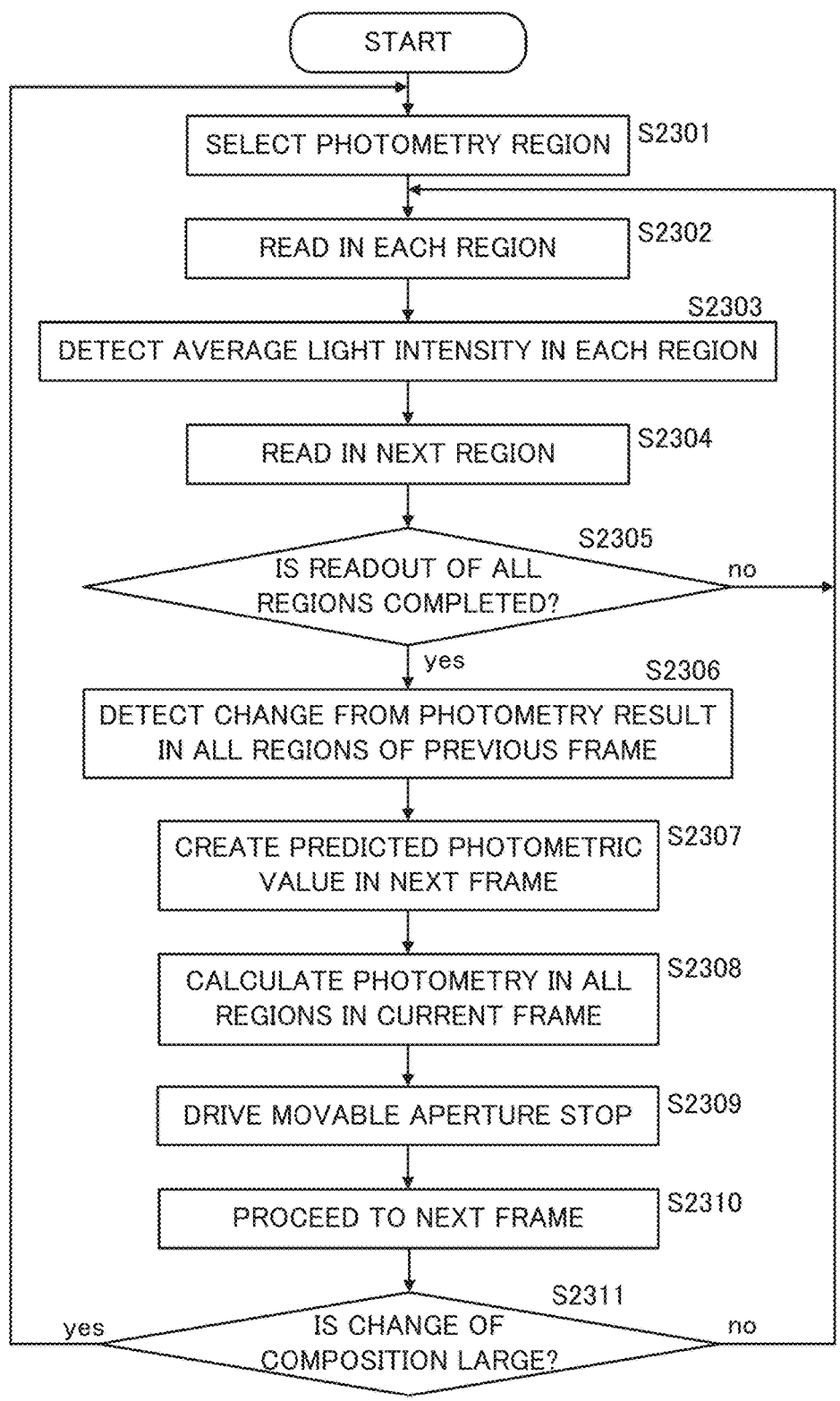

FIG. 23B is a flowchart of illustrating the control of the movable aperture stop illustrated in FIG. 23A, and for a simple explanation, elements which are not directly relevant to this embodiment are omitted. This flow starts when for example a user performs a photographing preparation operation such as a half-press of a release button provided on the image pickup apparatus 100 (camera) and the operating unit 112 outputs an instruction for the photographing preparation to the CPU 111, and it is finished when the instruction for the photographing preparation is canceled.

First, at step S2301, the image information distribution detecting unit 16a selects a region in which photometry is to be performed as an image information extraction range based on the image obtained by the image processing unit 19 or the image information calculating unit 16. Selecting the region in which the photometry is to be performed means, for example, setting an object closest to the camera in FIG. 9C as a main object and setting an image region to capture the main object as a photometry region. Subsequently, at step S2302, the signal readout unit 15 reads image signals in each region. Subsequently, at step S2303, the CPU 111 detects an average light intensity in an entire region for each of the regions of the read image signals. The average value in the entire region is used because there is a high possibility that the light intensity greatly changes in a local region.

Subsequently, at step S2304, the signal readout unit 15 reads the next region. The signal readout unit 15 determines whether image signals required for the image formation in one frame are read out. If the image signals are read out, the flow proceeds to step S2306. On the other hand, if any region to be read in one frame remains, the flow returns to step S2301, and the readout in the regions and the detection of the average light intensity are repeated.

At step S2306, the image information calculating unit 16 reads a light intensity in each region read in a previous frame and an entirely average light intensity in the previous frame image obtained by averaging the read light intensities. Then, the image information calculating unit 16 obtains a light intensity in a current entire frame at the time of reading the region by the result of the previous frame and the average region of each region in the current frame. For example, if the average light intensity of a certain region in the current frame increases by 10% with respect to the average light intensity of the corresponding region in the previous frame, the entirely average light intensity in the current frame at that time is set to a value obtained by increasing the entirely average light intensity by 10% in the previous frame.

Subsequently, at step S2307, the image information calculating unit 16 predicts an entirely average light intensity $2203g'$ in the next frame based on a light intensity change curve 2205 obtained from entirely average light intensities ($2202a'$ to $2202e'$) at the time of reading signals in each region obtained at step S2306. Subsequently, at step S2308, the image information calculating unit 16 averages the light intensities obtained in each region of the current frame and obtains the entirely average light intensity in the current frame image in order to use it for calculation of the light intensity in the next frame. Subsequently, at step S2309, the adjusting unit 17 drives a movable aperture stop 12c via the drive unit 18c based on the predicted light intensity obtained at step S2307. Then, at step S2310, the process proceeds to the next frame.

Subsequently, at step S2311, the image processing unit 19 or the image information calculating unit 16 determines whether a composition of an image is changed. If the composition is not changed, the flow returns to step S2302, and it reads image signals also in the next frame with the condition set at step S2301. On the other hand, if the composition is changed, the flow returns to step S2301, and the setting of the range-finding frame and the setting of the readout order are performed again.

While FIGS. 23A and 23B illustrates the example in which the movable aperture stop 12c is intermittently driven for each frame, the movable aperture stop 12c may be driven in real time based on an entire average light intensity at that time for each detection of the light intensity in each region. In this embodiment, the movable aperture stop 12c is mechanically driven, and alternatively the brightness of an image can be adjusted without using the movable aperture stop 12c. For example, by inputting brightness signals of an object to be sequentially output in one frame from the adjusting unit 17 to the image processing unit 19, the gain-up and the gain-down of the image can be performed with high response. As described above, by adopting the method of each embodiment to the system of performing the drive control of the blur correction lens, the focus lens, and the movable aperture stop, or performing the gain correction on an image, the noise superimposed on the image can be effectively reduced. Accordingly, a high-quality optical apparatus can be achieved.

As described above, in each embodiment, an optical apparatus (image pickup apparatus 100) includes a control apparatus including a signal readout unit 15, an image information calculating unit 16, and an adjusting unit 17. The signal readout unit 15 reads out a frame image (an image in one frame) obtained from an image pickup device 14 while the frame image is divided into a plurality of different regions from each other. The image information calculating unit 16 calculates image information based on an image signal of each of the plurality of different regions obtained from the signal readout unit 15. The adjusting unit 17 determines a target adjustment value of an image pickup unit based on image information during capturing the frame image. In each embodiment, at least one processor or circuit is configured to perform a function (operation) of at least one of the units.

In each embodiment, the image pickup apparatus 100 includes a camera body 13b including the image pickup device 14, and a lens barrel 13a removably attached to the camera body 13b. Each embodiment is not limited to the configuration in which all the signal readout unit 15, the image information calculating unit 16, and the adjusting unit 17 that constitute the control apparatus are provided in the camera body 13b. At least one of the signal readout unit 15, the image information calculating unit 16, and the adjusting unit 17 may be provided in the lens barrel 13a. For example, the optical apparatus is the lens barrel 13a (lens apparatus) removably attached to the image pickup apparatus 100 including the image pickup device 14, and the optical apparatus includes the signal readout unit 15, the image information calculating unit 16, and the adjusting unit 17. The optical apparatus may be a lens barrel removably attached to an image pickup apparatus including the image pickup device 14 and the signal readout unit 15, and the optical apparatus includes the image information calculating unit 16 and the adjusting unit 17. The optical apparatus may be a lens apparatus removably attached to an image pickup apparatus including the image pickup device 14, the signal readout unit 15, and the image information calculating unit 16, and the optical apparatus includes the adjusting unit 17.

According to each embodiment, a control apparatus, an image pickup apparatus, a control method, and a non-transitory computer-readable storage medium which are capable of reducing a noise superimposed on an image when controlling an image pickup unit based on a plurality of image signals in a frame can be provided.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-094085, filed on May 1, 2015, which is hereby incorporated by reference herein in its entirety.

What is claimed is:

1. A control apparatus comprising:
at least one processor, executing computer instructions stored in memory, or circuit, configured to function as:
a signal readout unit configured to read out a frame image obtained from an image pickup device while the frame image is divided into a plurality of different regions;
an image information calculating unit configured to calculate image information based on an image signal of each of the plurality of different regions obtained from the signal readout unit; and
an adjusting unit configured to determine a target adjustment value of an image pickup unit including an image pickup optical system and the image pickup device based on the image information during capturing the frame image,
wherein the image information calculating unit includes:
an image information determining unit configured to determine a first image information extraction range from which the image information is extracted,
a feature point coordinate calculating unit configured to calculate a coordinate of the first image information extraction range determined at the time of reading out a first image signal of the image signals,
a feature point coordinate estimating unit configured to estimate a coordinate of a second image information extraction range different from the first image information extraction range based on the coordinate of the first image information extraction range calculated by the feature point coordinate calculating unit, and
an image information comparing unit configured to compare the coordinate of the second image information extraction range estimated by the feature point coordinate estimating unit with the coordinate of the first image information extraction range calculated by the feature point coordinate calculating unit determined after a passage of time from a readout time of the first image signal.

2. The control apparatus according to claim 1, further comprising a drive unit configured to drive the image pickup unit based on a signal from the adjusting unit during capturing the frame image.

3. The control apparatus according to claim 1, wherein the signal readout unit is configured to preferentially read out a region including the image information extraction range in the plurality of different regions of the frame image.

4. The control apparatus according to claim 1, wherein the signal readout unit is configured to perform decimating readout of a region other than the region including the image information extraction range in the plurality of different regions of the frame image.

5. The control apparatus according to claim 1, wherein the signal readout unit is configured to change a readout order based on the distribution of the image information extraction range.

6. The control apparatus according to claim 1, wherein the image information determining unit is configured to average coordinates of corresponding image information extraction ranges in a plurality of frame images to detect the distribution of the image information extraction range.

7. The control apparatus according to claim 1, wherein the image information determining unit is configured to detect the distribution of the image information extraction range based on a change of coordinates of corresponding image information extraction ranges in a plurality of frame images.

8. The control apparatus according to claim 1, wherein the signal readout unit is configured to read out a region including the image information extraction range at a constant interval for the frame image based on the distribution of the image information extraction range.

9. The control apparatus according to claim 8, wherein the signal readout unit is configured to alternately read out a region which includes the image information extraction range and a region which does not include the image information extraction range in the plurality of different regions.

10. The control apparatus according to claim 9, wherein the signal readout unit is configured to divide the plurality of different regions such that the number of regions each of which includes the image information extraction range and the number of regions each of which does not include the image information extraction range are the same each other.

11. The control apparatus according to claim 1, wherein the feature point coordinate calculating unit is configured to compare the plurality of image information extraction ranges of a plurality of frames for each corresponding image information extraction range to obtain a plurality of comparison waveforms, and calculate the target adjustment value based on a relationship of the plurality of comparison waveforms.

12. The control apparatus according to claim 11, wherein the image information distribution detecting unit is configured to determine a relative coordinate of image information extraction ranges different from each other in a frame based on the plurality of comparison waveforms.

13. The control apparatus according to claim 12, wherein the feature point coordinate calculating unit is configured to calculate the target adjustment value in a frame relating to a next frame based on a relationship of a plurality of image information extraction ranges in a frame determined by the image information distribution detecting unit.

14. The control apparatus according to claim 1, wherein the image information distribution detecting unit is configured to segmentalize the plurality of different regions before capturing a still image.

15. The control apparatus according to claim 1, wherein the signal readout unit is configured to change a time of a signal readout depending on a signal accumulation time required for capturing a still image.

16. The control apparatus according to claim 1, further comprising an image processing unit configured to synthesize a first frame that is used to obtain the target adjustment value with a second frame different from the first frame to generate a still image.

17. The control apparatus according to claim 16, wherein the image information distribution detecting unit associates a readout time of a plurality of frames adjacent to each other with a signal accumulation time.

18. The control apparatus according to claim 16, wherein the signal readout unit delays a signal readout time compared with a setting time in an accumulation start scan for a frame.

19. The control apparatus according to claim 18, wherein the signal readout unit is configured to set the signal readout time to be earlier than the setting time in a frame next to the frame in which the signal readout time is delayed compared with the setting time.

20. The control apparatus according to claim 16, further comprising an accumulation control unit configured to control a start of an accumulation of a frame which is to be initially captured in a plurality of frames synthesized by the image processing unit.

21. The control apparatus according to claim 16, further comprising a readout control unit configured to control a signal readout of a frame which is to be finally captured in a plurality of frames synthesized by the image processing unit.

22. The control apparatus according to claim 21, wherein the readout control unit is configured to perform an image blur correction by using an image signal read out while light to be incident on the image pickup device is shielded.

23. The control apparatus according to claim 1, wherein the image information calculating unit includes an image information complementing unit configured to complement image information of an image information lacked portion based on the image information.

24. The control apparatus according to claim 1, wherein the image information calculating unit includes an image information complementing unit configured to perform a gain adjustment of the image signal depending on an accumulation time difference in the frame image.

25. The control apparatus according to claim 1, wherein the image information calculating unit includes an image information complementing unit configured to predict the target adjustment value relating to subsequent frames based on a plurality of image signals in a frame.

26. An optical apparatus comprising:
an image pickup device;
at least one processor, executing computer instructions stored in memory, or circuit, configured to function as:
a signal readout unit configured to read out a frame image obtained from the image pickup device while the frame image is divided into a plurality of different regions;
an image information calculating unit configured to calculate image information based on an image signal of each of the plurality of different regions obtained from the signal readout unit; and
an adjusting unit configured to determine a target adjustment value of an image pickup unit including an image pickup optical system and the image pickup device based on the image information during capturing the frame image,
wherein the image information calculating unit includes:
an image information determining unit configured to determine a first image information extraction range from which the image information is extracted,
a feature point coordinate calculating unit configured to calculate a coordinate of the first image information extraction range determined at the time of reading out a first image signal of the image signals,
a feature point coordinate estimating unit configured to estimate a coordinate of a second image information extraction range different from the first image information extraction range based on the coordinate of the first image information extraction range calculated by the feature point coordinate calculating unit, and
an image information comparing unit configured to compare the coordinate of the second image information extraction range estimated by the feature point coordinate estimating unit with the coordinate of the first image information extraction range calculated by the feature point coordinate calculating unit determined after a passage of time from a readout time of the first image signal.

27. An optical apparatus removably attached to an image pickup apparatus including an image pickup device, the optical apparatus comprising:
at least one processor, executing computer instructions stored in memory, or circuit, configured to function as:
a signal readout unit configured to read out a frame image obtained from the image pickup device while the frame image is divided into a plurality of different regions;
an image information calculating unit configured to calculate image information based on an image signal of each of the plurality of different regions obtained from the signal readout unit; and
an adjusting unit configured to determine a target adjustment value of an image pickup unit including an image pickup optical system and the image pickup device based on the image information during capturing the frame image,
wherein the image information calculating unit includes;
an image information determining unit configured to determine a first image information extraction range from which the image information is extracted,
a feature point coordinate calculating unit configured to calculate a coordinate of a first image information extraction range determined at the time of reading out a first image signal of the image signals,
a feature point coordinate estimating unit configured to estimate a coordinate of a second image information extraction range different from the first image information extraction range based on the coordinate of the first image information extraction range calculated by the feature point coordinate calculating unit, and
an image information comparing unit configured to compare the coordinate of the second image information extraction range estimated by the feature point coordinate estimating unit with the coordinate of the first image information extraction range calculated by the feature point coordinate calculating unit determined after a pas age of time from a readout time of the first image signal.

28. An optical apparatus removably attached to an image pickup apparatus including an image pickup device and at least one processor, executing computer instructions stored in memory, or circuit, configured to function as:
a signal readout circuit or a processor executing computer instructions, configured to read out a frame image obtained from the image pickup device while the frame image is divided into a plurality of different regions, the optical apparatus comprising:
at least one processor, executing computer instructions stored in memory, or circuit, configured to function as:

an image information calculating unit configured to calculate image information based on an image signal of each of the plurality of different regions obtained from the signal readout unit; and an adjusting unit configured to determine a target adjustment value of an image pickup unit including an image pickup optical system and the image pickup device based on the image information during capturing the frame image, wherein the image information calculating unit includes:

an image information determining unit configured to determine a first image information extraction range from which the image information is extracted, a feature point coordinate calculating unit configured to calculate a coordinate of the first image information extraction range determined at the time of reading out a first image signal of the image signals, a feature point coordinate estimating unit configured to estimate a coordinate of a second image information extraction range different from the first image information extraction range based on the coordinate of the first image information extraction range calculated by the feature point coordinate calculating unit, and an image information comparing unit configured to compare the coordinate of the second image information extraction range estimated by the feature point coordinate estimating unit with the coordinate of the first image information extraction range calculated by the feature point coordinate calculating unit determined after a passage of time from a readout time of the first image signal.

29. An optical apparatus removably attached to an image pickup apparatus including an image pickup device, a signal readout circuit or a processor executing computer instructions, configured to read out a frame image obtained from the image pickup device while the frame image is divided into a plurality of different regions, and further configured to operate as an image information calculating unit configured to calculate image information based on an image signal of each of the plurality of different regions obtained from the signal readout unit, the optical apparatus comprising:

at least one processor, executing computer instructions stored in memory, or circuit, configured to function as:

an adjusting unit configured to determine a target adjustment value of an image pickup unit including an image pickup optical system and the image pickup device based on the image information during capturing the frame image, wherein the image information calculating unit includes:

an image information determining unit configured to determine a first image information extraction range from which the image information is extracted, a feature point coordinate calculating unit configured to calculate a coordinate of the first image information extraction range determined at the time of reading out a first image signal of the image signals, a feature point coordinate estimating unit configured to estimate a coordinate of a second image information extraction range different from the first image information extraction range based on the coordinate of the first image information extraction range calculated by the feature point coordinate calculating unit, and an image information comparing unit configured to compare the coordinate of the second image information extraction range estimated by the feature point coordinate estimating unit with the coordinate of the first image information extraction range calculated by the feature point coordinate calculating unit determined after a passage of time from a readout time of the first image signal.

30. A control method comprising the steps of:

reading out a frame image obtained from an image pickup device while the frame image is divided into a plurality of different regions;

calculating image information based on an image signal of each of the plurality of different regions; and determining a target adjustment value of an image pickup unit based on the image information during capturing the frame image, wherein the calculating step includes the step of:

determining a first image information extraction range from which the image information is extracted, calculating a coordinate of the first image information extraction range determined at the time of reading out a first image signal of the image signals, estimating a coordinate of a second image information extraction range different from the first image information extraction range based on the coordinate of the first image information extraction range, and comparing the coordinate of the second image information extraction range with the coordinate of the first image information extraction range determined after a passage of time from a readout time of the first image signal.

31. A non-transitory computer-readable storage medium storing a program which causes a computer to execute a process comprising the steps of:

reading out a frame image obtained from an image pickup device while the frame image is divided into a plurality of different regions;

calculating image information based on an image signal of each of the plurality of different regions; and determining a target adjustment value of an image pickup unit based on the image information during capturing the frame image, wherein the calculating step includes the steps of:

determining a first image information extraction range from which the image information is extracted, calculating a coordinate of the first image information extraction range determined at the time of reading out a first image signal of the image signals, estimating a coordinate of a second image information extraction range different from the first image information extraction range based on the coordinate of the first image information extraction range, and comparing the coordinate of the second image information extraction range with the coordinate of the first image information extraction range determined after a passage of time from a readout time of the first image signal.

* * * * *